US012565826B2

(12) United States Patent
Drews et al.

(10) Patent No.: US 12,565,826 B2
(45) Date of Patent: Mar. 3, 2026

(54) STIMULATION JOB DESIGN AND EXECUTION ADVISORS FOR OPTIMAL FRACTURE PERFORMANCE

(71) Applicant: Schlumberger Technology Corporation, Sugar Land, TX (US)

(72) Inventors: Timothy Drews, Sugar Land, TX (US); Abdul Muqtadir Khan, Sugar Land, TX (US); Sidney Flores, Sugar Land, TX (US); Esteban Ugarte Daza, Sugar Land, TX (US); Samir Menasria, Sugar Land, TX (US); Brandon Hobbs, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/907,058

(22) Filed: Oct. 4, 2024

(65) Prior Publication Data

US 2025/0116180 A1 Apr. 10, 2025

Related U.S. Application Data

(60) Provisional application No. 63/588,017, filed on Oct. 5, 2023.

(51) Int. Cl.
 *E21B 43/26* (2006.01)
 *E21B 43/25* (2006.01)
 (Continued)

(52) U.S. Cl.
 CPC .............. *E21B 43/26* (2013.01); *E21B 43/25* (2013.01); *E21B 47/06* (2013.01); *G05B 23/0275* (2013.01); *E21B 2200/22* (2020.05)

(58) Field of Classification Search
 CPC ...... E21B 43/26; E21B 2200/20; E21B 49/00; E21B 41/00; E21B 47/06; E21B 44/00;
 (Continued)

(56) References Cited

U.S. PATENT DOCUMENTS

2003/0078732 A1 4/2003 Pandey
2010/0224365 A1 9/2010 Abad
 (Continued)

FOREIGN PATENT DOCUMENTS

CA 3150086 A1 * 8/2022 ............. E21B 34/02

OTHER PUBLICATIONS

Gruesbeck, C. et al., "Particle Transport Through Perforations", Society of Petroleum Engineers Journal, Dec. 1, 1982, 9 Pages, vol. 22.
 (Continued)

*Primary Examiner* — Zakiya W Bates
(74) *Attorney, Agent, or Firm* — Jeffrey D. Frantz

(57) ABSTRACT

Systems and methods to enable stimulation job design and execution advisors for optimal fracture performance. For example, a control system may include one or more processors configured to execute processor-executable instructions stored on memory of the control system, wherein the processor-executable instructions, when executed by the one or more processors, cause the control system to initiate and implement one or more software modules in a modular manner to optimize parameters of a hydraulic stimulation job, and to provide advice regarding one or more adjustments to the parameters of the hydraulic stimulation job in substantially real-time during performance of the hydraulic stimulation job.

20 Claims, 30 Drawing Sheets

(51) Int. Cl.

| | | |
|---|---|---|
| *E21B 44/00* | (2006.01) | |
| *E21B 47/06* | (2012.01) | |
| *E21B 49/00* | (2006.01) | |
| *G05B 23/02* | (2006.01) | |

(58) Field of Classification Search
CPC .. E21B 2200/22; E21B 43/2607; E21B 47/00;
E21B 47/07
See application file for complete search history.

(56) References Cited

U.S. PATENT DOCUMENTS

| | | | |
|---|---|---|---|
| 2016/0208597 A1 | 7/2016 | Wang | |
| 2018/0230780 A1 | 8/2018 | Klenner | |
| 2018/0306016 A1 | 10/2018 | Safonov | |
| 2021/0010359 A1* | 1/2021 | Ruhle | G06N 20/00 |
| 2021/0131253 A1 | 5/2021 | Martysevich | |
| 2021/0230992 A1 | 7/2021 | Ruhle | |
| 2021/0389173 A1* | 12/2021 | Mazrooee | E21B 47/135 |
| 2022/0003059 A1 | 1/2022 | Mu | |
| 2022/0025753 A1 | 1/2022 | Heidari | |
| 2022/0243568 A1 | 8/2022 | AlTammar | |

OTHER PUBLICATIONS

Search Report and Written Opinion of International Patent Application No. PCT/US2024/049983 dated on Jan. 15, 2025, 11 Pages.
Search Report and Written Opinion of International Patent Application No. PCT/US2024/049988 dated on Jan. 14, 2025, 11 Pages.

* cited by examiner

STIMULATION JOB DESIGN AND EXECUTION ADVISORS FOR OPTIMAL FRACTURE PERFORMANCE

CROSS-REFERENCE TO RELATED APPLICATION

This application claims priority to and the benefit of U.S. Provisional Patent Application Ser. No. 63/588,017, entitled "Stimulation Job Design and Execution Advisors for Optimal Fracture Performance," filed Oct. 5, 2023, which is hereby incorporated by reference in its entirety for all purposes.

BACKGROUND

The present disclosure generally relates to systems and methods for stimulation job design and execution advisors for optimal fracture performance.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

A well stimulation job (e.g., hydraulic fracturing) consists of a design, execution, and evaluation (DEE) cycle where each stage of the job is designed for the specific well composition, each stage is executed per the design specifications, and each stage is evaluated after it is performed to ensure the quality of the job. In addition, it is common for multiple wells to be stimulated within the vicinity of other wells (known as a pad of wells), which can lead to physical influence effects of one well on another that can be detrimental to the stimulation jobs.

SUMMARY

A summary of certain embodiments described herein is set forth below. It should be understood that these aspects are presented merely to provide the reader with a brief summary of these certain embodiments and that these aspects are not intended to limit the scope of this disclosure.

Certain embodiments of the present disclosure include a control system having one or more processors configured to execute processor-executable instructions stored on memory of the control system, wherein the processor-executable instructions, when executed by the one or more processors, cause the control system to initiate and implement one or more software modules in a modular manner to optimize parameters of a hydraulic stimulation job, and to provide advice regarding one or more adjustments to the parameters of the hydraulic stimulation job in substantially real-time during performance of the hydraulic stimulation job.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings, in which.

3

Figures 18A, 18B:
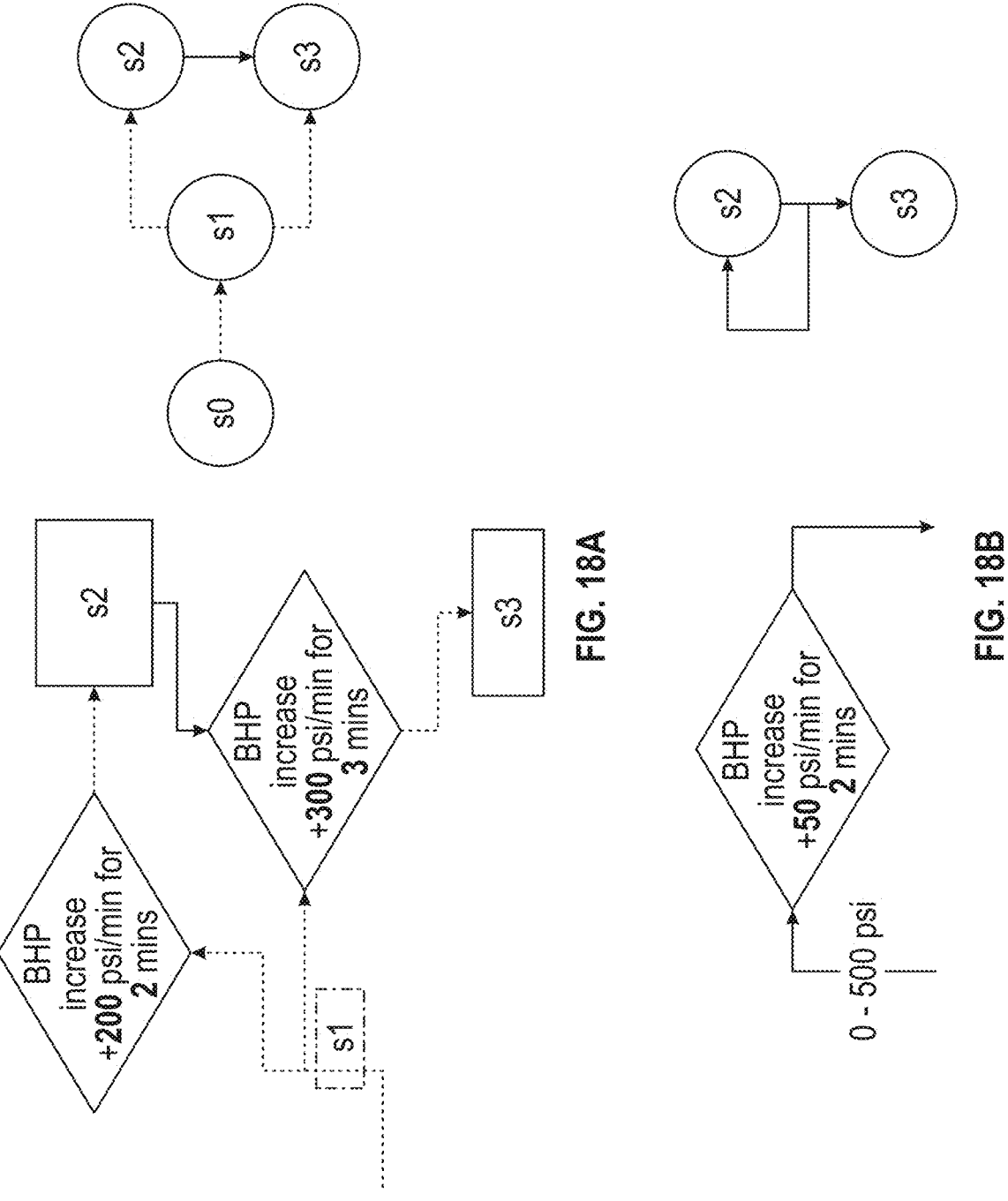
Figure 19:
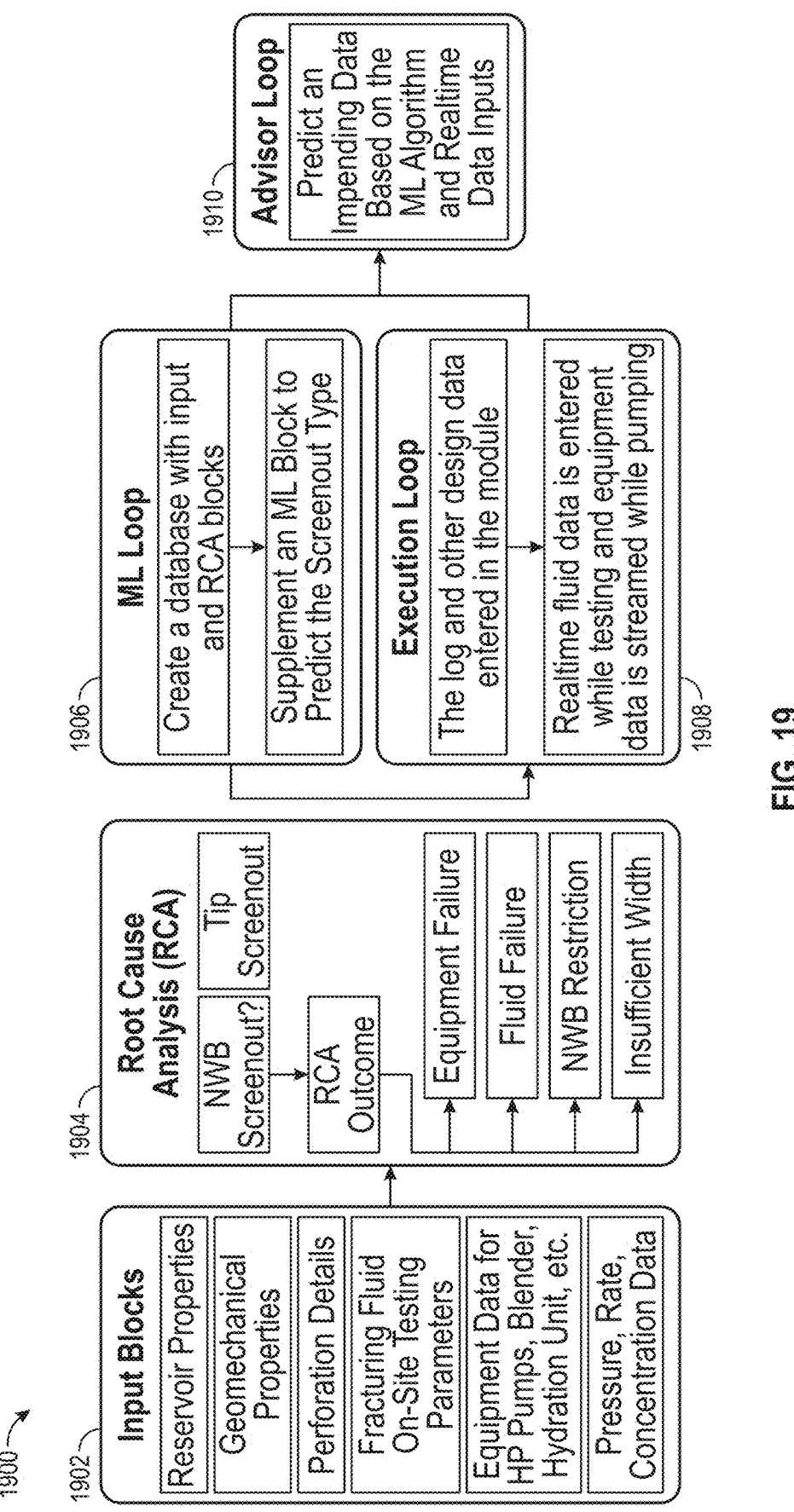
Figure 20:
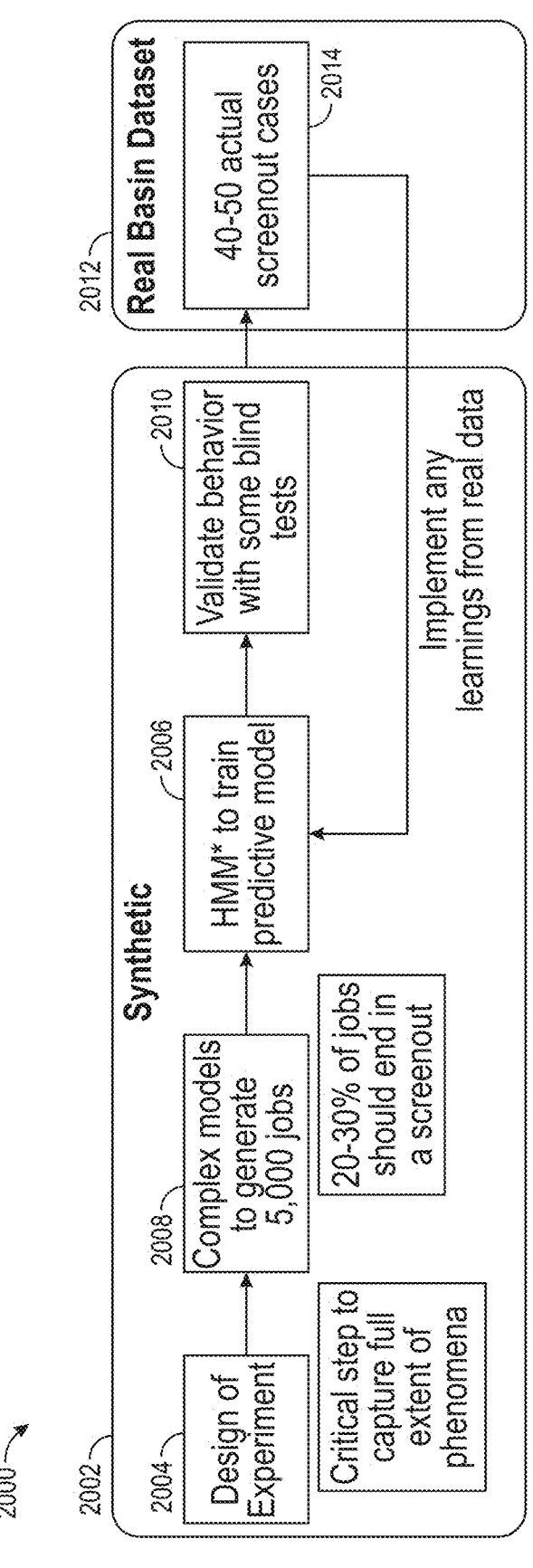
Figure 21:
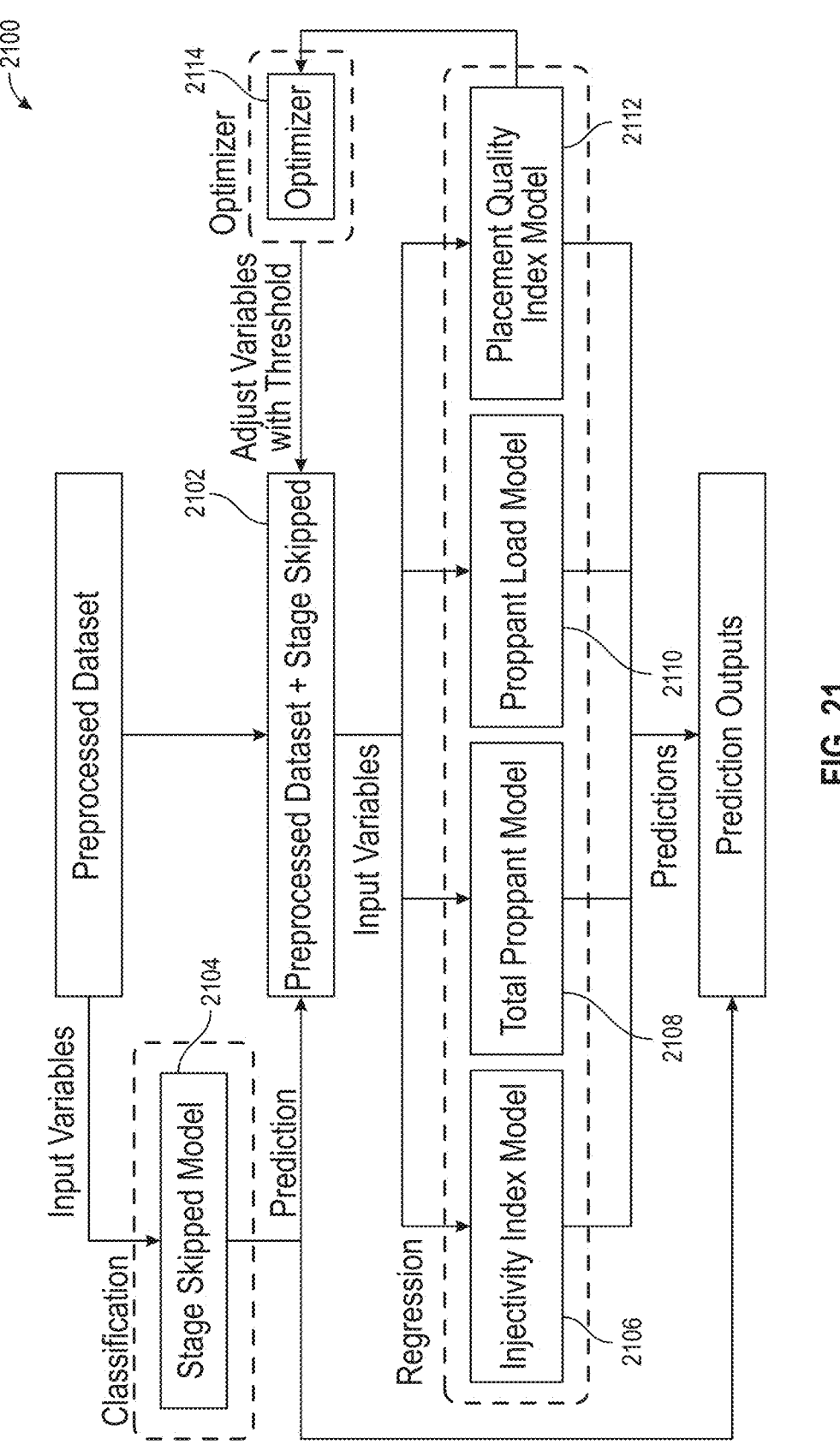
Figure 22:
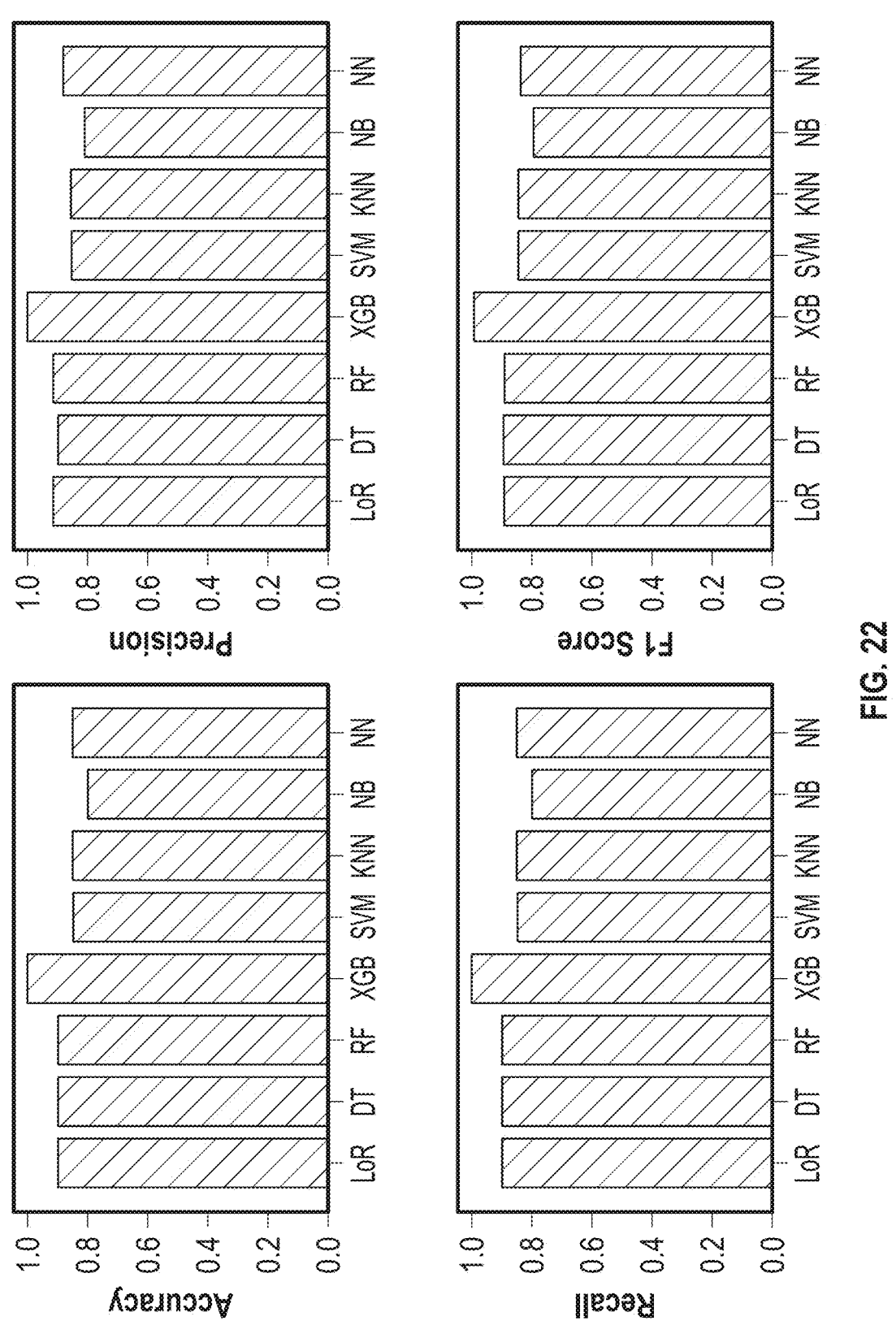
Figure 23:
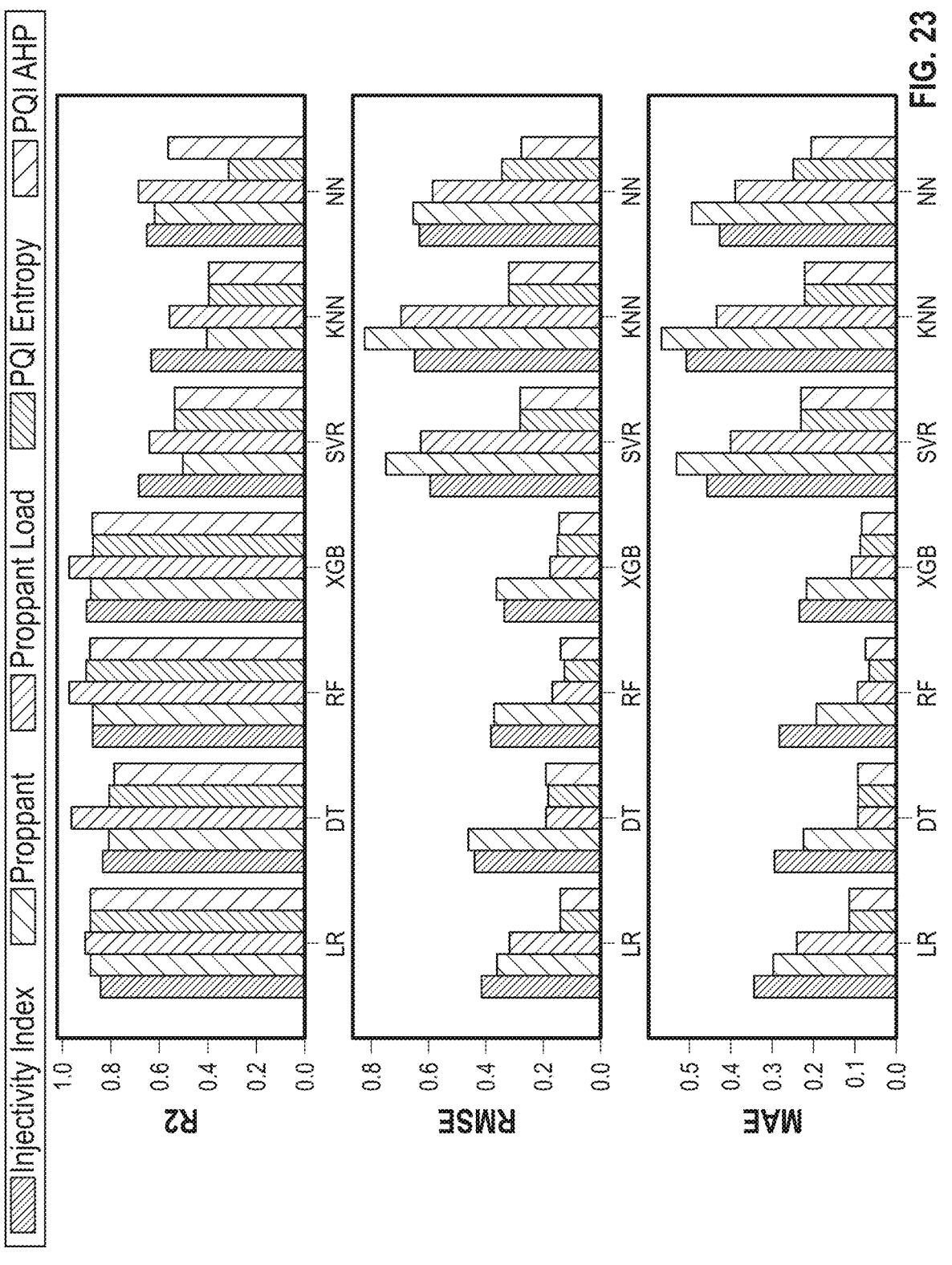
Figures 24A, 24B:
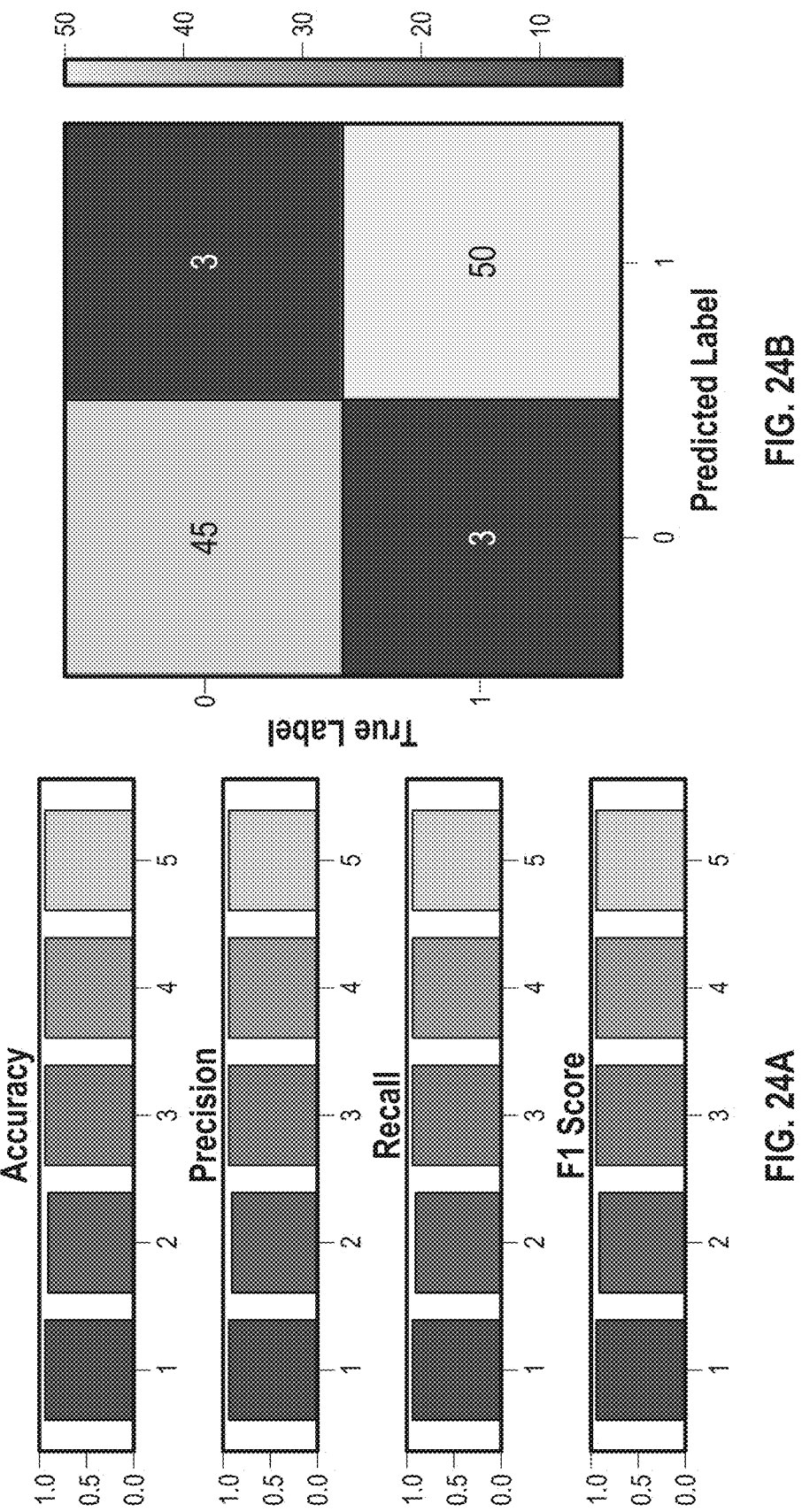
Figures 28A, 28B:
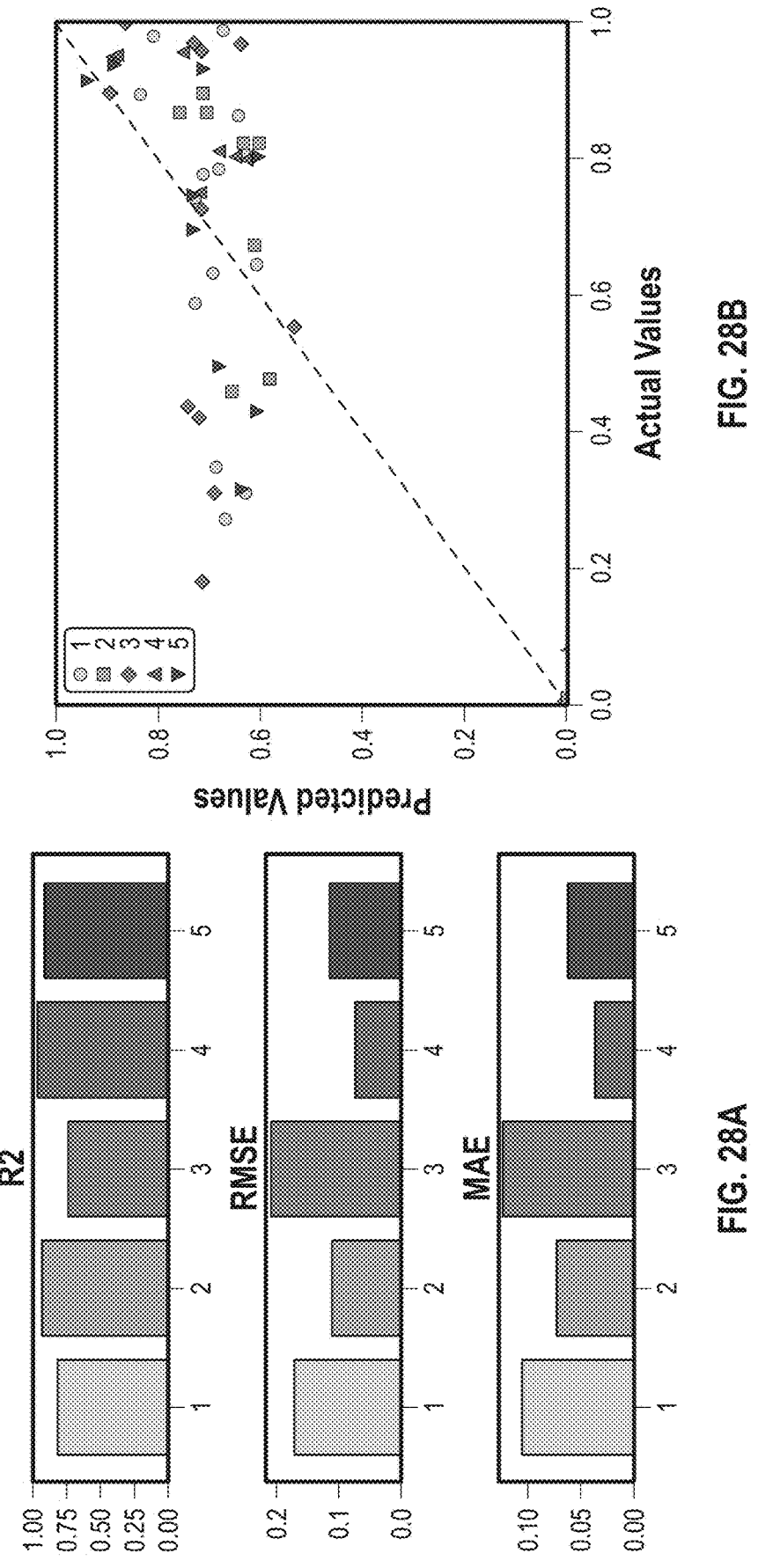
Figures 29A, 29B:
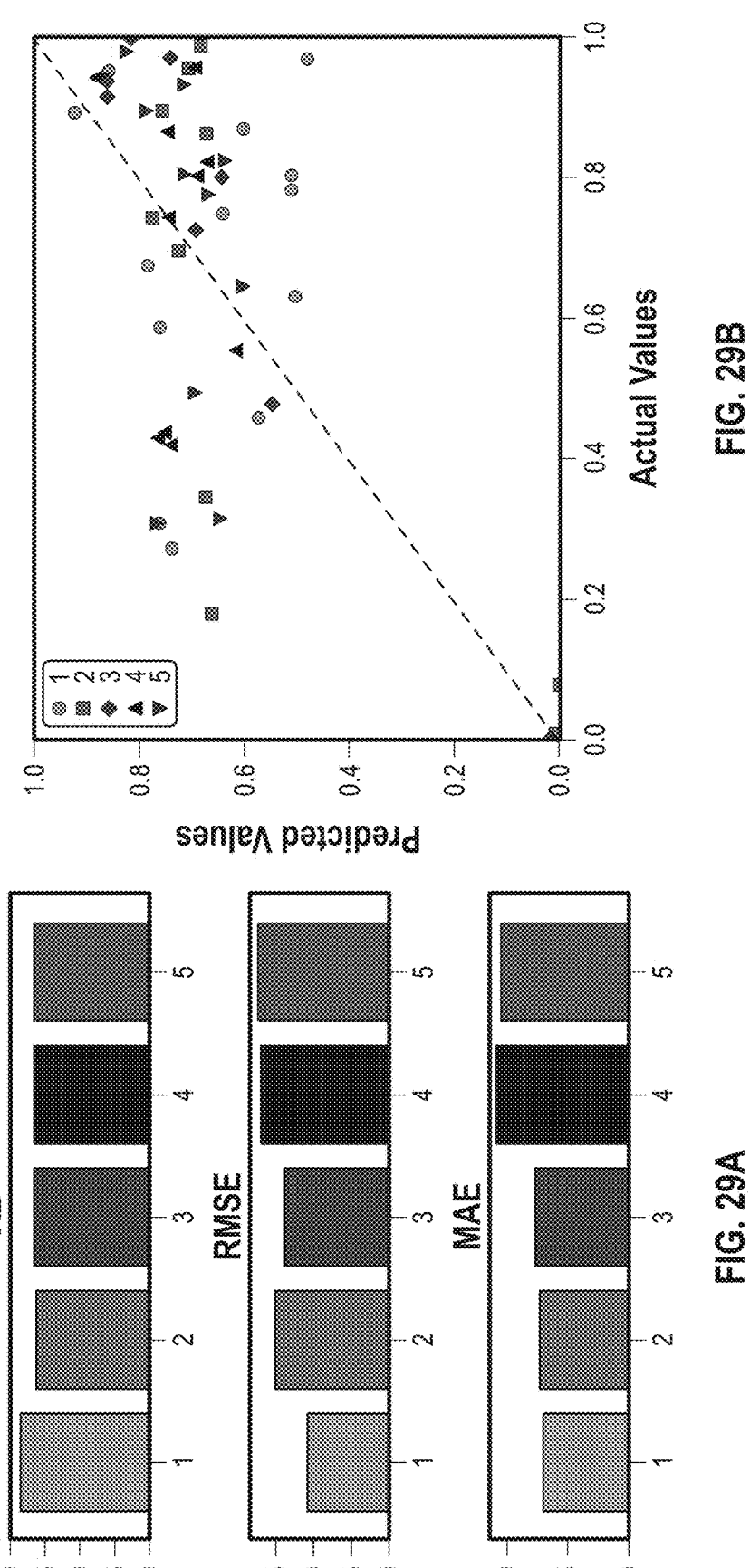
Figure 30:
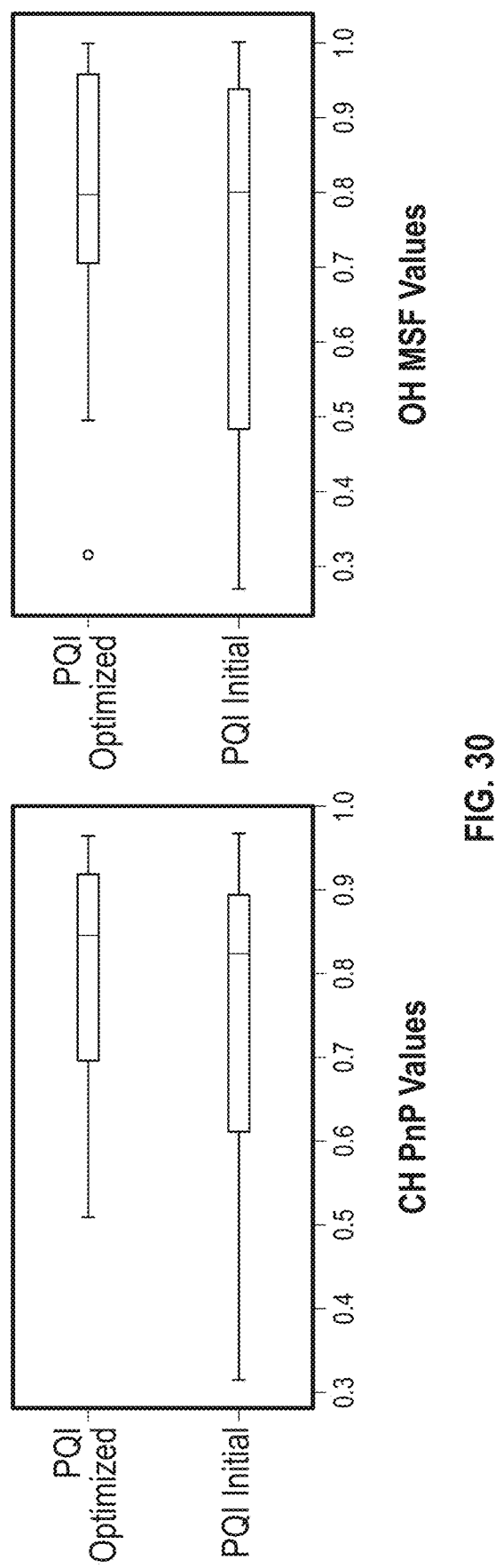

FIGS. 18A and 18B illustrate other different scenarios representing conversion of flowchart state into a state machine state, in accordance with embodiments of the present disclosure;

FIG. 19 illustrates a Screenout Predictor workflow for root cause analysis, in accordance with embodiments of the present disclosure;

FIG. 20 illustrates a Screenout Predictor workflow utilizing synthetically generated data, in accordance with embodiments of the present disclosure;

FIG. 21 illustrates a machine learning workflow using output from a classification model as an input variable for other regression models and an optimizer for a Placement Quality Index (PQI), in accordance with embodiments of the present disclosure;

FIG. 22 compares the performance of all of the classification models for the stage skipped prediction tested across the different evaluation metrics, in accordance with embodiments of the present disclosure;

FIG. 23 illustrates a regression model performance comparison, in accordance with embodiments of the present disclosure;

FIG. 24A illustrates a classification model performance comparison for stage skipped prediction using evaluation metrics of accuracy, precision, recall, and F1 score, in accordance with embodiments of the present disclosure;

FIG. 24B illustrates a confusion matrix for stage skipped prediction, in accordance with embodiments of the present disclosure;

FIGS. 25A-29B illustrate various correlations for Injectivity Index (II), total proppant, proppant load, and PQI, in accordance with embodiments of the present disclosure; and FIG. 30 shows the distribution of the optimized variables of PQI, in accordance with embodiments of the present disclosure.

DETAILED DESCRIPTION

One or more specific embodiments of the present disclosure will be described herein. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As used herein, the terms "connect," "connection," "connected," "in connection with," and "connecting" are used to mean "in direct connection with" or "in connection with via one or more elements"; and the term "set" is used to mean "one element" or "more than one element." Further, the terms "couple," "coupling," "coupled," "coupled together," and "coupled with" are used to mean "directly coupled together" or "coupled together via one or more elements." As used herein, the terms "up" and "down," "uphole" and "downhole", "upper" and "lower," "top" and "bottom," and other like terms indicating relative positions to a given point or element are utilized to more clearly describe some elements. Commonly, these terms relate to a reference point as the surface from which drilling operations are initiated as being the top (e.g., uphole or upper) point and the total depth along the drilling axis being the lowest (e.g., downhole or lower) point, whether the well (e.g., wellbore, borehole) is vertical, horizontal or slanted relative to the surface.

As used herein, a fracture shall be understood as one or more cracks or surfaces of breakage within rock. Fractures can enhance permeability of rocks greatly by connecting pores together and, for that reason, fractures can be induced mechanically in some reservoirs in order to boost hydrocarbon flow. Certain fractures may also be referred to as natural fractures to distinguish them from fractures induced as part of a reservoir stimulation. Fractures can also be grouped into fracture clusters (or "perf clusters") where the fractures of a given fracture cluster (perf cluster) connect to the wellbore through a single perforated zone. As used herein, the term "fracturing" refers to the process and methods of breaking down a geological formation and creating a fracture (i.e., the rock formation around a wellbore) by pumping fluid at relatively high pressures (e.g., pressure above the determined closure pressure of the formation) in order to increase production rates from a hydrocarbon reservoir.

In addition, as used herein, the terms "real time", "real-time", or "substantially real time" may be used interchangeably and are intended to described operations (e.g., computing operations) that are performed without any human-perceivable interruption between operations. For example, as used herein, data relating to the systems described herein may be collected, transmitted, and/or used in control computations in "substantially real time" such that data readings, data transfers, and/or data processing steps occur once every second, once every 0.1 second, once every 0.01 second, or even more frequent, during operations of the systems (e.g., while the systems are operating). In addition, as used herein, the terms "automatic" and "automated" are intended to describe operations that are performed are caused to be performed, for example, by a control system (i.e., solely by the control system, without human intervention).

Exploring, drilling and completing hydrocarbon and other wells are relatively complicated, time consuming and, ultimately, relatively expensive endeavors. As a result, over the years, well depth and architecture have been extended in order to help enhance access to underground hydrocarbon reserves. For example, it is not uncommon to find hydrocarbon wells exceeding 30,000 feet in depth. While such well depths may increase the likelihood of accessing underground hydrocarbon reservoirs, other challenges are presented in terms of well management and the maximization of hydrocarbon recovery from such wells. For example, during completions, the well architecture may be enhanced by a series of wireline-run perforating applications tailored to introduce fractures and perforations into a formation defining the well. Thus, subsequent stimulated recovery from the reservoir may help to maximize overall production.

The embodiments described herein include a novel, holistic approach to improving stimulation job quality through the use of acquired data and advanced analytics to monitor and advise stimulation job stakeholders on how to tune the job designs and execution for optimal stimulation performance. The approach is implemented in a stimulation digital ecosystem, which is a set of interconnected applications that have specific roles within a design, execution, and evaluation (DEE) cycle. However, the algorithms, some of which are manifested as advisors in the software that are proposed, may be implemented in a variety of ways. The advisors and algorithms may be categorized into material loading optimization, fracture optimization, and job performance optimization, and may assist in job performance optimization, operational efficiency, and environmental impact assessment. When used together, these advisors and algorithms will help to achieve the optimal fracture performance, with the optimal amount of materials used, and with the avoidance of any detrimental situations during the stimulation job, such as screenouts.

Figure 1:
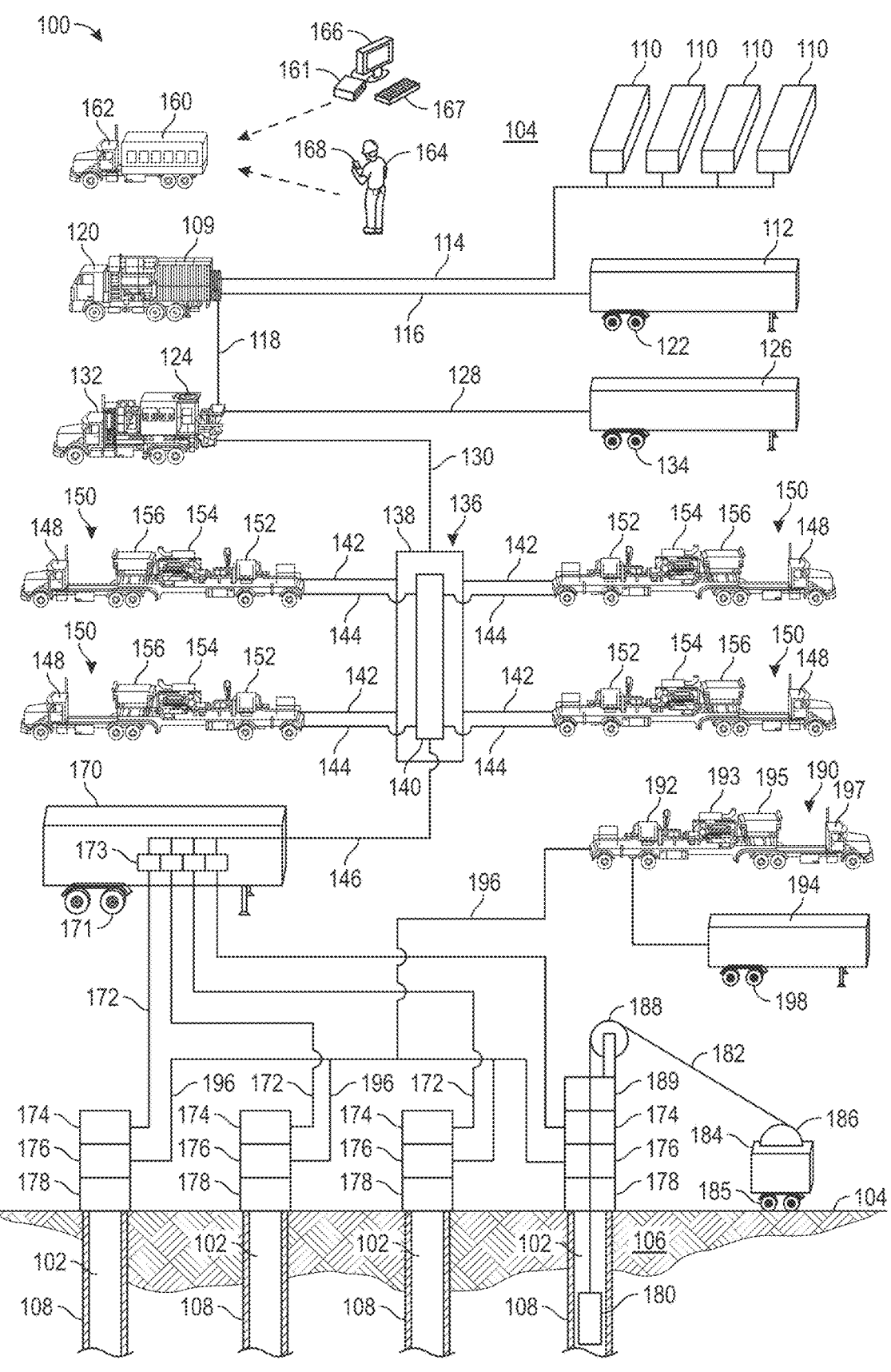
FIG. 1 is a schematic view of at least a portion of an example implementation of a wellsite system, in accordance with embodiments of the present disclosure.

FIG. 1 is a schematic view of at least a portion of an example implementation of a wellsite system 100, in accordance with embodiments of the present disclosure. FIG. 1 illustrates multiple wellbores 102 each extending from a terrain surface of a wellsite 104, a partial sectional view of a subterranean formation 106 penetrated by the wellbores 102, and various pieces of wellsite equipment or components of the wellsite system 100 located at the wellsite 104. The wellsite system 100 may facilitate recovery of oil, gas, and/or other materials that are trapped in the subterranean formation 106. In certain embodiments, each wellbore 102 may include a casing 108 secured by cement (not shown). The wellsite system 100 may be configured to transfer various materials and additives from corresponding sources to a destination location for blending or mixing and subsequent injection into one or more of the wellbores 102 during fracturing and other stimulation operations. In certain embodiments, such operations may be partially or fully automated using at least one controller, as described in greater detail herein.

In certain embodiments, the wellsite system 100 may include a mixing unit 109 (referred to hereinafter as a "mixer") fluidly connected to one or more tanks 110 and a container 112. In certain embodiments, the container 112 may contain a first material and the tanks 110 may contain a liquid. In certain embodiments, the first material may be or include a hydratable material or gelling agent, such as cellulose, clay, galactomannan, guar, polymers, synthetic polymers, and/or polysaccharides, among other examples. In addition, in certain embodiments, the liquid may be or include an aqueous fluid, such as water or an aqueous solution including water, among other examples. In certain embodiments, the mixer 109 may be configured to receive the first material and the liquid, via two or more conduits or other material transfer means (hereafter simply "conduits") 114, 116, and mix or otherwise combine the first material and the liquid to form a base fluid, which may be or include what is known in the art as a gel. In certain embodiments, the mixer 109 may then discharge the base fluid via one or more conduits 118.

In certain embodiments, the wellsite system 100 may further include another mixer 124 fluidly connected to the mixer 109 and another container 126. In certain embodiments, the container 126 may contain a second material that may be appreciably different than the first material. For example, the second material may be or include a proppant material, such as quartz, sand, sand-like particles, silica, and/or propping agents, among other examples. In certain embodiments, the mixer 124 may be configured to receive the base fluid from the mixer 109 via the one or more conduits 118, and the second material from the container 126 via one or more conduits 128, and mix or otherwise combine the base fluid and the second material to form a mixed fluid, which may be or include what is known in the art as a fracturing fluid. In certain embodiments, the mixer 124 may then discharge the mixed fluid via one or more conduits 130.

In certain embodiments, the mixed fluid may be communicated from the mixer 124 to a common manifold 136 via the one or more conduits 130. In certain embodiments, the common manifold 136 may include a low-pressure distribution manifold 138, a high-pressure collection and discharge manifold 140, as well as various valves and diverters, which may be collectively configured to direct the flow of the mixed fluid in a predetermined manner. In certain embodiments, the common manifold 136 may receive the mixed fluid from the one or more conduits 130 and distribute the mixed fluid to a fleet of pump units 150 via the low-pressure distribution manifold 138. The common manifold 136 may be known in the art as a missile or a missile trailer. Although the fleet is illustrated as including four pump units 150, in other embodiments, the fleet may include other quantities of pump units 150 within the scope of the present disclosure.

Each pump unit 150 may include a pump 152, a prime mover 154, and perhaps a heat exchanger 156. In certain embodiments, each pump unit 150 may receive the mixed fluid from a corresponding outlet of the low-pressure distribution manifold 138 of the common manifold 136, via one or more conduits 142, and discharge the mixed fluid under pressure into a corresponding inlet of the high-pressure collection and discharge manifold 140 via one or more conduits 144. In certain embodiments, the mixed fluid may then be discharged from the high-pressure collection and discharge manifold 140 via one or more conduits 146.

The tanks 110, the containers 112, 126, the mixers 109, 124, the pump units 150, the manifold 136, and the conduits 114, 116, 118, 128, 130, 142, 144, 146 may collectively form a treatment (e.g., stimulation) fluid system. As described herein, the treatment fluid system of the wellsite system 100 may be configured to transfer additives and produce a fracturing fluid that may be pressurized and injected into a selected wellbore 102 during hydraulic fracturing operations. However, it is to be understood that the treatment fluid system may also or instead be configured to transfer other additives and mix other treatment fluids that may be pressurized and injected into the selected wellbore 102 during other well and/or reservoir treatment operations, such as acidizing operations, chemical injection operations, and other stimulation operations, among other examples. Accordingly, unless described otherwise, the one or more mixed fluids being produced and pressurized by the treatment fluid system for injection into a selected wellbore 102 may be referred to hereinafter simply as "a treatment fluid."

In certain embodiments, the treatment fluid may be received by a fracturing manifold 170, which may selectively distribute the treatment fluid between the wellbores 102 via a plurality of corresponding fluid conduits 172 extending between the fracturing manifold 170 and each wellbore 102. In certain embodiments, the fracturing manifold 170 may include a plurality of remotely operated fluid flow control valves 173 (e.g., frac valves, shut-off valves), each remotely operable to fluidly connect (and disconnect) the fluid conduit 146 to (and from) a selected one or more of the fluid conduits 172 and, thus, facilitate injection of the treatment fluid into a selected one or more of the wellbores 102. The fracturing manifold 170 may be known in the art as a zipper manifold.

Each wellbore 102 may be capped by a plurality (e.g., a stack) of fluid flow control devices 174, 176, which may include or form a Christmas tree (e.g., a frac tree) including fluid flow control valves (e.g., master valves, wing valves, swab valves, etc.), spools, flow crosses (e.g., goat heads, frac heads, etc.), and fittings individually and/or collectively configured to direct and control (e.g., permit and prevent) flow of the treatment fluid into the wellbore 102 and to direct and control flow of formation fluids out of the wellbore 102. In certain embodiments, the fluid flow control valves of the fluid flow control device 174, 176 may be configured to close selected tubulars or pipes, such as the casing 108 or production tubing extending within the wellbore 102, to selectively facilitate fluid access to the wellbore 102. In certain embodiments, the fluid flow control devices 174, 176 may also include or form a blow-out preventer (BOP) stack selectively operable to prevent flow of the formation fluids out of the wellbore 102. In certain embodiments, the fluid flow control devices 174, 176 may be directly or indirectly mounted on top of a wellhead 178 (e.g., tubing head adapter) terminating the wellbore 102 at the surface of the wellsite 104. In certain embodiments, each fluid flow control valve 173 of the fracturing manifold 170 may be fluidly connected to a corresponding fluid flow control device 174 via one or more fluid conduits 172, to facilitate selective fluid connection between the common manifold 136 and one or more of the wellbores 102. Thus, the fluid flow control valves 173 of the fracturing manifold 170 and the fluid flow control valves of the fluid flow control devices 174, 176 may collectively form a fluid flow control valve system configured to fluidly connect (and disconnect) one of the treatment fluid system and a pump-down system, as described herein, to (and from) a selected one or more of the wellbores 102.

In certain embodiments, a downhole intervention and/or sensor assembly, referred to herein as a tool string 180, may be conveyed within a selected one of the wellbores 102 via a conveyance line 182 operably coupled with one or more pieces of equipment at the wellsite 104. In certain embodiments, the tool string 180 may include a perforating tool configured to perforate the casing 108 and a portion of the formation 106 surrounding the wellbore 102 during perforating operations. In certain embodiments, the conveyance line 182 may be or include a cable, a wireline, a slickline, a multiline, an e-line, coiled tubing, and/or other conveyance means.

In certain embodiments, the conveyance line 182 may be operably connected to a conveyance device 184 (e.g., a wireline or coiled tubing conveyance unit) configured to apply an adjustable tension to the tool string 180 via the conveyance line 182 to convey the tool string 180 through the wellbore 102. In certain embodiments, the conveyance device 184 may be or include a winch conveyance system including a reel or drum 186 storing thereon a wound length of the conveyance line 182. The drum 186 may be rotated by a rotary actuator (e.g., an electric motor, a hydraulic motor, etc.) (not shown) to selectively unwind and wind the conveyance line 182 to apply an adjustable tensile force to the tool string 180 to selectively convey the tool string 180 into and out of the wellbore 102. In certain embodiments, the conveyance line 182 may be directed, guided, and/or injected (e.g., pushed downhole) into the wellbore 102 by an injection device 188 (e.g., a sheave, a pulley, a coiled tubing injector), one or more of which may be supported above the wellbore 102 via a mast, a derrick, a crane, and/or another support structure (not shown). In certain embodiments, the conveyance line 182 may include and/or be operable in conjunction with means for communication between the tool string 180, the conveyance device 184, and/or one or more other portions of the surface equipment, including a tool string control system.

The tool string 180 may be deployed into or retrieved from the wellbore 102 via the conveyance device 184 through the fluid flow control devices 174, 176, the wellhead 178, and/or a sealing and alignment assembly 189 mounted on the fluid flow control devices 174, 176 and configured to seal the conveyance line 182 during deployment, conveyance, intervention, and other wellsite operations performed via the tool string 180. The injection device 188 may, thus, guide the conveyance line 182 between the conveyance device 184 and the sealing and alignment assembly 189. In certain embodiments, the sealing and alignment assembly 189 may include a lock chamber (e.g., a lubricator, an airlock, a riser, etc.) mounted on the fluid flow control devices 174, 176, and a stuffing box configured to seal around the conveyance line 182 at the top of the lock chamber. In certain embodiments, the stuffing box may be configured to seal around an outer surface of the conveyance line 182, such as via annular packings applied around the surface of the conveyance line 182 and/or by injecting a fluid between the outer surfaces of the conveyance line 182 and an inner wall of the stuffing box.

In certain embodiments, the sealing and alignment assembly 189 and the injection device 188 may be disconnected from above a wellbore 102 that was perforated and is now ready for stimulation (e.g., fracturing operations), and may be installed or connected above a wellbore 102 that is to be perforated in preparation for stimulation. In certain embodiments, the sealing and alignment assembly 189 and the injection device 188 may be moved from wellbore 102 to wellbore 102 and supported above a wellbore 102 by a crane or other lifting equipment. The conveyance device 184, the sealing and alignment assembly 189, the injection device 188, the tool string 180, and the conveyance line 182 may collectively form at least a portion of a perforating system configured to convey the tool string 180 (including a perforating tool) within and out of a wellbore 102 and to perforate the wellbore 102.

In certain embodiments, the wellsite system 100 may further include a pump-down system configured to inject a fluid (e.g., water) into a selected one of the wellbores 102 to perform pump-down operations to convey the tool string 180 to an intended depth along the wellbore 102. The pump-down operations may be utilized to move the tool string 180 along the wellbore 102 to facilitate wellbore plugging and perforating ("plug and perf") operations. For example, the tool string 180 may be conveyed through the wellbore 102 to fluidly isolate an upper formation zone that has not yet been perforated from a lower formation zone that has already been perforated, and then perforate the upper formation zone. In certain embodiments, the pumping system may include a pump unit 190 configured to inject the fluid from a fluid container 194 into the selected one of the wellbores 102 containing the tool string 180 via a corresponding fluid flow control device 176 (or wellhead 178). Each pump unit 190 may include a fluid pump 192, a prime mover 193 for actuating the fluid pump 192, and perhaps a heat exchanger 195. In certain embodiments, the fluid pump 192 of the pump unit 190 may be fluidly connected to the fluid container 194 and to each fluid flow control device 176 (which may be or form a portion of the wellhead 178) via a plurality of conduits 196, which may be or form a fluid distribution manifold. In certain embodiments, pump-down and plug and perf operations may be performed in a selected wellbore 102 while stimulation operations are simultaneously performed in one or more other wellbores 102. Accordingly, when a wellbore 102 is selected to be plugged and perforated, the sealing and alignment assembly 189, the injection device 188, and the conveyance device 184 may be installed at and/or moved to the selected wellbore 102. Then, the tool string 180 may be conveyed through the wellbore 102 via the pump-down operations and utilized to perform the plug and perf operations.

In certain embodiments, the fracturing manifold 170 may include an arrangement of flow fittings and manual and remotely actuated fluid flow control valves 173, and may be configured to selectively isolate wellbores 102 by directing the treatment fluid from the common manifold 136 to a selected one or more of the wellbores 102 in which plug and perf operations have been completed and are ready to be fractured. Such operation of the fracturing manifold 170 (which may be automated or semi-automated using at least one controller, in certain embodiments) may improve the speed of transitioning between wellbores 102, and may reduce or eliminate manual adjustments, which may also reduce safety risks. Thus, the fracturing manifold 170 may be configured to facilitate "zipper" fracturing operations, which may provide improved (perhaps nearly continuous) utilization of the frac crew and equipment, resulting in substantial improvement to the effective use of the fracturing resources and, thus, to the overall economics of the well.

In certain embodiments, the wellsite system 100 may include one or more control centers 160, each having a controller 161 (e.g., a processing device, a computer, a programmable logic controller (PLC), etc.), which may be configured to monitor and provide control to one or more portions of the wellsite system 100. The controller(s) 161 may monitor and control corresponding equipment of the treatment fluid system, the pump-down system (e.g., the pump unit 190), the plug and perf system (e.g., the conveyance device 184, the tool string 180), and the flow control valve system (e.g., the fracturing manifold 170, the fluid flow control devices 174, 176). In certain embodiments, the controller(s) 161 may be communicatively connected to the various wellsite equipment described herein, and perhaps other equipment, and may be configured to receive sensor signals from and transmit control signals to such equipment to facilitate automated or semi-automated operations described herein. For example, the controller(s) 161 may be communicatively connected to and configured to monitor and control one or more portions of the mixers 109, 124, the pump units 150, 190, the common manifold 136, the fracturing manifold 170, the fluid flow control devices 174, 176, the injection device 188, the conveyance device 184, and/or various other wellsite equipment (not shown). The controller(s) 161 may store control commands, operational parameters and set-points, coded instructions, executable programs, and other data or information, including for implementing one or more aspects of the operations described herein. Communication between the control center(s) 160 (and the controller(s) 161) and the various wellsite equipment of the wellsite system 100 may be implemented via wired and/or wireless communication means. For clarity and ease of understanding, such communication means are not depicted, and a person having ordinary skill in the art will appreciate that such communication means are within the scope of the present disclosure.

A field engineer, equipment operator, or field operator 164 (collectively referred to hereinafter as a "wellsite operator")

may operate one or more components, portions, or systems of the wellsite equipment and/or perform maintenance or repair on the wellsite equipment. For example, the wellsite operator 164 may assemble the wellsite system 100, operate the wellsite equipment (e.g., via a controller 161) to perform the stimulation operations, check equipment operating parameters, and repair or replace malfunctioning or inoperable wellsite equipment, among other operational, maintenance, and repair tasks, collectively referred to hereinafter as wellsite operations. The wellsite operator 164 may perform wellsite operations by himself or with other wellsite operators.

In certain embodiments, the controller(s) 161 may be communicatively connected to one or more human-machine interface (HMI) devices, which may be utilized by the wellsite operator(s) 164 for entering or otherwise communicating the control commands to the controller(s) 161, and for displaying or otherwise communicating information from the controller(s) 161 to the wellsite operator(s) 164. In certain embodiments, the HMI devices may include one or more input devices 167 (e.g., a keyboard, a mouse, a joystick, a touchscreen, etc.) and one or more output devices 166 (e.g., a video monitor, a printer, audio speakers, etc.). In certain embodiments, the HMI devices may also include a mobile communication device(s) 168 (e.g., a smart phone).

In certain embodiments, one or more of the containers 112, 126, 194, the mixers 109, 124, the pump units 150, 190, the fracturing manifold 170, the conveyance device 184, and the control center(s) 160 may each be disposed on corresponding trucks, trailers, and/or other mobile carriers 122, 134, 198, 120, 132, 148, 197, 171, 185, 162, respectively, such as may permit their transportation to the wellsite 104. However, in certain embodiments, one or more of the containers 112, 126, 194, the mixers 109, 124, the pump units 150, 190, the fracturing manifold 170, the conveyance device 184, and the control center(s) 160 may each be skidded or otherwise stationary, and/or may be temporarily or permanently installed at the wellsite 104. In certain embodiments, the common manifold 136 and/or other equipment described herein or otherwise forming a portion of the system 100 may similarly be mobile, skidded, or otherwise installed at the wellsite 104.

Figure 2:
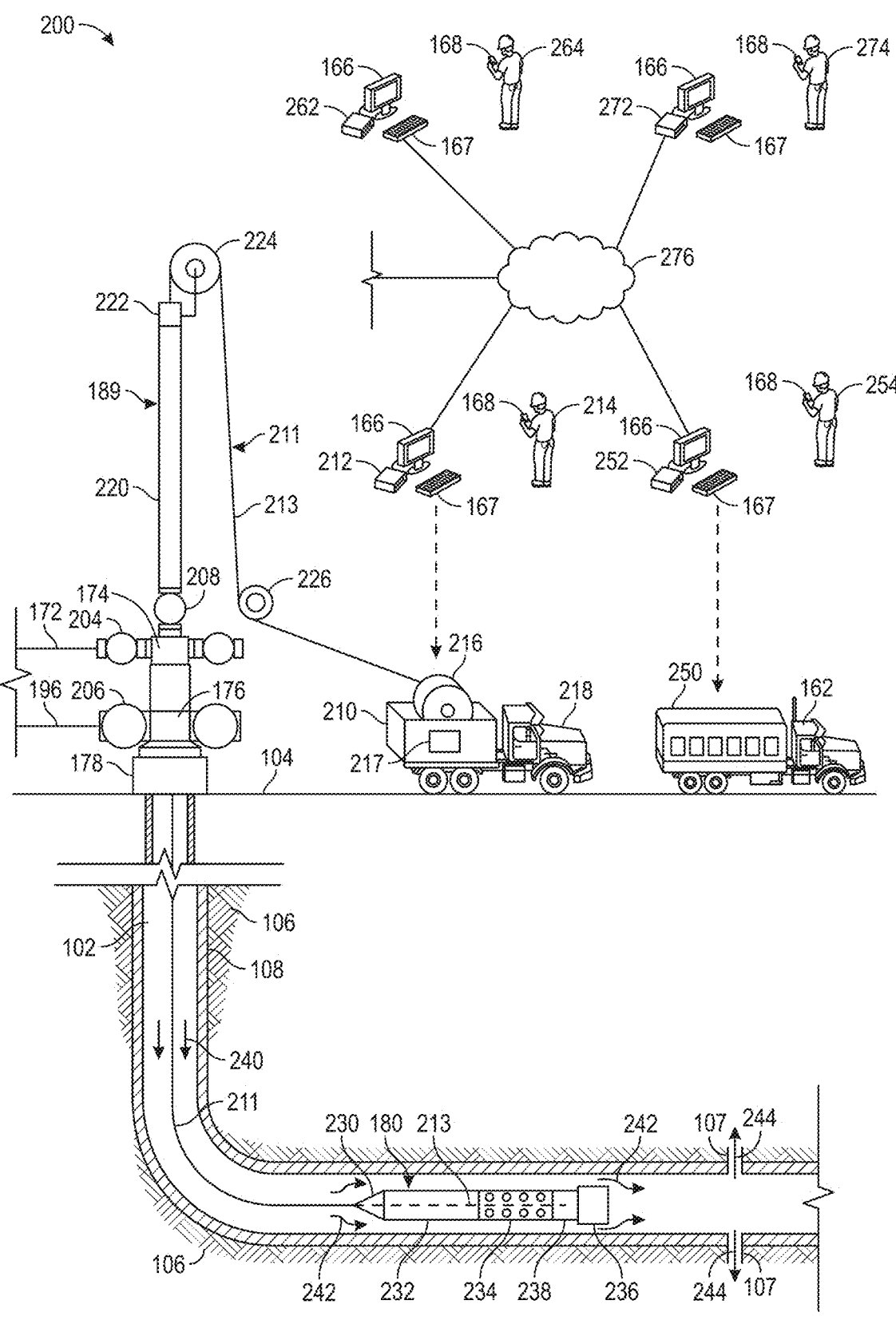
FIG. 2 is a schematic view of a portion of an example implementation of the wellsite system shown in FIG. 1, in accordance with embodiments of the present disclosure.

FIG. 2 is a schematic view of a portion of an example implementation of the wellsite system 100 shown in FIG. 1 and indicated in FIG. 2 by reference numeral 200. The wellsite system 200 shows some of the wellsite equipment of the wellsite system 100 shown in FIG. 1, including where indicated by the same reference numerals. The following description refers to FIGS. 1 and 2, collectively.

The wellsite system 200 includes one of the wellbores 102 extending from the surface of the wellsite 104 into the rock formation 106. In certain embodiments, the wellbore 102 may be capped by the wellhead 178 terminating the wellbore 102 at the surface of the wellsite 104. In certain embodiments, the fluid flow control devices 174, 176 may be mounted on top of the wellhead 178. In certain embodiments, the fluid flow control device 174 may be fluidly connected to the fracturing manifold 170 via a corresponding conduit 172. In certain embodiments, the fluid flow control device 176 may be fluidly connected to the pump unit 190 via a corresponding conduit 196. In certain embodiments, each fluid flow control device 174, 176 may include a plurality of manually and/or remotely (e.g., electrically, pneumatically, hydraulically) operated (i.e., actuated) fluid flow control valves, each configured to selectively open and close selected tubulars or pipes, such as the casing 108 extending within the wellbore 102, to a corresponding fluid conduit 172, 196. For example, the fluid flow control device 174 may include a remotely operated fluid flow control valve 204 (e.g., a wing valve) remotely configured to fluidly connect the conduit 172 to the wellbore 102 and, thus, fluidly connect the fracturing manifold 170 to the wellbore 102. In certain embodiments, the fluid flow control device 174 may further include a remotely operated access valve 208 (e.g., swab valve) remotely configured to open top of the fluid flow control device 174 to permit vertical access to the wellbore 102 by a tool string 180. In certain embodiments, the fluid flow control device 176 may include a remotely operated fluid flow control valve 206 (e.g., wing valve) remotely configured to fluidly connect the conduit 196 to the wellbore 102 and, thus, fluidly connect the pump unit 190 to the wellbore 102.

In certain embodiments, the tool string 180 may be conveyed through the wellbore 102 via a conveyance line 211 operably coupled with a winch conveyance device 210. In certain embodiments, the conveyance line 211 may be operably connected to the conveyance device 210 that is configured to apply an adjustable tension to the tool string 180 via the conveyance line 211 to convey the tool string 180 through the wellbore 102. In certain embodiments, the conveyance device 210 may be or include a winch conveyance system including a reel or drum 216 storing thereon a wound length of the conveyance line 211. In certain embodiments, the drum 216 may be rotated by a rotary actuator 217 (e.g., an electric motor, a hydraulic motor, etc.) to selectively unwind and wind the conveyance line 211 to apply an adjustable tensile force to the tool string 180 to selectively convey the tool string 180 along the wellbore 102. In certain embodiments, the conveyance device 210 may be carried by a truck, trailer, or another vehicle 218.

In certain embodiments, the pump unit 190 may be configured to inject a fluid (e.g., water) into each wellbore 102 via the conduits 196 to perform pump-down operations to convey the tool string 180 to an intended depth along the wellbore 102. The pump-down operations may be utilized to move the tool string 180 along the wellbore 102 to facilitate the plug and perf operations. As described herein, the tool string 180 may be conveyed through the wellbore 102 to fluidly isolate an upper portion of the wellbore 102 extending through an upper formation zone that has not yet been perforated from a lower portion of the wellbore 102 extending through a lower formation zone that has already been perforated, and then perforate the upper formation zone.

In certain embodiments, the conveyance device 210 may include a controller 212 communicatively connected to the winch device 210 and the tool string 180, such as may permit the controller 212 to receive sensor signals from and transmit control signals to such equipment to convey the tool string 180 downhole and perform various downhole operations described herein. In certain embodiments, the controller 212 may be electrically or otherwise communicatively connected to the rotary actuator 217 of the drum 216 to selectively unwind and wind the conveyance line 211 to apply an adjustable tensile force to the tool string 180 to selectively convey the tool string 180 into and out of the wellbore 102. In certain embodiments, the controller 212 may be electrically or otherwise communicatively connected to the tool string 180 via a conductor 213 extending through at least a portion of the tool string 180, through the conveyance line 211, and externally from the conveyance line 211 at the wellsite surface 104 via a rotatable joint or coupling (e.g., a collector) carried by the drum 216. In certain embodiments, the conductor 213 may transmit and/or receive electrical power, data, and/or control signals between the controller 212 and one or more portions of the tool string 180. In certain embodiments, the controller 212 may be communicatively connected to the tool string 180 and/or various portions thereof, such as various sensors and actuators of the tool string 180, via the conductor 213 to facilitate monitoring and/or control operations of the tool string 180.

The controller 212 may be communicatively connected to one or more HMI devices, which may be utilized by a wellsite operator 214 (e.g., tool string operator, winch conveyance system 210 operator) for entering or otherwise communicating control commands to the controller 212, and for displaying or otherwise communicating information from the controller 212 to the wellsite operator 214. The HMI devices may include one or more input devices 167 and one or more output devices 166. The HMI devices may also include a mobile communication device 168 carried by the wellsite operator 214.

In certain embodiments, the tool string 180 may be deployed into or retrieved from the wellbore 102 through the fluid flow control devices 174, 176, the access valve 208, and a sealing and alignment assembly 189 mounted above the access valve 208 and configured to seal the conveyance line 211 during deployment, conveyance, intervention, and other wellsite operations performed by the tool string 180. In certain embodiments, the sealing and alignment assembly 189 may include a lock chamber 220 (e.g., a lubricator, an airlock, a riser) mounted above the access valve 208, a stuffing box 222 configured to seal around the line 211 at the top of the lock chamber 220, and an injection device 224 (i.e., a pulley) configured to guide the line 211 into the stuffing box 222. In certain embodiments, a guide pulley 226 may guide the line 211 between the injection device 224 and the conveyance device 210. In certain embodiments, the stuffing box 222 may be configured to seal around an outer surface of the line 211, such as via annular packings applied around the surface of the line 211 and/or by injecting a fluid between the outer surface of the line 211 and an inner wall of the stuffing box 222.

In certain embodiments, the conveyance line 211 may be or include a flexible conveyance line, such as a wire, a cable, a wireline, a slickline, a multiline, an e-line, and/or other conveyance means. In certain embodiments, the conveyance line 211 may include one or more metal support wires or cables configured to support the weight of the downhole tool string 180. In certain embodiments, the conveyance line 211 may also include one or more electrical and/or optical conductors 213 configured to transmit electrical energy (i.e., electrical power) and electrical and/or optical signals (e.g., information, data) therethrough, such as may permit the transmission of electrical energy, data, and/or control signals between the tool string 180 and the controller 212.

In certain embodiments, the tool string 180 may include a cable head 230 physically and/or electrically connecting the conveyance line 211 to the tool string 180, such as may permit the tool string 180 to be suspended and conveyed through the wellbore 102 via the conveyance line 211. In certain embodiments, the cable head 230 may provide telemetry and/or power distribution to the tool string 180. The tool string 180 may include at least a portion of one or more downhole devices, modules, subs, and/or other tools 232 configured to perform intended downhole operations. In certain embodiments, the tools 232 of the tool string 180 may include a telemetry/control tool, such as may facilitate communication between the tool string 180 and the controller 212 and/or control of one or more portions of the tool string 180. In certain embodiments, the telemetry/control tool may include a downhole controller (not shown) communicatively connected to the controller 212 via the conductor 213 and to other portions of the tool string 180. In certain embodiments, the tools 232 of the tool string 180 may further include one or more inclination and/or directional sensors, such as one or more accelerometers, magnetometers, gyroscopic sensors (e.g., micro-electro-mechanical system (MEMS) gyros), and/or other sensors for determining the orientation and/or direction of the tool string 180 within the wellbore 102. In certain embodiments, the tools 232 of the tool string 180 may also include a depth correlation tool, such as a casing collar locator (CCL) for detecting ends of casing collars by sensing a magnetic irregularity caused by the relatively high mass of an end of a collar of the casing 108. In certain embodiments, the depth correlation tool may also or instead be or include a gamma ray (GR) tool that may be utilized for depth correlation.

In certain embodiments, the tool string 180 may also include one or more perforating guns or tools 234 configured to perforate or form holes through the casing 108, the cement, and the portion of the formation 106 surrounding the wellbore 102 to prepare the well for fracturing. In certain embodiments, each perforating tool 234 may contain one or more shaped explosive charges operable to perforate the casing 108, the cement, and the formation 106 upon detonation. In certain embodiments, the tool string 180 may also include a plug 236 and a plug setting tool 238 that, when activated, sets the plug 236 at a predetermined position within the wellbore 102, such as to isolate or seal an upper portion (e.g., zone) of the wellbore 102 from a lower portion (e.g., zone) of the wellbore 102 and, in certain embodiments, disconnects the borehole assembly (BHA) from the plug 236. The plug 236 may be permanent or retrievable, facilitating the lower portion (e.g., zone) of the wellbore 102 to be permanently or temporarily isolated or sealed from the upper portion (e.g., zone) of the wellbore 102 before perforating operations.

In certain embodiments, the treatment fluid system may further include a control center 250 containing a controller 252 (e.g., a processing device, a computer, a PLC, etc.), which may be configured to monitor and provide control to one or more portions of the treatment fluid system. The controller 252 may be communicatively connected to the various equipment of the treatment fluid system and may be configured to receive sensor signals from and transmit control signals to such equipment to facilitate automated or semi-automated operations described herein. For example, the controller 252 may be communicatively connected to and configured to monitor and control one or more portions of the mixers 109, 124, the pump units 150, the common manifold 136, and/or various other wellsite equipment (not shown). The controller 252 may store control commands, operational parameters and set-points, coded instructions, executable programs, and other data or information, including for implementing one or more aspects of the operations described herein. Communication between the control center 250 (and the controller 252) and the various equipment of the treatment fluid system may be implemented via wired and/or wireless communication means. For clarity and ease of understanding, such communication means are not depicted, and a person having ordinary skill in the art will appreciate that such communication means are within the scope of the present disclosure.

In certain embodiments, the controller 252 may be communicatively connected to one or more HMI devices, which may be utilized by a wellsite operator 254 (e.g., fracturing system operator) for entering or otherwise communicating control commands to the controller 252, and for displaying or otherwise communicating information from the controller 252 to the wellsite operator 254. In certain embodiments, the HMI devices may include one or more input devices 167 and one or more output devices 166. In addition, in certain embodiments, the HMI devices may also include a mobile communication device 168 carried by the wellsite operator 254.

In certain embodiments, the pump-down system may further include a controller 262 (e.g., a processing device, a computer, a PLC, etc.) disposed in association with the pump unit 190 and/or fluid container 194. The controller 262 may be configured to monitor and provide control to one or more portions of the pump-down system. The controller 262 may be communicatively connected to the various equipment of the pump-down system and may be configured to receive sensor signals from and transmit control signals to such equipment to facilitate automated or semi-automated operations described herein. For example, the controller 262 may be communicatively connected to and configured to monitor and control one or more portions of the pump unit 190, the fluid container 194, and/or various other wellsite equipment (not shown). The controller 262 may store control commands, operational parameters and set-points, coded instructions, executable programs, and other data or information, including for implementing one or more aspects of the operations described herein. Communication between the controller 262 and the equipment of the pump-down system may be implemented via wired and/or wireless communication means. For clarity and ease of understanding, such communication means are not depicted, and a person having ordinary skill in the art will appreciate that such communication means are within the scope of the present disclosure.

In certain embodiments, the controller 262 may be communicatively connected to one or more HMI devices, which may be utilized by a wellsite operator 264 (e.g., pump-down operator) for entering or otherwise communicating control commands to the controller 262, and for displaying or otherwise communicating information from the controller 262 to the wellsite operator 264. In certain embodiments, the HMI devices may include one or more input devices 167 and one or more output devices 166. In addition, in certain embodiments, the HMI devices may also include a mobile communication device 168 carried by the wellsite operator 264.

In certain embodiments, the wellsite systems 100, 200 may further include a central controller 272 (e.g., a processing device, a computer, a PLC, etc.) configured to monitor and provide control to one or more portions of the wellsite systems 100, 200. The controller 272 may store control commands, operational parameters and set-points, coded instructions, executable programs, and other data or information, including for implementing one or more aspects of the operations described herein. The controller 272 may be communicatively connected to the various equipment of the wellsite systems 100, 200 and may be configured to receive sensor signals from and transmit control signals to such equipment to facilitate automated or semi-automated operations described herein. For example, in certain embodiments, the controller 272 may be communicatively connected to the controller 212 and configured to monitor and control one or more portions of the plug and perf system (e.g., the conveyance device 210, the tool string 180) via the controller 212. In addition, in certain embodiments, the controller 272 may be further communicatively connected to the controller 252 and configured to monitor and control one or more portions of the treatment fluid system (e.g., the mixers 109, 124, the pump units 150) via the controller 252. In addition, in certain embodiments, the controller 272 may be further communicatively connected to the controller 262 and configured to monitor and control one or more portions of the pump-down system (e.g., the pump unit 190, the fluid container 194) via the controller 262. In addition, in certain embodiments, the controller 272 may be further communicatively connected to the fluid flow control devices 174, 176 (e.g., the fluid flow control valves 204, 206) and the access valve 208 associated with each wellbore 102 and the fracturing manifold 170 (e.g., fluid flow control valves 173), such as may permit the controller 272 to monitor and control the fluid flow control devices 174, 176, the access valves 208, and the fracturing manifold 170. The controller 272 may, thus, monitor and/or control injection of treatment fluid via the fluid flow control device 174 and injection of water or other fluid via the fluid flow control device 176 into one or more selected wellbores 102.

Communication between the controller 272 and the controllers 212, 252, 262, the fluid flow control devices 174, 176, the access valves 208, and the fracturing manifold 170 may be implemented via wired and/or wireless communication network 276 (e.g., a local area network (LAN), a wide area network (WAN), the internet, etc.). For clarity and ease of understanding, details of such communication means are not depicted, and a person having ordinary skill in the art will appreciate that such communication means are within the scope of the present disclosure.

In certain embodiments, the controller 272 may be communicatively connected to one or more HMI devices, which may be utilized by a wellsite operator 274 for entering or otherwise communicating control commands to the controller 272, and for displaying or otherwise communicating information from the controller 272 to the wellsite operator 274. In certain embodiments, the HMI devices may include one or more input devices 167 and one or more output devices 166. In addition, in certain embodiments, the HMI devices may also include a mobile communication device 168 carried by the wellsite operator 274. In certain embodiments, the controller 272, the HMI devices 166, 167, and the wellsite operator 274 may be located at the wellsite surface 104. For example, the controller 272 may be installed or housed in a control center (e.g., a facility, a trailer, etc.) housing one of the other controllers 212, 252, 262. However, the controller 272, the HMI devices 166, 167, and the wellsite operator 274 may also or instead be located off-site (e.g., a data center) at a distance from the wellsite surface 104.

As described herein, the central controller 272 and/or the wellsite operator 274 using the central controller 272 may monitor and provide control to one or more portions of the wellsite systems 100, 200 via direct communication with selected wellsite equipment and/or indirect communication with selected wellsite equipment via dedicated equipment controllers 212, 252, 262 for controlling such wellsite equipment. For example, during pump-down operations, after the tool string 180 is made up and positioned within a selected one of the wellbores 102 below the wellhead 178, the controller 272 and/or the wellsite operator 274 using the controller 272 may initialize operation of the pump unit 190 to pump a fluid (e.g., water) from the fluid container 194. The controller 272 and/or the wellsite operator 274 may also cause the remotely operated fluid valve 206 of the fluid flow control device 176 to open to permit the fluid to be injected into the wellbore 102 containing the tool string 180. The fluid may be injected into the wellbore 102 when the tool string 180 is conveyed within a vertical portion of the wellbore 102 just below the fluid flow control device 176 or when the tool string 180 stops descending within the wellbore 102 by way of gravity. The fluid injected into the wellbore 102 may flow downhole, as indicated by arrows 240, thereby forming an increased pressure zone behind (i.e., uphole from) the tool string 180 that is greater than fluid pressure in front of (i.e., downhole from) the tool string 180. Such pressure differential may push or otherwise impart a downhole-directed force operable to move the tool string 180 in the downhole direction. The fluid flowing downhole 240 may also or instead cause friction or drag while the fluid flows around or past the tool string 180, as indicated by arrows 242. The friction may drag or otherwise impart a downhole-directed force operable to move the tool string 180 in the downhole direction. During the pump-down operations, the fluid passing 242 the tool string 180 may escape from the wellbore 102 into the formation 106 in front of the tool string 180 via previously made perforations 107, as indicated by arrows 244, thereby permitting the fluid pumped into the wellbore 102 to continually flow around or past the tool string 180 until the tool string 180 is conveyed to an intended depth within the wellbore 102.

In certain embodiments, while the fluid is being injected into the wellbore 102 by the fluid pump unit 190 during the pump-down operations, the controller 272 and/or the wellsite operator 274 may operate the conveyance device 210 to selectively rotate the drum 216 to unwind the conveyance line 211 to permit the pumped fluid to move the tool string 180 downward along the wellbore 102 at an intended speed and to an intended depth. In certain embodiments, after the tool string reaches the intended depth, the controller 272 and/or the wellsite operator 274 may shut off the pump unit 190 and close the fluid flow control valve 206.

In certain embodiments, while the fluid is being injected into the wellbore 102 by the fluid pump unit 190 during the pump-down operations, the controller 272 and/or the wellsite operator 274 may also operate the treatment fluid system to mix and pump the treatment fluid, open the fluid flow control valve 204 of the fluid flow control device 174, and operate a corresponding fluid flow control valve 173 of the fracturing manifold 170 of one or more of the other wellbores 102 not undergoing the pump-down operations to direct the treatment fluid therein.

In certain embodiments, after the plug and perf operations of the wellbore 102 are complete, the controller 272 and/or the wellsite operator 274 may operate the conveyance device 210 to pull the tool string 180 out of the wellbore 102 through the fluid flow control devices 174, 176 and close the access valve 208. Thereafter, the controller 272 and/or the wellsite operator 274 may operate the treatment fluid system to mix and pump the treatment fluid, open the fluid flow control valve 204 of the fluid flow control device 174, and operate a corresponding fluid flow control valve 173 of the fracturing manifold 170 to direct the treatment fluid into the newly perforated wellbore 102.

Figure 3:
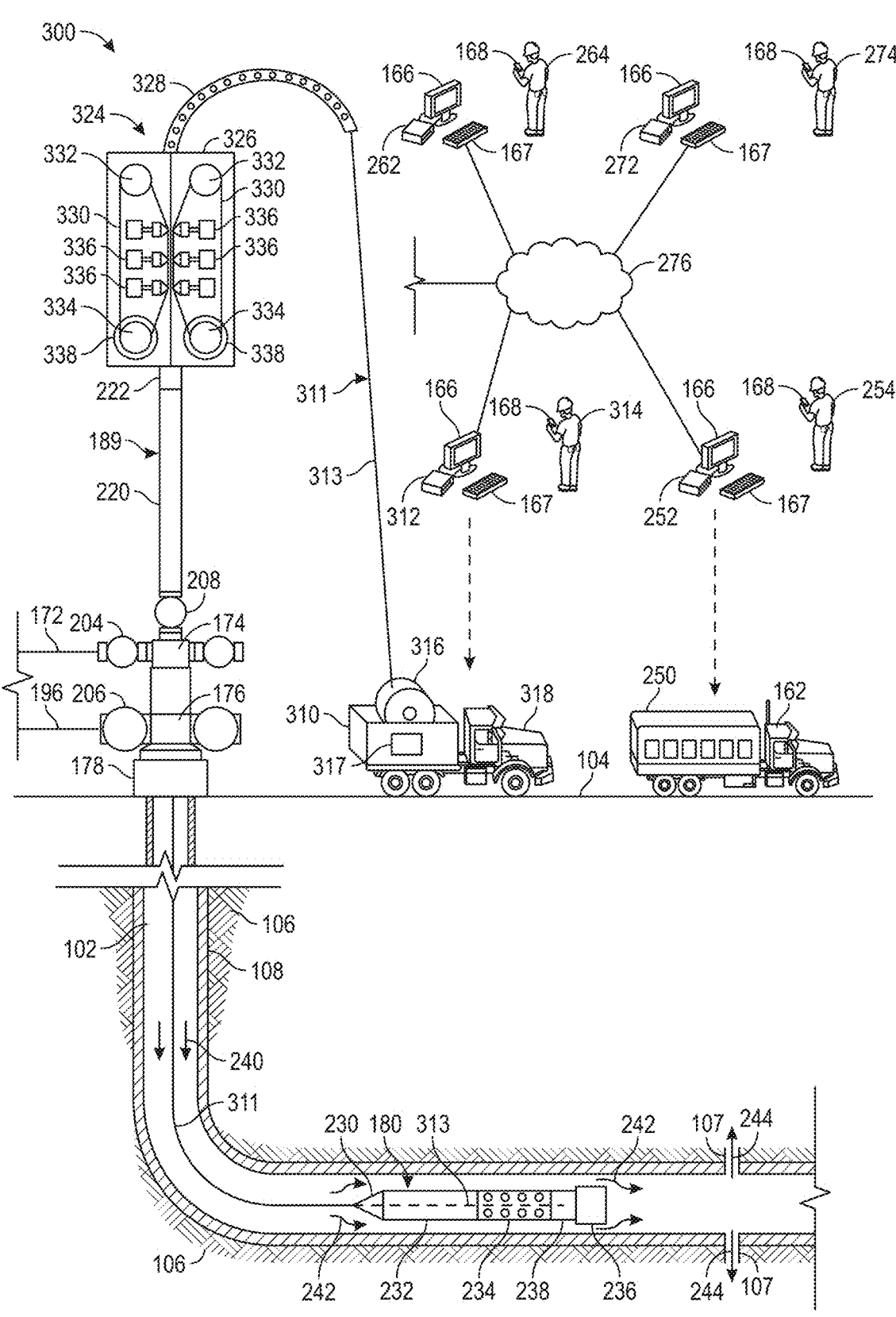
FIG. 3 is a schematic view of a portion of an example implementation of the wellsite system shown in FIG. 1, in accordance with embodiments of the present disclosure.

FIG. 3 is a schematic view of a portion of an example implementation of the wellsite system 100 shown in FIG. 1 and indicated in FIG. 3 by reference numeral 300. The wellsite system 300 shows some of the wellsite equipment of the wellsite systems 100, 200 shown in FIGS. 1 and 2, respectively, including where indicated by the same reference numerals. The following description refers to FIGS. 1 and 3, collectively.

The wellsite system 300 includes one of the wellbores 102 extending from the surface of the wellsite 104 into the formation 106. In certain embodiments, the wellbore 102 may be capped by the wellhead 178 terminating the wellbore 102 at the surface of the wellsite 104. In certain embodiments, the fluid flow control devices 174, 176 may be mounted on top of the wellhead 178. In certain embodiments, the fluid flow control device 174 may be fluidly connected to the fracturing manifold 170 via a corresponding conduit 172. In certain embodiments, the fluid flow control device 176 may be fluidly connected to the pump unit 190 via a corresponding conduit 196.

In certain embodiments, the tool string 180 may be conveyed through the wellbore 102 via a conveyance line 311 carried by a line storage device 310, which may include a reel or drum 316 storing thereon a wound length of the conveyance line 311. In certain embodiments, the drum 316 may be rotated by a rotary actuator 317 (e.g., an electric motor, a hydraulic motor, etc.) to selectively unwind and wind the conveyance line 311. In certain embodiments, the line storage device 310 may be carried by a truck, trailer, or another vehicle 318.

In certain embodiments, the tool string 180 may be deployed into or retrieved from the wellbore 102 through the fluid flow control devices 174, 176, the access valve 208, and the sealing and alignment assembly 189 that is mounted above the access valve 208 and configured to seal the conveyance line 311 during deployment, conveyance, intervention, and other wellsite operations performed by the tool string 180. In certain embodiments, the sealing and alignment assembly 189 may include a lock chamber 220 (e.g., a lubricator, an airlock, a riser) mounted above the access valve 208, a stuffing box 222 configured to seal around the line 311 at the top of the lock chamber 220, and an injection device 324 (i.e., coiled tubing injector) configured to guide the line 311 into the stuffing box 222. In certain embodiments, the stuffing box 222 may be configured to seal around an outer surface of the line 311, such as via annular packings applied around the surface of the line 311 and/or by injecting a fluid between the outer surface of the line 311 and an inner wall of the stuffing box 222.

In certain embodiments, the conveyance line 311 may be or include coiled tubing. In certain embodiments, the conveyance line 311 may include or contain one or more electrical and/or optical conductors 313 configured to transmit electrical energy (i.e., electrical power) and electrical and/or optical signals (e.g., information, data), such as may permit the transmission of electrical energy, data, and/or control signals between the tool string 180 and the line storage device 310.

In certain embodiments, the injection device 324 may be or include an injector head 326 configured to run and retrieve the line 311 into and out of the wellbore 102. In certain embodiments, a gooseneck 328 may be mounted on top of the injector head 326 to feed or direct a line 311 around a controlled radius into the injector head 326. In certain embodiments, the injector head 326 may include opposing circulating members, such as may be configured to compress or otherwise grip the line 311 to support the weight of the downhole tool string 180 within the wellbore 102. For example, the injector head 326 may be a belt-type injector head including a pair of opposing belts 330 circulated by upper and lower rollers 332, 334. In certain embodiments, a corresponding set of cylinders 336 may push each belt 330 against the line 311 to maintain a sufficient pressure and, thus, friction between the belts 330 and an outer surface of the line 311 to grip the line 311. In certain embodiments, the belts 330 may include rubber, such as EPDM (ethylene propylene diene monomer). However, other embodiments of the injector head 326 may include chains instead of the belts 330. In certain embodiments, the injector head 326 may be mounted to or otherwise above the stuffing box 222 configured to fluidly seal against the line 311 while it exits or enters the injector head 326.

One or more of the rollers 332, 334 may be operated by a corresponding motor 338 mechanically connected to the rollers 332, 334. A gear box or transmission (not shown) may be mechanically or otherwise operatively connected between each motor 338 and the corresponding rollers 332, 334, such as may facilitate control of rotational speed and torque applied to the rollers 332, 334. When the motors 338 are implemented as hydraulic motors, a pump may be driven by an engine or an electric motor (neither shown) to supply hydraulic energy. The hydraulics system may provide variable speed commands. When the motors 338 are implemented as electrical motors, the motors 338 may be electrically connected to an electrical motor controller (e.g., a variable frequency drive, a chopper) (not shown) configured to control the speed and/or torque of the motors 338, such as by controlling the frequency and/or the amplitude of the electrical energy supplied to the motors 338. Although the injector head 326 is shown mounted above the lock chamber 220 and the stuffing box 222, the injector head 326 may be installed or otherwise disposed within the pressure contained volume of the lock chamber 220, below the stuffing box 222.

In certain embodiments, the line storage device 310 and the injection device 324 may include or be associated with a controller 312 communicatively connected to the line storage device 310 and the injection device 324, such as may permit the controller 312 to receive sensor signals from and transmit control signals to such equipment to perform various downhole operations described herein. In certain embodiments, the controller 312 may be electrically or otherwise communicatively connected to the rotary actuator 317 of the drum 316 and to the motors 338 of injection device 324 to selectively unwind and wind the conveyance line 311 to apply an adjustable compressive and tensile force to the line 311 to selectively convey the tool string 180 into and out of the wellbore 102. In certain embodiments, the controller 312 may be electrically or otherwise communicatively connected to the tool string 180 via a conductor 313 extending through at least a portion of the tool string 180, through the conveyance line 311, and externally from the conveyance line 311 at the wellsite surface 104 via a rotatable joint or coupling (e.g., a collector) carried by the drum 316. In certain embodiments, the conductor 313 may transmit and/or receive electrical power, data, and/or control signals between the controller 312 and one or more portions of the tool string 180. In certain embodiments, the controller 312 may be communicatively connected to the tool string 180 and/or various portions thereof, such as various sensors and actuators of the tool string 180, via the conductor 313 to facilitate monitoring and/or control operations of the tool string 180.

In certain embodiments, the controller 312 may be communicatively connected to one or more HMI devices, which may be utilized by a wellsite operator 314 (e.g., tool string operator, coiled tubing system operator, injector head operator) for entering or otherwise communicating control commands to the controller 312, and for displaying or otherwise communicating information from the controller 312 to the wellsite operator 314. In certain embodiments, the HMI devices may include one or more input devices 167 and one or more output devices 166. In addition, in certain embodiments, the HMI devices may also include a mobile communication device 168 carried by the wellsite operator 314.

In certain embodiments, the wellsite systems 100, 300 may further include a central controller 272 configured to monitor and provide control to one or more portions of the wellsite systems 100, 300. The controller 272 may be communicatively connected to the various equipment of the wellsite systems 100, 300 and may be configured to receive sensor signals from and transmit control signals to such equipment to facilitate automated or semi-automated operations described herein. For example, in certain embodiments, the controller 272 may be communicatively connected to the controller 312 and configured to monitor and control one or more portions of the plug and perf system (e.g., the line storage device 310, the injector head 324, and the tool string 180) via the controller 312. In addition, in certain embodiments, the controller 272 may be further communicatively connected to the controller 252 and configured to monitor and control one or more portions of the treatment fluid system via the controller 252. In addition, in certain embodiments, the controller 272 may be further communicatively connected to the controller 262 and configured to monitor and control one or more portions of the pump-down system (e.g., the pump unit 190, the fluid container 194) via the controller 262. In addition, in certain embodiments, the controller 272 may also be communicatively connected to the fluid flow control devices 174, 176 (e.g., the fluid flow control valves 204, 206) and access valve 208 associated with each wellbore 102 and with the fracturing manifold 170 (e.g., fluid flow control valves 173), such as may permit the controller 272 to monitor and control the fluid flow control devices 174, 176 and the fracturing manifold 170. The controller 272 may, thus, monitor and/or control injection of treatment fluid via the fluid flow control device 174 and injection of water or other fluid via the fluid flow control device 176 into one or more selected wellbores 102.

Communication between the controller 272 and the controllers 312, 252, 262, the fluid flow control devices 174, 176, the access valve 208, and the fracturing manifold 170 may be implemented via wired and/or wireless communication network 276 (e.g., a local area network (LAN), a wide area network (WAN), the internet, etc.). For clarity and ease of understanding, details of such communication means are not depicted, and a person having ordinary skill in the art will appreciate that such communication means are within the scope of the present disclosure.

As described herein, the central controller 272 and/or the wellsite operator 274 using the central controller 272 may be configured to monitor and provide control to one or more portions of the wellsite systems 100, 300 via direct communication with wellsite equipment and/or indirect communication with wellsite equipment via dedicated equipment controllers 312, 252, 262 for controlling corresponding wellsite equipment.

In certain embodiments, the line storage device 310 and the injector head 324 may be collectively operated by the central controller 272 and/or the wellsite operator 274 using the central controller 272 to convey the tool string 180 through the wellbore 102 without pumping the fluid into the wellbore 102. In certain embodiments, the conveyance line 311 may be sufficiently rigid to permit conveyance of the tool string 180 to an intended depth along the wellbore 102, including in a deviated or horizontal portion of the wellbore 102. During such conveyance operations, the central controller 272 and/or the wellsite operator 274 using the central controller 272 may operate the line storage device 310 to selectively rotate the drum 316 to unwind the conveyance line 311 and to inject the conveyance line 311 into the wellbore 102 via the injection device 324 to push or otherwise move the tool string 180 downhole along the wellbore 102 at an intended speed and to an intended depth.

In certain embodiments, while the plug and perf operations of the wellbore 102 are being performed, the controller 272 and/or the wellsite operator 274 may also operate the treatment fluid system to mix and pump the treatment fluid, open the fluid flow control valve 204 of the fluid flow control device 174, and operate a corresponding fluid flow control valve 173 of the fracturing manifold 170 of one or more of the other wellbores 102 not undergoing the plug and perf operations to direct the treatment fluid therein. In certain embodiments, after the plug and perf operations of the wellbore 102 are complete, the central controller 272 and/or the wellsite operator 274 using the central controller 272 may operate the fracturing manifold 170 to direct the treatment fluid into such wellbore 102 and/or operate the fluid access valve 204 of the fluid flow control device 174 associated with such wellbore 102 to permit the treatment fluid to be injected into the newly perforated wellbore 102.

Figure 4:
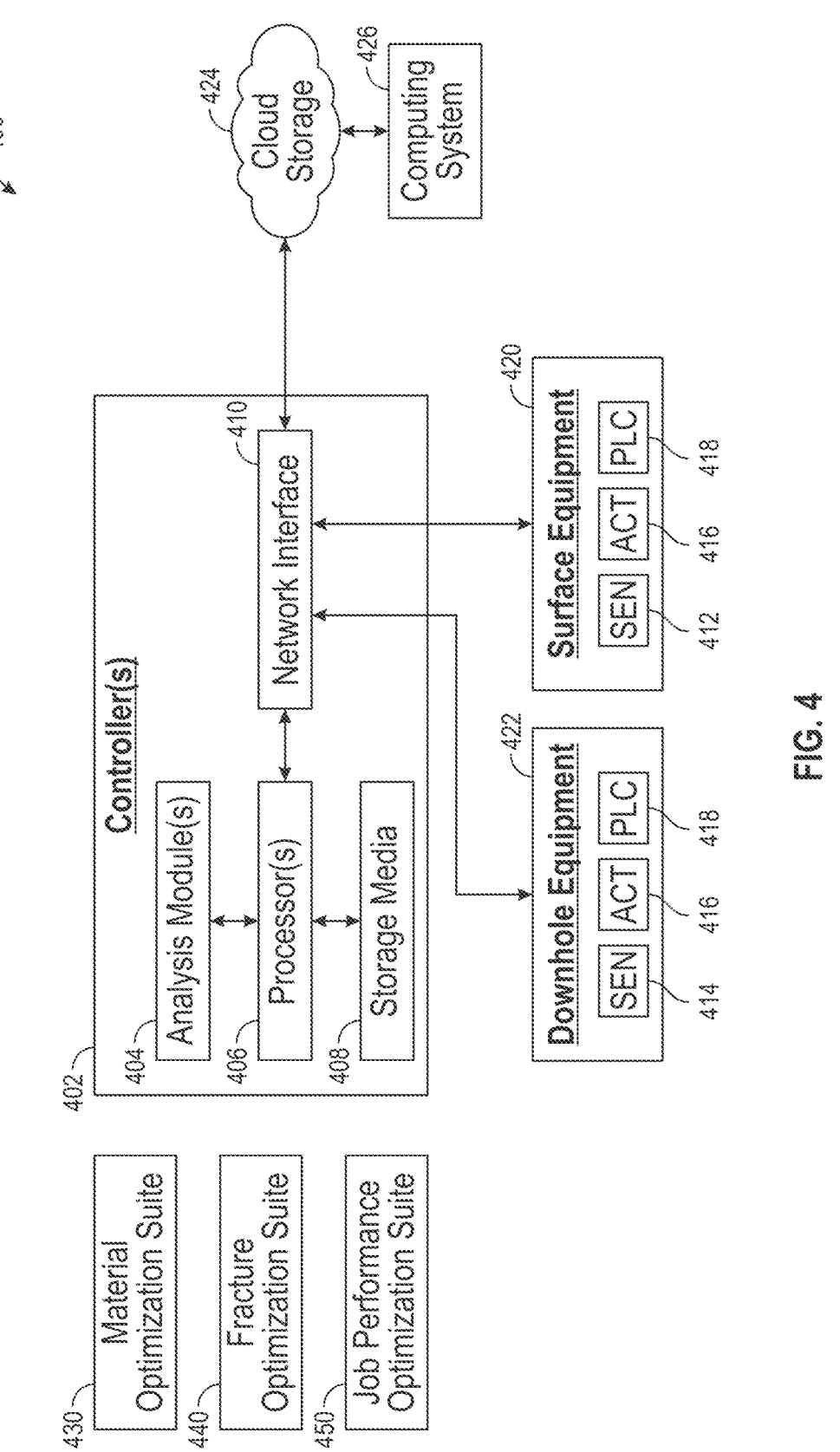
FIG. 4 illustrates a control system configured to control operations of the wellsite systems of FIGS. 1-3, in accordance with embodiments of the present disclosure.

The present disclosure is further directed to an example monitoring and control system (or apparatus) (hereinafter "control system") for monitoring and controlling various wellsite equipment of the wellsite systems 100, 200, 300 to perform processes, operations, and methods described herein, including providing multiple advisors and algorithms that may be used individually, or together, to help to achieve optimal fracture performance, with an optimal amount of materials used, and with the avoidance of any detrimental situations during the stimulation job, such as screenouts. To that end, as illustrated in FIG. 4, in certain embodiments, a control system 400 may include various controllers 402 (e.g., which may include the controllers 161, 212, 252, 262, 272, 312 described above with respect to FIGS. 1-3), each of which may include one or more analysis modules 404 (e.g., a program of computer-executable instructions and associated data) that may be configured to perform various functions of the embodiments described herein. In certain embodiments, to perform these various functions, the one or more analysis modules 404 may execute on one or more processors 406 of the controller(s) 402, which may be connected to one or more storage media 408 of the controller(s) 402. Indeed, in certain embodiments, the one or more analysis modules 404 may be stored in the one or more storage media 408.

As described in greater detail herein, the one or more analysis modules 404 may be initiated and implemented in a modular manner to optimize parameters of a hydraulic stimulation job, and to provide advice regarding one or more adjustments to the parameters of the hydraulic stimulation job in substantially real-time during performance of the hydraulic stimulation job. Each of these analysis modules 404 may be configured to be executed separately or in combination with each other. For example, the outputs of certain analysis modules 404 may be used as inputs for other analysis modules 404. In such embodiments, in addition to performing their specific functions, the analysis modules 404 may also be configured to convert, filter, and otherwise process data produced by the respective analysis modules 404 such that the processed data may be used by the other analysis modules 404. For example, the various analysis modules 404 may use module-specific data structures, application programming interfaces (API), and so forth, and the analysis modules 404 may be configured to modify the data produced by the respective analysis modules 404 such that the other analysis modules 404 may utilize such data. In certain embodiments, the analysis modules 404 may be categorized into three categories comprising material loading optimization, fracture optimization, and job performance optimization.

As described in greater detail herein, in certain embodiments, the analysis modules 404 may include algorithms configured to calculate a fluid friction contribution to downhole pressure during pumping, based on automated instantaneous shut-in pressure (ISIP) detection, of the hydraulic stimulation job. In addition, in certain embodiments, the analysis modules 404 may include algorithms configured to utilize a bottom hole pressure calculated with precise friction pressures to predict a screenout. In addition, in certain embodiments, the analysis modules 404 may include algorithms, based on a trained model, configured to advise how and when to reduce an amount of friction reducing fluid additives to pump during the hydraulic stimulation job to minimize an amount of fluid additives required. In addition, in certain embodiments, the analysis modules 404 may include algorithms configured to create actionable insights to optimize a completion to maximize cluster efficiency based on stress shadow indicator analysis utilizing a combination of instantaneous shut-in pressure (ISIP) and near wellbore pressure loss components. In addition, in certain embodiments, the analysis modules 404 may include algorithms configured to estimate cluster efficiency using analysis of water hammers in high-frequency pressure signals and simulated cluster distributions. In addition, in certain embodiments, the analysis modules 404 may include algorithms configured to advise when to pump a diverter in a treatment and how to optimize a design and/or volume of the diverter. In addition, in certain embodiments, the analysis modules 404 may include algorithms configured to provide advice in substantially real-time relating to how to optimize fracture placement. In addition, in certain embodiments, the analysis modules 404 may include algorithms configured to provide advice relating to optimal perforation design yielding perforation depth and/or number of stages utilizing physics-based reservoir and rock quality indicators such as bulk density, gamma ray, in situ stress, Young's Modulus, water saturation, or some combination thereof. In addition, in certain embodiments, the analysis modules 404 may include algorithms configured to provide advice relating to optimal perforation design yielding perforation depth and/or number of stages utilizing a data-based predictive model utilizing machine learning. In addition, in certain embodiments, the analysis modules 404 may include algorithms configured to predict a success of proppant placement with a predictive model trained on historical data. In addition, in certain embodiments, the analysis modules 404 may include algorithms configured to predict completion pipe deformation using high-frequency pressure measurements. In addition, in certain embodiments, the analysis modules 404 may include algorithms configured to predict a most lucrative well, in terms of operational efficiency and cost, for execution in fracturing, stimulation, perforating, or some combination thereof. In addition, in certain embodiments, the analysis modules 404 may include algorithms configured to create a Green House Gas (GHG) Intensity Index for identifying wells with lowest predicted GHG emissions. In addition, in certain embodiments, the analysis modules 404 may include algorithms configured to create a Placement Quality Index (PQI), as described in greater detail herein.

In certain embodiments, the one or more processors 406 may include a microprocessor, a microcontroller, a processor module or subsystem, a programmable integrated circuit, a programmable gate array, a digital signal processor (DSP), or another control or computing device. In certain embodiments, the one or more processors 406 may include machine learning and/or artificial intelligence (AI) based processors. In certain embodiments, the one or more storage media 408 may be implemented as one or more non-transitory computer-readable or machine-readable storage media. In certain embodiments, the one or more storage media 408 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the computer-executable instructions and associated data of the analysis module(s) 404 may be provided on one computer-readable or machine-readable storage medium of the storage media 408, or alternatively, may be provided on multiple computer-readable or machine-readable storage media distributed in a large system having possibly plural nodes. Such computer-readable or machine-readable storage medium or media are considered to be part of an article (or article of manufacture), which may refer to any manufactured single component or multiple components. In certain embodiments, the one or more storage media 408 may be located either in the machine running the machine-readable instructions or may be located at a remote site from which machine-readable instructions may be downloaded over a network for execution.

In certain embodiments, the processor(s) 406 of the controller(s) 402 may be connected to a network interface 410 of the controller(s) 402 to enable the controller(s) 402 to communicate with various surface sensors 412 and downhole sensors 414, as well as communicate with actuators 416 and/or PLCs 418 of surface equipment 420 (e.g., the equipment above the surface of a wellsite 104, as illustrated in FIGS. 1-3) and of downhole equipment 422 (e.g., the equipment below the surface of a wellsite 104, as illustrated in FIGS. 1-3) for the purpose of providing multiple advisors and algorithms that may be used individually, or together, to help to achieve optimal fracture performance, with an optimal amount of materials used, and with the avoidance of any detrimental situations during the stimulation job, as described in greater detail herein. In certain embodiments, the network interface 410 may also facilitate the controller(s) 402 to communicate data to cloud storage 424 (or other wired and/or wireless communication network) to, for example, archive the data or to enable external computing systems 426 to access the data and/or to remotely interact with the controller(s) 402.

It should be appreciated that the controller(s) 402 illustrated in FIG. 4 may have more or fewer components than shown, may combine additional components not depicted in the embodiment of FIG. 4, and/or may have a different configuration or arrangement of the components depicted in FIG. 4. In addition, the various components illustrated in FIG. 4 may be implemented in hardware, software, or a combination of both hardware and software, including one or more signal processing and/or application specific integrated circuits. Furthermore, the operations of the controller(s) 402 as described herein may be implemented by running one or more functional modules in an information processing apparatus such as application specific chips, such as application-specific integrated circuits (ASICs), field-programmable gate arrays (FPGAs), programmable logic devices (PLDs), systems on a chip (SOCs), or other appropriate devices. These modules, combinations of these modules, and/or their combination with hardware are all included within the scope of the embodiments described herein.

In certain embodiments, the computer-executable instructions of the one or more analysis modules 404, when executed by the one or more processors 406, may cause the one or more processors 406 to provide various optimization suites of advisors and algorithms that may be used individually, or together, to help to achieve optimal fracture performance, with an optimal amount of materials used, and with the avoidance of any detrimental situations during the stimulation job, as described in greater detail herein. For example, analysis modules 404 may be configured to provide a Material Loading Optimization Suite 430, a Fracture Optimization Suite 440, and a Job Performance Optimization Suite 450, as described in greater detail herein. In certain embodiments, the Material Loading Optimization Suite 430 may include, among other things, an unconventional design Material Loading Optimization Advisor and a Fluid Friction Estimator, as described in greater detail herein. In addition, the Fracture Optimization Suite 440 may include, among other things, a Fracture Stress Shadow Analytics for Completion Advisor, a Cluster Efficiency Estimator, and a Diversion Advisor, as described in greater detail herein. Finally, the Job Performance Optimization Suite 450 may include, among other things, a Perforation Advisor/Optimizer, a Bottom Hole Pressure (BHP) Estimator, an Execution Advisor, Domain Knowledge Embedded Advisors, a Screenout Predictor, a Stage Placement Success Predictor and Strategy Optimizer, a Completion Pipe Deformation Predictor, an Operational Health Efficiency Index, and a Green House Gas (GHG) Intensity Index, as described in greater detail herein.

Material Loading Optimization Suite 430

Materials optimization is an important consideration during a well stimulation job (e.g., hydraulic fracturing) for both cost savings and environmental reasons. For example, additives pumped with fracturing slurries can reduce the fluid friction effects during pumping, thereby lowering the required pump hydraulic horsepower (HHP) to achieve a desired pumping rate. Often, operators will use more additives than required to achieve the desired rate, which costs more, both in the amount of additives used, but also in the transport of the additional additives to the wellsite 104. The embodiments described herein introduce materials optimization algorithms that may be combined to advise the operator on when they need to increase or decrease their additives concentrations on the job. The advisor is intended to generate suggestions on materials that affect surface measurements in substantially real-time.

1. Material Loading Optimization Advisor

The Material Loading Optimization Advisor is a guide that makes suggestions to help fracturing engineers and clients decide on whether to reduce, hold, or increase Friction Reducer (FR) concentrations (or other additives concentrations). The objective of the Material Loading Optimization Advisor is to minimize unnecessary material consumption during treatments, thus reducing the overall cost. The Material Loading Optimization Advisor runs during job execution only where there is a direct relation between surface measurement (e.g., pressure) and the additive (e.g., friction reducer), ignoring sections where any other parameter directly influences the conditions, such as pressure (e.g., a change in rate of pressure). In addition, the Material Loading Optimization Advisor uses treatment parameters such as pressure, rate, proppant concentration, and additive (e.g., FR) concentration to evaluate trends (e.g., pressure trends) at designated intervals, leading to an additive (e.g., FR) concentration suggestion.

The Material Loading Optimization Advisor is a rules-based model built using historical data to get the best underlying relation between parameters. The model runs in the background during data ingestion from the field to extract data from real-time execution constantly and suggests dropping or increasing additive (e.g., FR) concentrations to reach the desired operating condition (e.g., treating pressure). The model may highlight all regions where the additive could have been dropped or increased to reach the desired operating condition. For real-time execution recommendations, a machine learning time-series forecasting model may be trained using the labeled ingested data. The model is capable of forecasting continuously when it is recommended to increase or decrease the additive, making it more dynamic and usable for real-time applications. In addition, the model's relatively high forecasting speed makes it ideal for real-time applications. Overall, the Material Loading Optimization Advisor can help clients save significant material volume, reducing the overall cost and providing efficient stimulation jobs. A few examples of the material loading optimizations would be for consumption of FRs, crosslinkers, guar polymer gel loading, crosslink delay agents, base fluid brines, and so forth.

Figure 5:
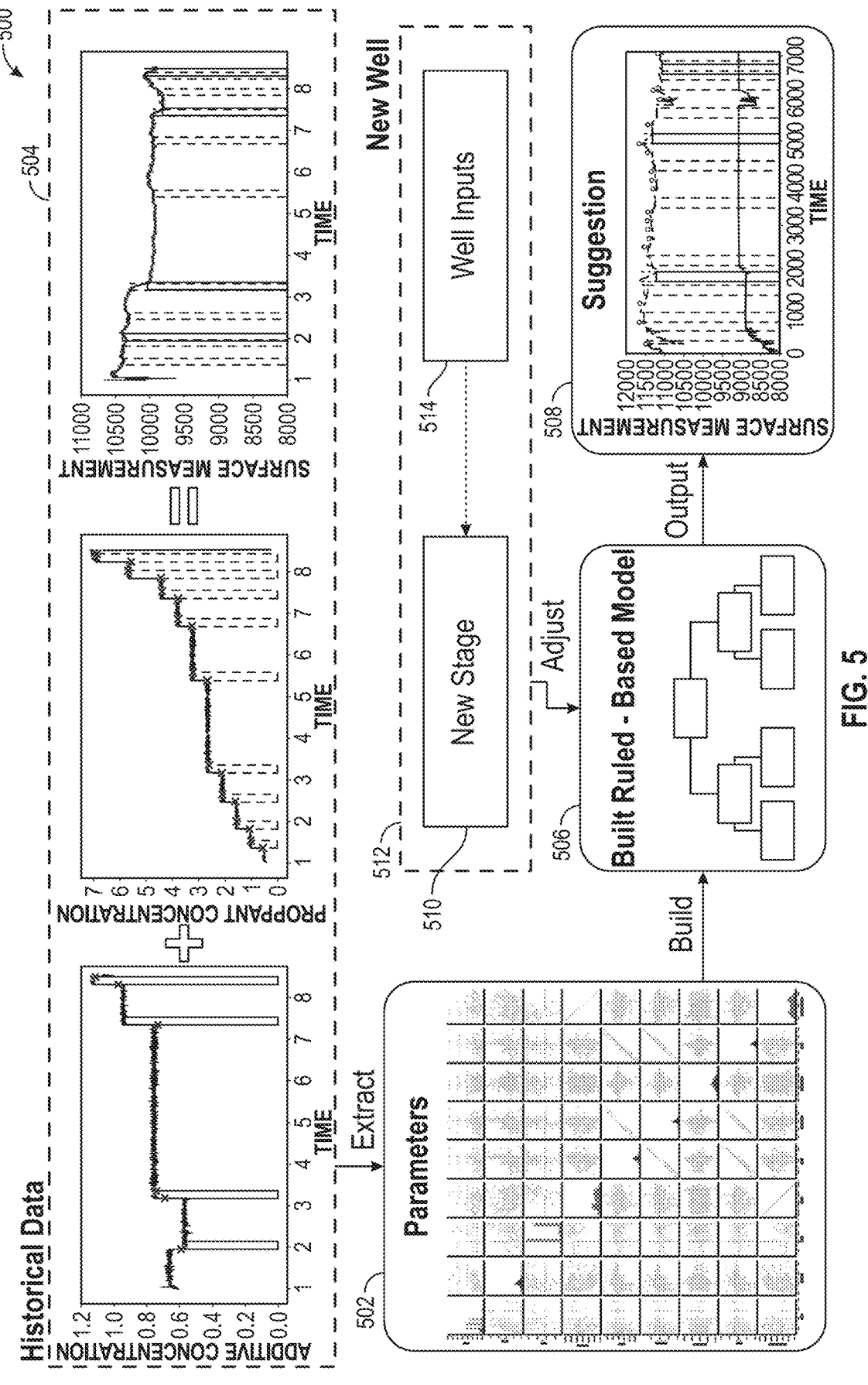
FIG. 5 illustrates a rule-based advisor model implementation workflow for design material loading optimization of a Material Loading Optimization Advisor, in accordance with embodiments of the present disclosure.

The rule-based Material Loading Optimization Advisor model implementation workflow 500 described is illustrated in FIG. 5. The rule-based Material Loading Optimization Advisor model implementation workflow 500 begins by extracting parameters 502 from historical data 504, and building the rule-based model 506 with the extracted parameters, and then uses the rule-based model 506 to output additive suggestions 508 based, for example, on adjustments made for new stages 510 of new wells 512 that are affected by well inputs 514 (e.g., detected in substantially real-time during well stimulation jobs performed for the new wells 512). Moreover, the Material Loading Optimization Advisor can help clients save from 5% to more than 20% of material volume, reducing the overall cost and providing an efficient stimulation.

2. Fluid Friction Estimator

The Fluid Friction Estimator described herein is a specific use case of the Material Loading Optimization Advisor that considers the relation between any additive (e.g., an FR) and a surface measurement (e.g., treating pressure) during a stimulation treatment to provide the user with an estimate of how much pressure would change due to a specific change in the additive concentration. This tool helps fracturing engineers and clients make intelligent decisions during treatments to reduce additive consumption on a stage-by-stage basis. The additive estimator runs in real-time and relies on treatment parameters such as pressure, rate, proppant concentration, and additive concentration to predict what the change in fluid friction pressure would be based on a change of additive concentration at that moment in time. Therefore, the model enables additive concentration suggestions.

In certain embodiments, the Fluid Friction Estimator may include a deep learning model (or other machine learning model), which may be trained using historical data to learn the underlying relationships. However, the friction-dominant factors may vary significantly from well to well. For this reason, in certain embodiments, the deep learning model may use incremental learning to leverage the training using the most recent data from the initial stages of the well during stimulation, as observed in FIG. 6. The deep learning model implementation workflow 600 illustrated in FIG. 6 begins with training of the deep learning model (block 602), which generates an initial trained model 604, which may be implemented during a stimulation job. For each new stage 606 of a new well 608 during stimulation, new data may be appended (block 610) to the existing (e.g., historical) data, and the deep learning model may be retrained, thereby creating an iterative loop whereby new stimulation job data is used to continuously re-train the deep learning model. Thus, the more stage data collected for the specific well, the more accurate the deep learning model becomes in predicting the effect on treating pressure due to a change in additive concentration.

Figure 6:
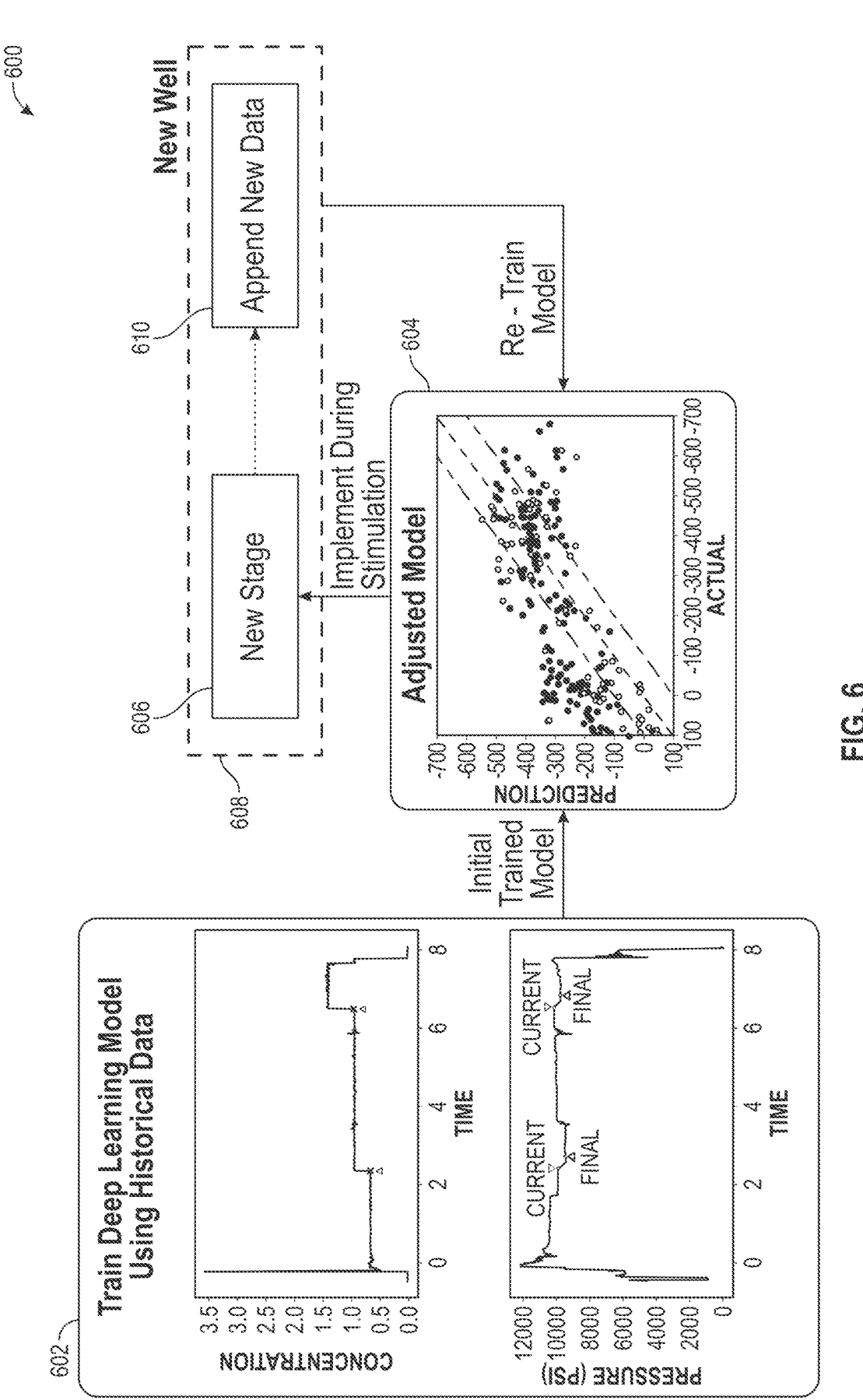
FIG. 6 illustrates a machine learning model implementation workflow for a Fluid Friction Estimator, in accordance with embodiments of the present disclosure.

As such, the workflows 500, 600 illustrated in FIGS. 5 and 6 are configured to enable developing at least one model 506, 604 configured to perform material loading optimization for well stimulation jobs for wells extending through subterranean formations based at least in part on historical data 504 relating to historical well stimulation jobs; using the at least one model 506, 604 to estimate how and when to adjust an amount of an additive pumped into an actual well extending through an actual subterranean formation during an actual well stimulation job for the actual well to minimize the amount of the additive used; and adjusting the amount of the additive pumped into the actual well during the actual well stimulation job in accordance with the estimation. In certain embodiments, the workflows 500, 600 may also include using the at least one model 506, 604 to estimate how and when to adjust the amount of the additive pumped into the actual well based at least in part on well inputs 514, 610 for the actual well that are detected in substantially real-time during execution of the actual well stimulation job.

In certain embodiments, the at least one model 506, 604 may include at least one rule-based model 506. In other embodiments, the at least one model 506, 604 may include at least one deep learning model 604 trained on the historical data 504 relating to the historical well stimulation jobs. In such embodiments, the workflows 500, 600 may also include continuously re-training the at least one deep learning model 604.

Fracture Optimization Suite 440

3. Fracture Stress Shadow Analytics for Completion Advisor

The objective of this workflow is to leverage job execution data and create learning algorithms from different data blocks such as completion/perforation details, treatment parameters, stress shadow indicators, and production information to create actionable insights to optimize the completion to maximize cluster efficiency and production performance. For example, this workflow may use comparative and systematic analysis of Instantaneous Shut-in Pressure (ISIP), Pad Pressure, and Pre-Fracturing pressures to guide fracturing stage spacing.

Certain conventional techniques use ISIP to present trends with mathematical compressional change analysis to estimate the interference as a function of spacing and a solution to that. Other conventional techniques may, for example, determine an expected trajectory of induced fractures in a rock formation, analyze net pressure associated with the induced fractures, and determine at least one of spacing of induced fractures and a property of the induced fractures based on the net pressure. In contrast, the workflow presented here uses ISIP in conjunction with some near wellbore pressure approximations together to affect the decision on stage spacing, as opposed to using only ISIP or net pressure as with conventional techniques.

Figure 7:
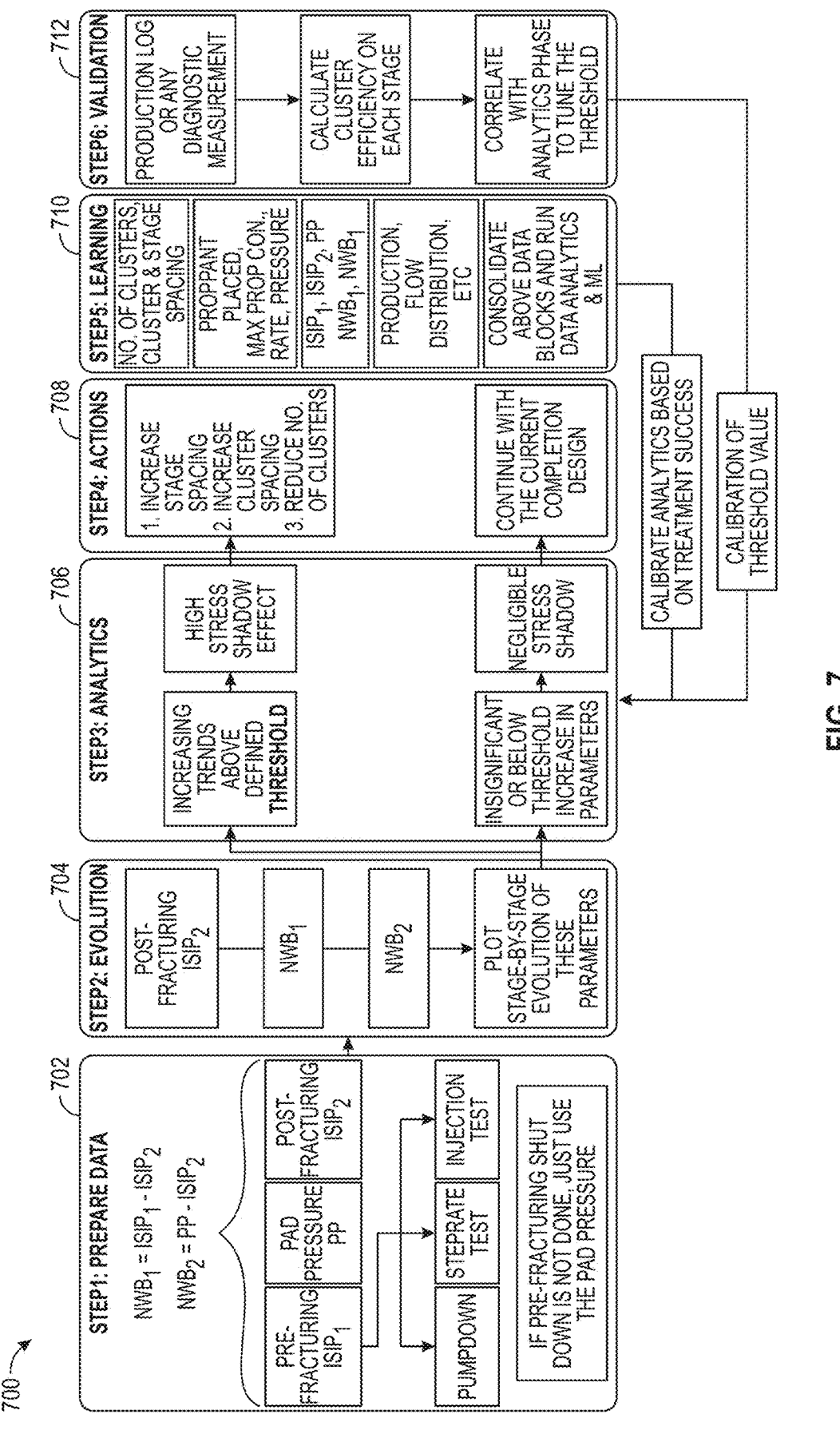
FIG. 7 illustrates a fracture stress shadow analytics for completion advisor workflow, in accordance with embodiments of the present disclosure.

An objective of this workflow is to leverage job execution data and create learning algorithms from different data blocks such as completion/perforation details, treatment parameters, stress shadow indicators, and production information to create actionable insights to optimize the completion to maximize cluster efficiency and production performance. This fracture stress shadow analytics for completion advisor workflow 700, illustrated in FIG. 7, has six main steps:

1. Preparing the stress shadow indicators (SSI) by using ISIPs and pad pumping pressures (block 702). ISIP and near wellbore losses are strong proxy indicators for stress shadow and complex fracture network effects. As illustrated in FIG. 7, in certain embodiments, pre-fracturing and post-fracturing near wellbore pressures $NWB_1$, $NWB_2$ may be functions of pad pressure PP, pre-fracturing $ISIP_1$, and post-fracturing $ISIP_2$, which may then be used to determine parameters for Pump-Down operations, StepRate Testing, Injection Testing, and so forth. The preparation of this data may be automated.

Figure 8:
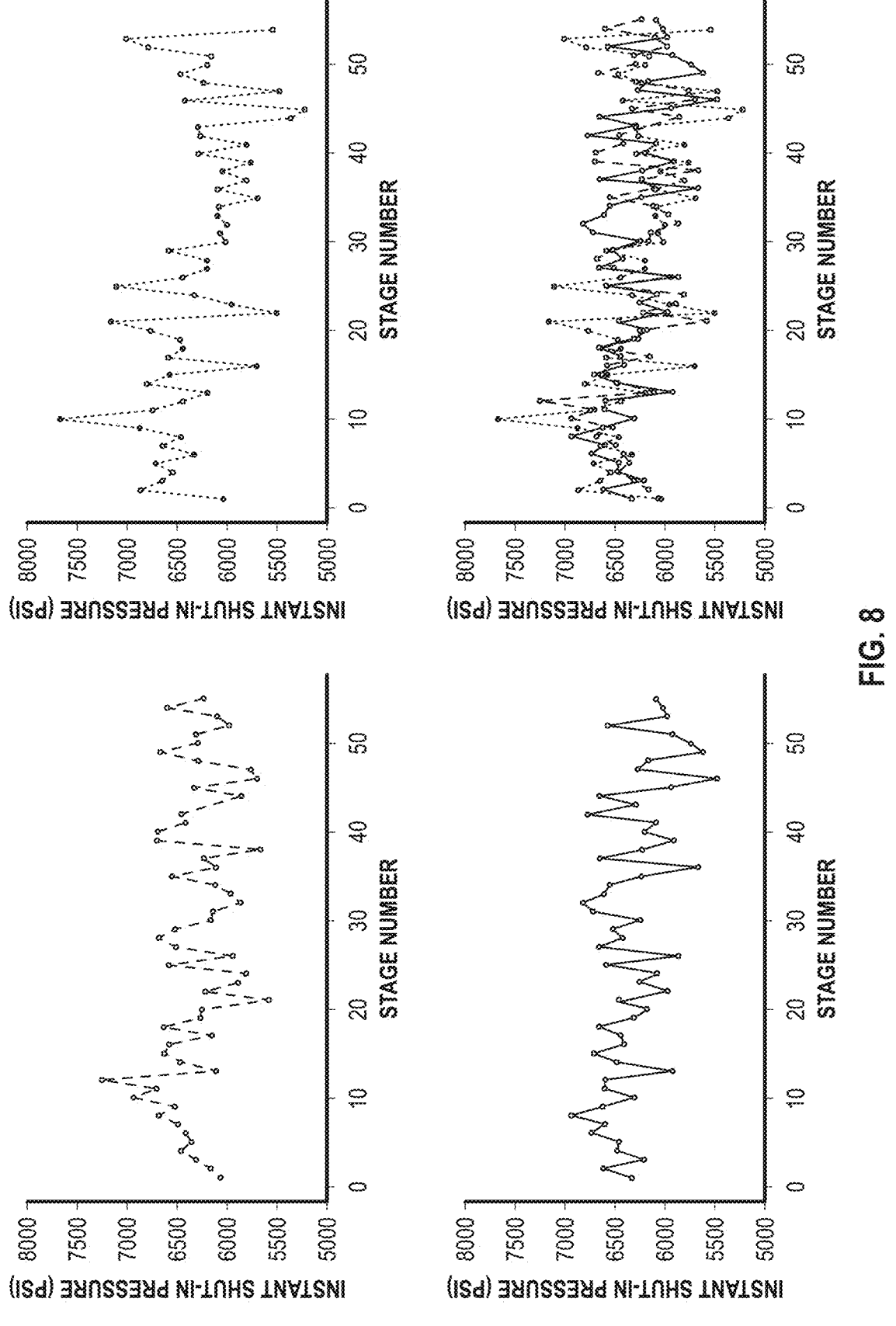
FIG. 8 illustrates Instantaneous Shut-in Pressure (ISIP) evolution in multiple different laterals, in accordance with embodiments of the present disclosure.

2. Plot and study the evolution of the SSI stage-by-stage, for example, post-fracturing $ISIP_2$, $NWB_1$, and $NWB_2$ based at least in part on the prepared data (block 704). FIG. 8 illustrates ISIP evolution in multiple different laterals.

3. Analytics may then be conducted on the evolution trends of step 2, corresponding to block 704 (block 706). Increased trends above a defined threshold may indicate a relatively high stress shadow effect, whereas insignificant or below threshold increases in parameters may indicate a relatively negligible stress shadow effect. The underlying principle is that each stage, when it is pumped, alters the far field stress state by a component ($\sigma_{yy}$). The addition of this component increases the ISIP. A starting point increase threshold may be set initially. Note that the analytics loop will be subject to calibration (e.g., discussed in steps 5 and 6, corresponding to blocks 710 and 712).

4. Actionable measures may be taken based on the increasing trends, learning of fracture propagation can be established and cluster spacing, cluster density, and stage spacing may be changed accordingly (block 708). For example, a relatively high stress shadow effect may recommend increasing stage spacing, increasing cluster spacing, reducing the number of clusters, and so forth, whereas a relatively negligible stress shadow effect may suggest that the current completion design may continue. This will allow an engineered completion strategy based on real data analytics and observations.

5. Four data blocks for completion (e.g., number of clusters, cluster and stage spacing, and so forth), fracturing treatment (e.g., proppant placement, maximum proppant concentration, rate, pressure, and so forth), SSI (e.g., $ISIP_1$, $ISIP_2$, PP, $NWB_1$, and $NWB_2$, and so forth), and production metrics (e.g., production, flow distribution, and so forth), with multiple variables within each block may be consolidated in a structured database in the learning step (block 710). The data analytics and machine learning (ML) may be conducted on these data to understand the correlations between $\Delta ISIPs$, proppant amounts, max prop con, rate achieved, pressure experienced, and so forth. The underlying understanding here is that high stress shadow effects would impede injectivity and proppant placement. These learnings may be used in a feedback loop to the analytics phase of step 3, corresponding to block 706, where the understanding about SSI trends may be tuned.

6. Validation, where production logs or other diagnostic measurements may be used to calculate cluster efficiency on each stage, which may then be used to correlate with the analytics phase of step 3, corresponding to block 706, to tune the thresholds (block 712). As such, the validation may take on the form of independent measurements that can act as a feedback loop to tune certain modeling parameters, namely the threshold. Compatible measurements may include, but are not limited to, production logs (PLT), fiber-optic data (for example, DAS, DTS, DVS, etc.), or other measurements of cluster efficiency.

As such, the completion advisor workflow 700 may enable performing analytics 706 on data 702 relating to a well extending through a subterranean formation to create actionable insights 708 relating to a completion design to optimize a completion of the well to maximize production performance of the well in substantially real-time during execution of the completion design; and executing the completion design in accordance with the actionable insights. In certain embodiments, the completion advisor workflow 700 may enable performing the analytics 706 on the data 702 relating to the well extending through the subterranean formation to create the actionable insights 708 relating to the completion design to optimize the completion of the well with respect to cluster spacing to maximize cluster efficiency from shut-in pressures and near wellbore pressure evaluations.

In addition, in certain embodiments, the completion advisor workflow 700 may be configured to provide spacing advice after each stage of the completion of the well based on updated pressure evolution. In addition, in certain embodiments, the completion advisor workflow 700 may be configured to tune the analytics 706 in an iterative manner during execution of the completion design. In certain embodiments, the analytics 706 may be tuned based at least in part on one or more production logs, fiber optic data, and so forth.

4. Cluster Efficiency Estimator

Figure 9:
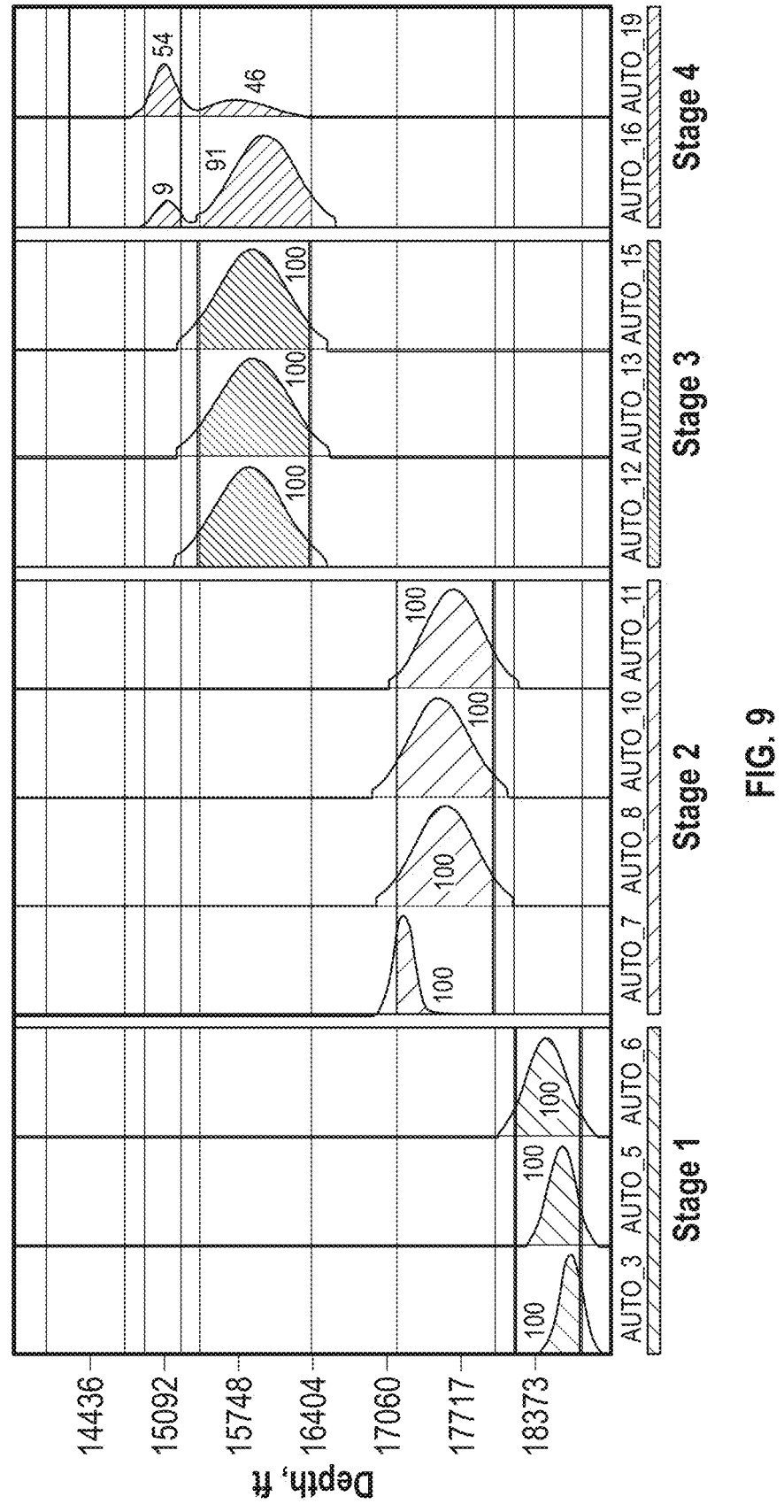
FIG. 9 illustrates fluid placement estimation from water hammer analysis, in accordance with embodiments of the present disclosure.
Figure 10:
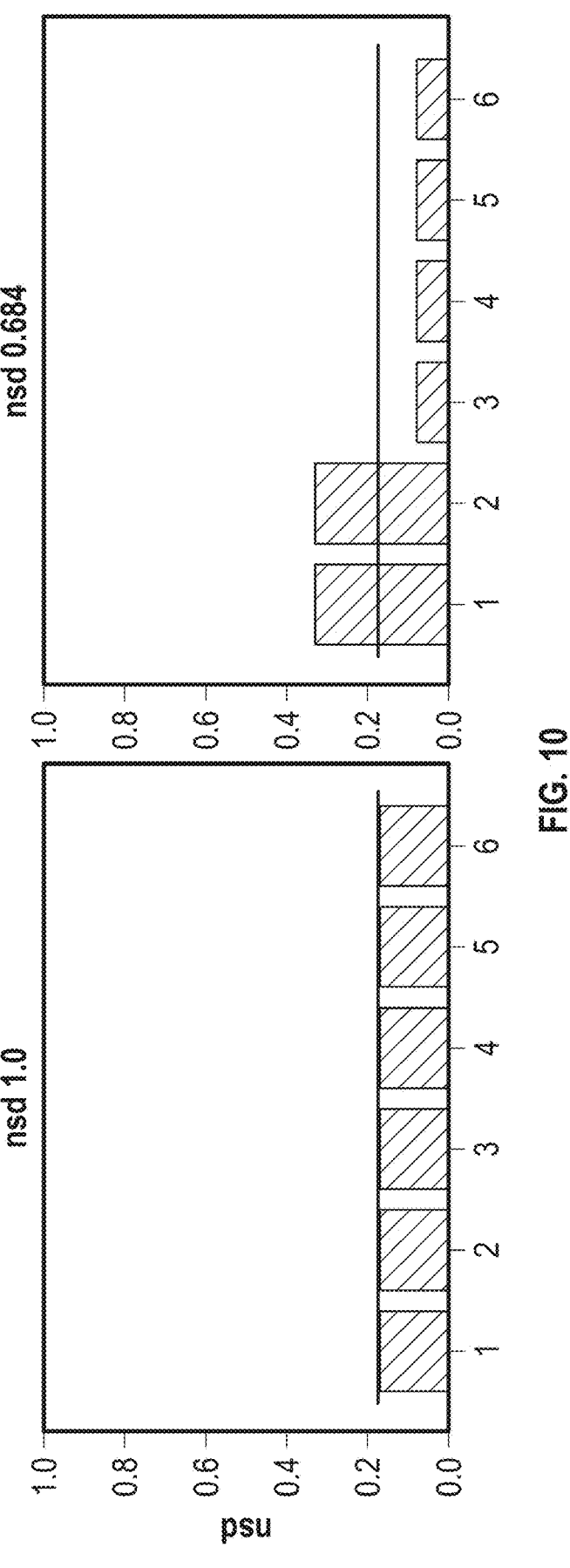
FIG. 10 illustrates sample cluster distribution from cluster efficiency estimation, in accordance with embodiments of the present disclosure.

The Cluster Efficiency Estimator considers the estimated downhole fluid placement region and the estimated distribution of clusters taking fluid to provide a user with an estimate of where fluid was placed, including in which clusters. The fluid placement region is estimated post-stage using an application (see FIG. 9) to interpret the high-frequency pressure signals from water hammers generated from pump shut down events. The cluster distribution may be estimated with a machine learning application (see FIG. 10) in real time or post-stage using the pressure, rate, and proppant concentration data measured during the job.

The combination of the water hammer analysis and cluster distribution estimation may be used to provide a clear picture of the cluster efficiency because each tool's strength complements the other. While the water hammer analysis is good at predicting the location of the fluid placement, it does not have the ability to show which clusters took the fluid during the job. Conversely, the cluster efficiency estimation can predict the distribution of clusters that took the fluid, but it does not have any spatial resolution to say what the distribution looks like downhole. Putting the two pieces of data together gives an idea of which clusters are taking fluid and where. This powerful set of information may guide engineers on further actions to take to improve the stimulation job, such as pumping a diverter.

5. Diversion Advisor Based on Bottomhole Pressure (BHP)

The Diversion Advisor module utilizes real-time analysis of calibrated BHP (described with respect to the BHP Estimator described herein), high frequency pressure monitoring technique, and non-dimensional slurry distribution to broadly provide two pieces of advice: (1) when to pump a diverter in a treatment, and (2) how to optimize the diverter design/volume. This may be done by coupling the conventional understanding of BHP development during fracturing and near-wellbore skin estimation using an appropriate proxy as BHP, hence making an accurate BHP important for this workflow.

Without any robust diagnostic or presence of a bottomhole gauge, increase in surface pressure may be used as the measure to qualitatively describe the success of diversion. However, surface pressure is affected by multiple downhole factors and might not be the most reliable. In the Diversion Advisor, an ensemble of: (1) the calibrated BHP, (2) fluid entry points yielded by the probabilistic algorithm that used high frequency water hammer analysis, and (3) a cluster efficiency predictive data model trained on actual fiber optics interpreted data may be used.

The first component, BHP, gives a qualitative estimate of downhole skin generated by the diverter pill. The second component, water hammer analysis, determines the fluid entry point and the evolution of fluid entry from one depth to another and can be used as an indication of fluid diverting from one cluster to another. The third component gives a real time parameter evolution, which ranges from 0 to 1, with 0 being single cluster stimulated and 1 being all clusters stimulated, which gives real time information about when diversion is required to maximize the cluster efficiency.

Job Performance Optimization Suite 450

Conventional techniques allow users and operators to design and strategize perforations and completions based on actual data that is experienced in their field. The workflows described here propose using data from different phases of the actual job to learn from that analysis in the design phase and workflow. Conventional workflows generally only use the log data and measurements. The element of feedback loop with real data and how to utilize it in an engineered way is a key component of the workflows described here.

6. Perforation Advisor/Optimizer

Selecting perforations for stimulation and fracturing is technically intensive. This module offers two layers to optimize the perforation selection process to make the perforation design process smarter:

1) A physics-based model where technical insights may be embedded into a rule-based classifier to output the optimal locations for perforating. The following data is collected, and rules are defined:
   (a) Continuous log data along measured depth (MD) such as Young's Modulus, in situ stress calculation, bulk density, gamma ray, permeability, and water saturation. Gradients and limits may be set for each parameter to classify potential areas.
   (b) Gas-oil contact depth or water oil contact depth.
   (c) Caliper washout log used to set limits to eliminate washed out zones.

2) A data-based machine learning model where all the above-mentioned data may be used as input and output is the actual perforation depths and number of stages in the well. Here, no rules are created. The real data of logs, along with actual perforation depths, may be used to train an ML model for predicting the perforation with logs input.

The final output may be modular, utilizing either of the above options or it could also run both models and show a comparison of the ML model predicted perforations with the rule-based algorithm, wherein the ML output may then be calibrated using the rule-based approach.

As such, the Perforation Advisor/Optimizer is configured to perform a method including developing at least one model configured to select an optimal perforation design of a well stimulation job for a well extending through a subterranean formation; and executing the well stimulation job for the well extending through the subterranean formation in accordance with the optimal perforation design.

In certain embodiments, the at least one model may include a physics-based model. In such embodiments, the physics-based model includes technical insights embedded into a rule-based classifier configured to output optimal locations for perforations. In addition, in certain embodiments, the technical insights may include continuous log data along measured depth including Young's Modulus, in situ stress calculation, bulk density, gamma ray, permeability, and water saturation. In addition, in certain embodiments, the technical insights may include gas-oil contact depth or water oil contact depth. In addition, in certain embodiments, the technical insights may include a caliper washout log used to set limits to eliminate washed out zones.

In other embodiments, the at least one model may include a data-based machine learning model. In such embodiments, output of the data-based machine learning model comprises an output of actual perforation depths and number of stages in the well. In addition, in certain embodiments, the at least one model may include both a physics-based model and a data-based machine learning model, and the optimal perforation design may be selected based on a comparison of outputs of the physics-based model and the data-based machine learning model.

7. Bottom Hole Pressure (BHP) Estimator

Bottom Hole Pressure may be defined as the total pressure at the top of the perforation interval and may be determined by adding Treating Pressure ($P_T$) at the wellhead to Hydrostatic Pressure ($P_H$) of the fluid column and then subtracting Friction Pressure ($P_F$). Knowledge of the BHP evolution during a well stimulation job (e.g., hydraulic fracturing) is useful to optimizing treatment options, such as understanding fracture propagation, height growth versus length, near-wellbore dynamics, evaluation and optimization of fracture diversion, and to make on-the-fly pumping design changes to avoid potentially catastrophic events, such as screen outs. The BHP may be measured during the job with a sensor; however, these sensors are relatively expensive to deploy and are impractical to be used on all jobs. The algorithms described here are capable of automatically calculating the BHP on all jobs using a combination of event detection, fluid friction correction, and proppant friction estimation.

The BHP calculation workflow described here differs from conventional techniques in that it is based on auto-mated ISIP detection, proppant multipliers, and near well-bore corrections. Automated ISIP detection overcomes the inconsistencies and subjectivity in results due to human prone error and bias caused by manual ISIP detection approaches and techniques. The BHP calculation workflow includes the use of data to find a model capable of adjusting friction pressure caused by the proppant present in the slurry. The near wellbore component predicts a correction factor leading to a better estimation of BHP.

The unknown Friction Pressure may be estimated from the Friction Curve generated by evaluating the laminar flow regime from injection during Pump Down and Perforate (PDP) operations and the turbulent flow regime from the Hydraulic Fracturing Stimulation (FRAC) for each stage of a well. An event detection algorithm may be used to automatically detect certain events during a stage and extract ISIP from water hammers generated by the pumps shutting down during PDP and FRAC Operations. This enables an analytics module to calibrate the friction curve in an iterative cycle for each data point collected during the treatment of a well. Modeling and design software may then use the calibrated Friction Curve to compute reliable BHP enabling evaluation of fracture propagation behaviors in near real-time. Fracturing treatments for subsequent stages may be optimized by adjusting pump schedule parameters to achieve desired treatment results.

The deterministic statistical approach used to auto-detect ISIP leads to reliable measurements, reducing the uncertainties from human-prone measurements. This enables the creation and calibration of a reliable friction curve to estimate the fluid friction in an iterative cycle for each stage data collected during the treatment of a well that is ingested into a data analytics warehouse.

The proppant present in the slurry contributes to the friction generated during the stimulation, and the extent of this influence is primarily dictated by the proppant concentration. Real-time simulation of operating conditions such as pressure, slurry rate, and proppant concentration alter the frictional effects of the proppant. To address the frictional impact of proppant, two approaches are available to the user: (1) the use of a proppant multipliers table based on user inputs or automatically generated based on data, and (2) the use of a machine learning (ML) model capable of predicting proppant multipliers developed based on operational conditions during stimulation. The model may be used to predict the proppant multipliers to adjust the friction pressure accurately, considering not only proppant concentration but also real-time operational conditions, thereby improving the reliability of the predictions.

Figure 11A:
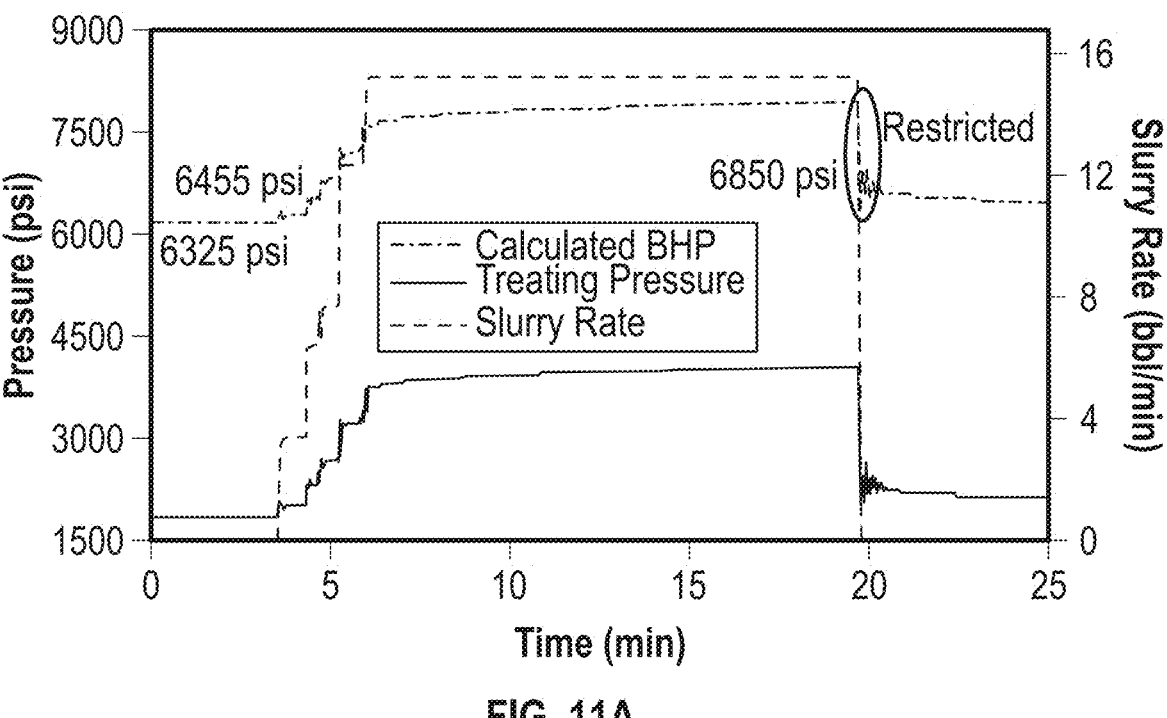
FIGS. 11A and 11B are graphs of pressure and slurry rate over time for a restricted system and an open system, respectively, in accordance with embodiments of the present disclosure.
Figure 11B:
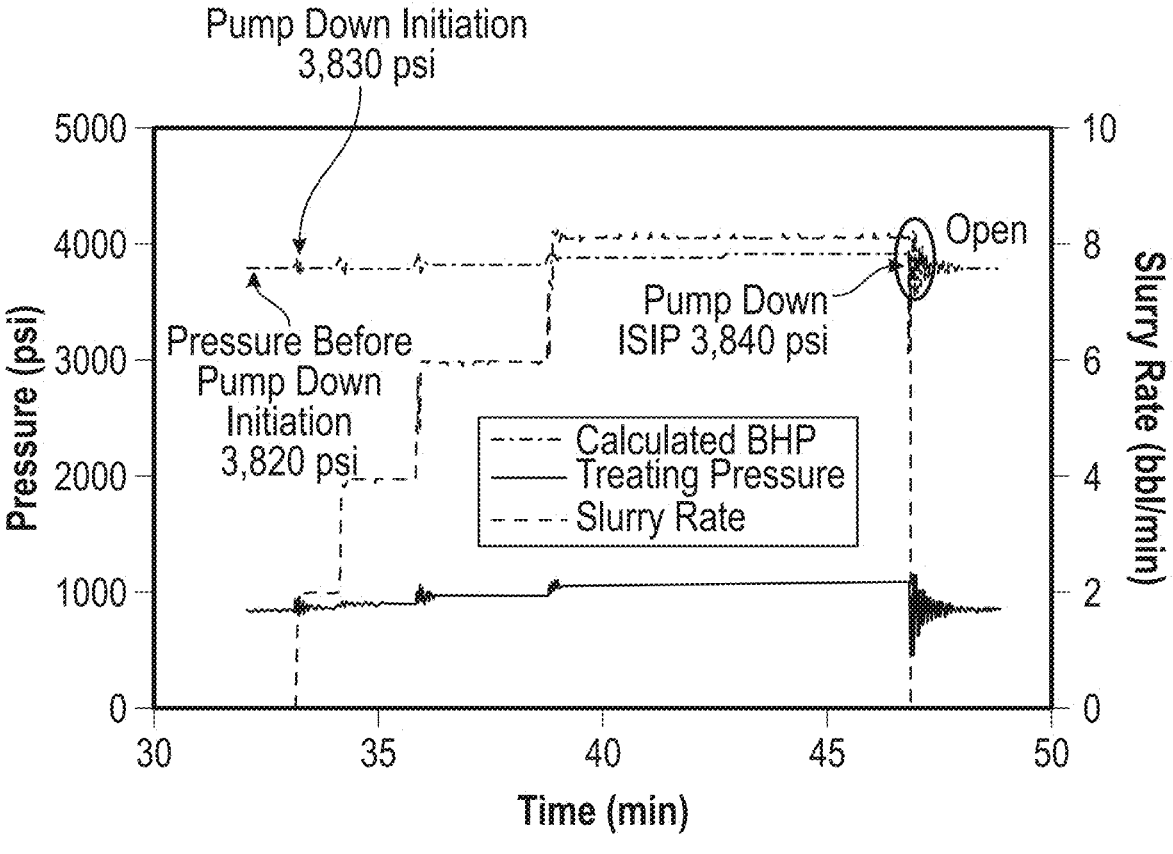

Near wellbore friction, which is comprised of perforation friction and near wellbore tortuosity, also contributes to overall friction pressure. However, near wellbore friction may be excluded from calculations at the end of the fracturing treatment, providing a more accurate estimation of the BHP. This assumption holds across all stages where an open fracture system exists but becomes invalid in a restricted system. For fracturing, the information regarding the system can be obtained from prior Pump Down Perforating operations. FIGS. 11A and 11B are graphs of pressure and slurry rate over time for a restricted system and an open system, respectively. In such scenarios of restricted systems, near-wellbore friction may be estimated using an ML model capable of predicting the overall near-wellbore effect based on stimulation operating conditions, pre-fracturing diagnostic tests and step-down tests, and perforation design information.

An accurate representative BHP may be calculated after accounting for all the different components affecting the total friction pressure across the system. Modeling and design software may then use the calibrated Friction Curve to compute reliable fluid friction, which combines with the ML model capable of adjusting the friction to account for proppant present in the slurry and the near wellbore information to account for friction effects using second ML model leads to a reliable BHP enabling evaluation of fracture propagation behaviors in near real-time. Fracturing treatments for subsequent stages may be optimized by adjusting pump schedule parameters to achieve desired treatment results and retraining to adjust the models if needed to ensure optimal prediction performance.

Figure 12:
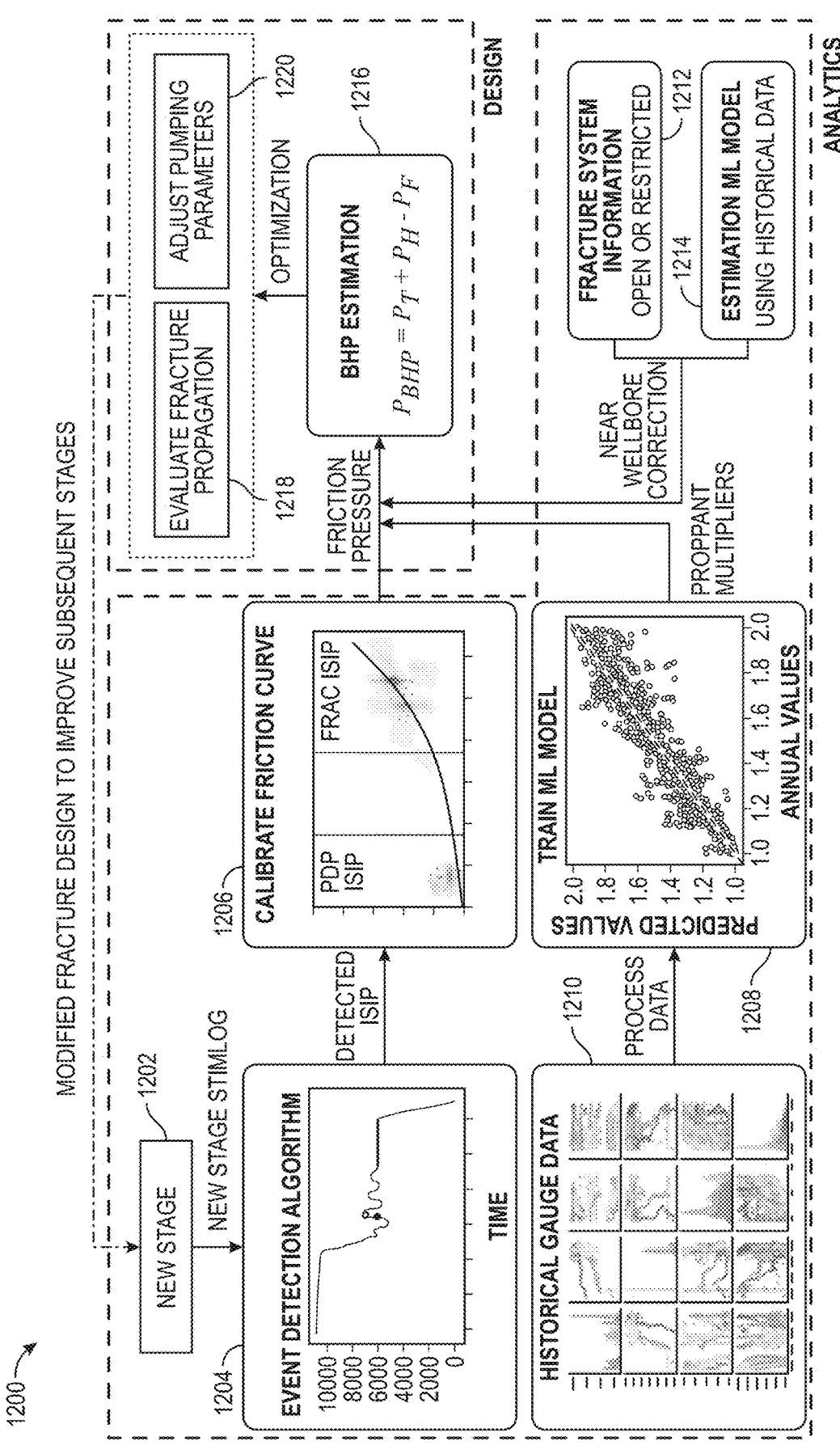
FIG. 12 illustrates a workflow for a Bottom Hole Pressure Estimator, in accordance with embodiments of the present disclosure.

The workflow 1200 illustrated in FIG. 12 allows precise BHP estimation without using bottom-hole sensors and provides job quality insights. As illustrated in FIG. 12, for a new stage 1202, data from a stimulation log may be utilized by an event detection algorithm 1204 to determine a detected ISIP, which may be used to calibrate a friction curve 1206, which may be combined with: (1) proppant multipliers that are estimated by a ML model 1208 that is trained based on process data received from historical gauge data 1210 and (2) a near wellbore correction determined based on fracture system information 1212 and an estimation ML model 1214, to determine friction pressure for BHP estimation 1216 (e.g., $P_{BHP}=P_T+P_H-P_F$), which may be optimized for the purpose of evaluating fracture propagation 1218 and adjusting pumping parameters 1220, among other things, to modify the fracture design to improve for subsequent stages. Automatic event detection eliminates the need for tedious manual data extraction, error-prone selection, inconsistencies, and miscalculations combined with ML models to improve friction estimation and predict previously unobtainable information, integrating a workflow that allows better stage-by-stage stimulation by improving operations. The equation in FIG. 12 is where $P_{BHP}$ is the bottomhole pressure, $P_T$ is the surface pressure, $P_H$ is the hydrostatic pressure, and $P_F$ is the total friction pressure. $P_F$ has two components, pipe friction and near-wellbore friction. In certain embodiments, Nolte-Smith analysis of the BHP estimation 1216 may be performed to estimate an impending screenout, or to estimate an unrestricted height growth, and so forth, as described in greater detail herein.

As such, the BHP Estimator may enable developing at least one model 1208 configured to estimate a BHP that exists at an end of (or during the full time of) a pumping stage of a well stimulation job for a well extending through a subterranean formation; executing the well stimulation job for the well extending through the subterranean formation; and calculating the BHP 1216 during the pumping stage of the well stimulation job (e.g., in substantially real-time during the pumping stage) using the at least one model 1208. In certain embodiments, the BHP Estimator may be configured to perform Nolte-Smith analysis on the calculated BHP to estimate an impending screenout, to estimate unrestricted height growth, and so forth (e.g., as part of the fracture propagation evaluation 1218). In addition, in certain embodiments, the BHP Estimator may be configured to automatically adjust pumping parameters of the well stimulation job based at least in part on the calculated BHP.

In addition, in certain embodiments, the at least one model 1208 may include at least one machine learning (ML) model 1208. In such embodiments, the BHP Estimator may be configured to train the at least one ML model 1208 using downhole gauge data 1210. In addition, in certain embodiments, the BHP Estimator may be configured to generate one or more friction pressure curves 1206 in an automated manner using the downhole gauge data 1210, and to calculate the BHP based at least in part on the one or more friction pressure curves 1206. In addition, in certain embodiments, the BHP Estimator may be configured to generate one or more proppant multipliers per proppant concentration in an automated manner using table generation using the downhole gauge data 1210, and to calculate the BHP based at least in part on the one or more proppant multipliers. In addition, in certain embodiments, the BHP Estimator may be configured to predict the one or more proppant multipliers based on real-time operating conditions (e.g., real-time stimulation treatment parameters) using the at least one ML model 1208. In addition, in certain embodiments, the BHP Estimator may be configured to catalog near wellbore pressure loss components using the downhole gauge data 1210, and to calculate the BHP based at least in part on the near wellbore pressure loss components.

8. Execution Advisor

The Execution Advisor is a guide that helps fracturing engineers and clients to make real-time decisions to optimize the fracture placement. In a typical treatment scenario, when pressure starts increasing, the choice made is under-engineered and instinctive. Terminating the treatment prematurely can significantly impact production potential of the fracture pack. On the other hand, not moving to flush at the right time leads to a near wellbore screenout, leaving considerable proppant in the wellbore, requiring a coiled tubing cleanout operation, which affects the operational efficiency, costs money, and the additional cleanout fluid influx into the reservoir can cause proppant pack demobilization.

This module overcomes this challenge and provides engineered advice during the execution. It guides engineers using three operating modes:

1. Normal: by telling them to continue treatment as designed/planned,
2. Warning: extend and continue with the same proppant concentration until further notice, or
3. Alert: terminate the treatments prematurely and move to flush/displacement step.

The underlying principle of the Execution Advisor is to use a reliable net pressure that is calculated with all correct inputs (e.g., BHP, closure pressure, perforation friction losses, tortuosity, and so forth) in real-time where analytical models are used to iterate and calculate the real-time dynamic changes in the perforation and tortuosity parameters. This net pressure may be used to calculate the real-time width by using the classical fracture compliance equation. For height calculations, the module runs in two modes. The first mode is dynamic, where real-time height is calculated. The second mode is to use the minimum height to give the worst case (e.g., lowest) fracture width calculation. The width may then be used along with net pressure to pass through the bridging criteria checkpoint. In certain embodiments, the industry standard bridging criteria (i.e., 2.5-3.0) may be used. However, the Execution Advisor may be further calibrated.

Figure 13:
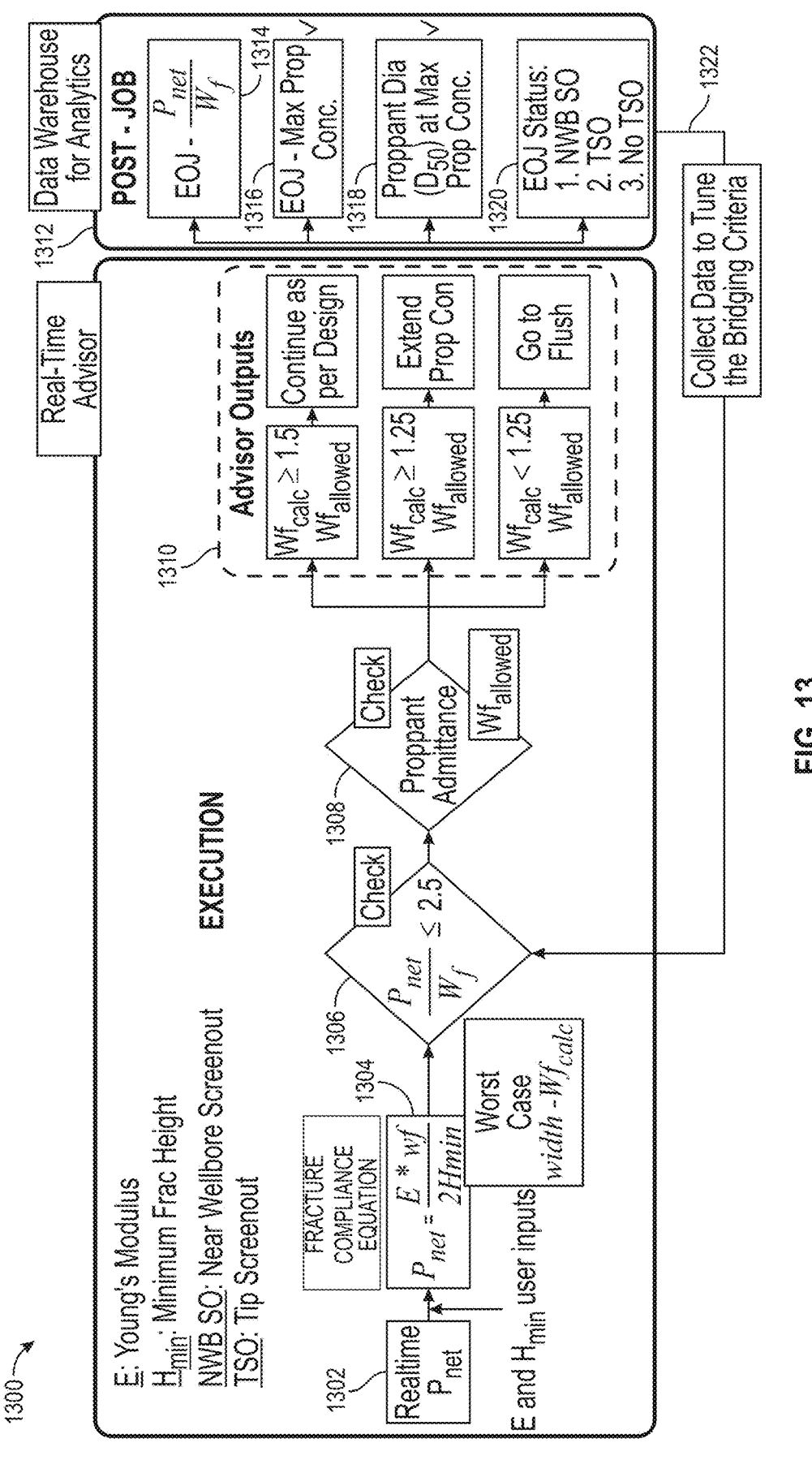
FIG. 13 illustrates a workflow for an Execution Advisor, in accordance with embodiments of the present disclosure.

FIG. 13 illustrates a workflow 1300 for using the Execution Advisor. The calibration loop implies that the empirical bridging criterion may be continuously adjusted within the feedback loop provided through analytics. At the end of each stage, additional factors such as the maximum proppant concentration, proppant diameter, and end-of-job status may be added to the analytics loop. The analytics module sees multiple of these treatments with the actual width and proppant placed and learns and updates a bridging criterion from that based on real jobs, as shown in FIG. 13.

The routine is fed with the real-time net pressure ($P_{net}$) 1302, which is used to get the calculated width ($Wf_{calc}$) using the fracture compliance equation 1304. Here, the Young's modulus (E) and minimum height ($H_{min}$) are added to the loop to run this calculation. In certain embodiments, $H_{min}$ may be determined from the barriers. Alternatively, the real-time dynamic height may also be calculated from the Khristianovic-Geertsma-de Klerk (KGD) behavior. As illustrated, the calculated width $Wf_{calc}$ and real-time net pressure $P_{net}$ may be used to run a bridging criteria check 1306. In particular, if $P_{net}$ divided by $Wf_{calc} \leq 2.5$, then another checkpoint 1308 may be used, where proppant admittance may be derived using Gruesbeck and Collins (1982) correlations. Gruesbeck, C. and Collins. R., E. 1982. Particle Transport Through Perforations. SPE J. 22 (1982): 857-865. https://doi.org/10.2118/7006-PA. Here, the allowed fracture width $(\mathrm{Wf}_{allowed})$ based on that criterion is calculated. The next block is the advisor outputs 1310 where the relation between the $\mathrm{Wf}_{calc}$ and $\mathrm{Wf}_{allowed}$ is used to deduce the safety, and advice is generated by the real-time execution software (e.g., to continue as per design, to extend proppant concentration, or to go to flush). The ratios given for each operation mode (e.g., 1.25 and 1.5 in the illustrated example) may be changed as per the local experience. A post-job analytics block 1312 stores important treatment placement information relevant to the context of the Execution Advisor. For example, an end of job (EOJ) bridging index 1314, EOJ maximum proppant concentration 1316, proppant size at maximum proppant concentration 1318, and EOJ status 1320 (e.g., including near-wellbore screenout (NWB SO), tip screenout (TSO), and TSO multiplier) may be recorded in the data store. After significant data is collected, analytics may be conducted to continuously calibrate 1322 the bridging criteria to enhance the underlying physics of the Execution Advisor and consequently the recommendations yielded by the Execution Advisor.

As such, the Execution Advisor is configured to enable the steps of executing a well stimulation job for a well extending through a subterranean formation in accordance with a well stimulation plan; receiving data relating to the execution of the well stimulation job (e.g., $\mathrm{P}_{net}$) in substantially real-time during the execution of the well stimulation job; and providing advice regarding one or more execution steps 1310 for the well stimulation plan in substantially real-time during the execution of the well stimulation job based on the data relating to the execution of the well stimulation job. For example, in certain embodiments, the one or more execution steps 1310 for the well stimulation job may include whether to continue the well stimulation plan as planned, whether to extend a current execution step, or whether to move to flush. In addition, in certain embodiments, the data relating to execution of the well stimulation job may include real-time fracture width calculations $\mathrm{Wf}_{calc}$.

In addition, in certain embodiments, the Execution Advisor may be configured to calculate and calibrate a bridging criterion 1314 based on collected end-of-treatment data 1312. In certain embodiments, the bridging criterion 1314 may be based on a fracture compliance equation 1304. In addition, in certain embodiments, the end-of-treatment data may include fracture width Wf, net pressure $\mathrm{P}_{net}$, maximum proppant concentration 1316, maximum proppant size 1318, whether a treatment ended normally or in a screenout (e.g., as part of the EOJ status 1320), or some combination thereof.

In other words, in certain embodiments, the Execution Advisor may be configured to perform a post-job analysis 1312 of the well stimulation job after execution of the well stimulation job. For example, the post-job analysis 1312 may include calculating an end of job (EOJ) bridging index 1314, an EOJ maximum proppant concentration 1316, a proppant size at maximum proppant concentration 1318, and an EOJ status 1320.

9. Domain Knowledge Embedded Advisors

The principal issue under consideration in this workflow pertains to the inefficiency and potential for errors associated with the utilization of traditional flowcharts in fracturing treatment procedures. To address these challenges, the proposed solution entails the development of a fracture treatment advisor tool (FTAT) as a more intuitive and user-friendly alternative. Consequently, the objective is to establish an effective means for users to navigate real-world environments and undertake actions with reduced errors. The solution utilized here is a state machine automaton (SMA). It transforms the flowchart-based guidance into a state machine with transitions. In this context, each state within the state machine corresponds to a specific prompt or action for the user, and it is governed by a predefined set of conditions.

Figure 14:
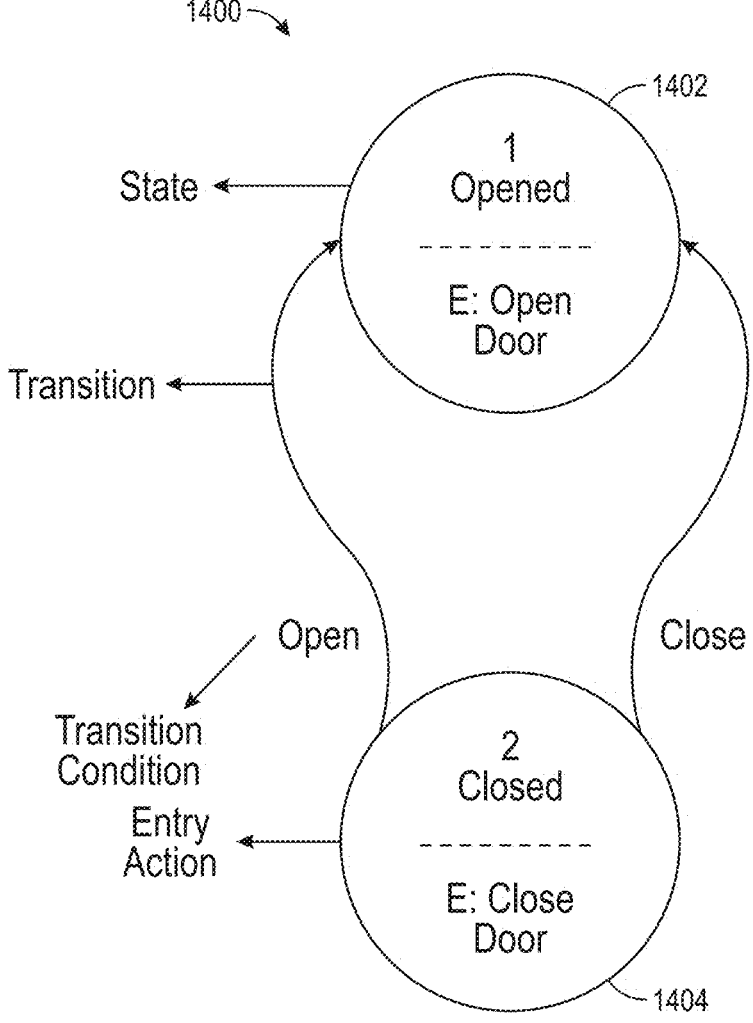
FIG. 14 illustrates a finite state machine showing how different components move from a first state to a second state and loop back to the first state based on a transition condition described in a model, in accordance with embodiments of the present disclosure.

The state machine provides a powerful framework for modeling and controlling behavior of complex systems. Also known as finite state machines, state machines offer a structured and systematic approach to modeling complex systems, allowing for a concise representation of states, transitions, and behavior. State machines are conceptualized as mathematical models that depict the dynamic behavior of systems through a finite set of states and transitions. FIG. 14 illustrates a finite state machine 1400 showing how different components move from a first state 1402 to a second state 1404 and loop back to the first state 1402 based on the transition condition described in the model. These transitions are governed by a set of rules or conditions, making state machines 1400 adept at managing discrete, event-driven, and sequential processes.

The state machine approach streamlines the user experience by delivering lucid, context-sensitive prompts and guidance. Operators are no longer reliant on their personal interpretation of flowcharts, as they are led through a step-by-step process by the advisor system, in tandem with environmental input solicitation and real-time action prompts. This approach creates a smoother operational flow. The state machine and its transitions are structured within an open standard file, a JSON file, defined by nodes and conditions. This format permits dynamic adjustments to accommodate distinct fracturing treatment scenarios and future cases, obviating the necessity for system redevelopment. Furthermore, it facilitates accessibility on portable devices, enabling operators to access guidance on site, thereby augmenting the practicality and efficiency of the process.

Figure 15:
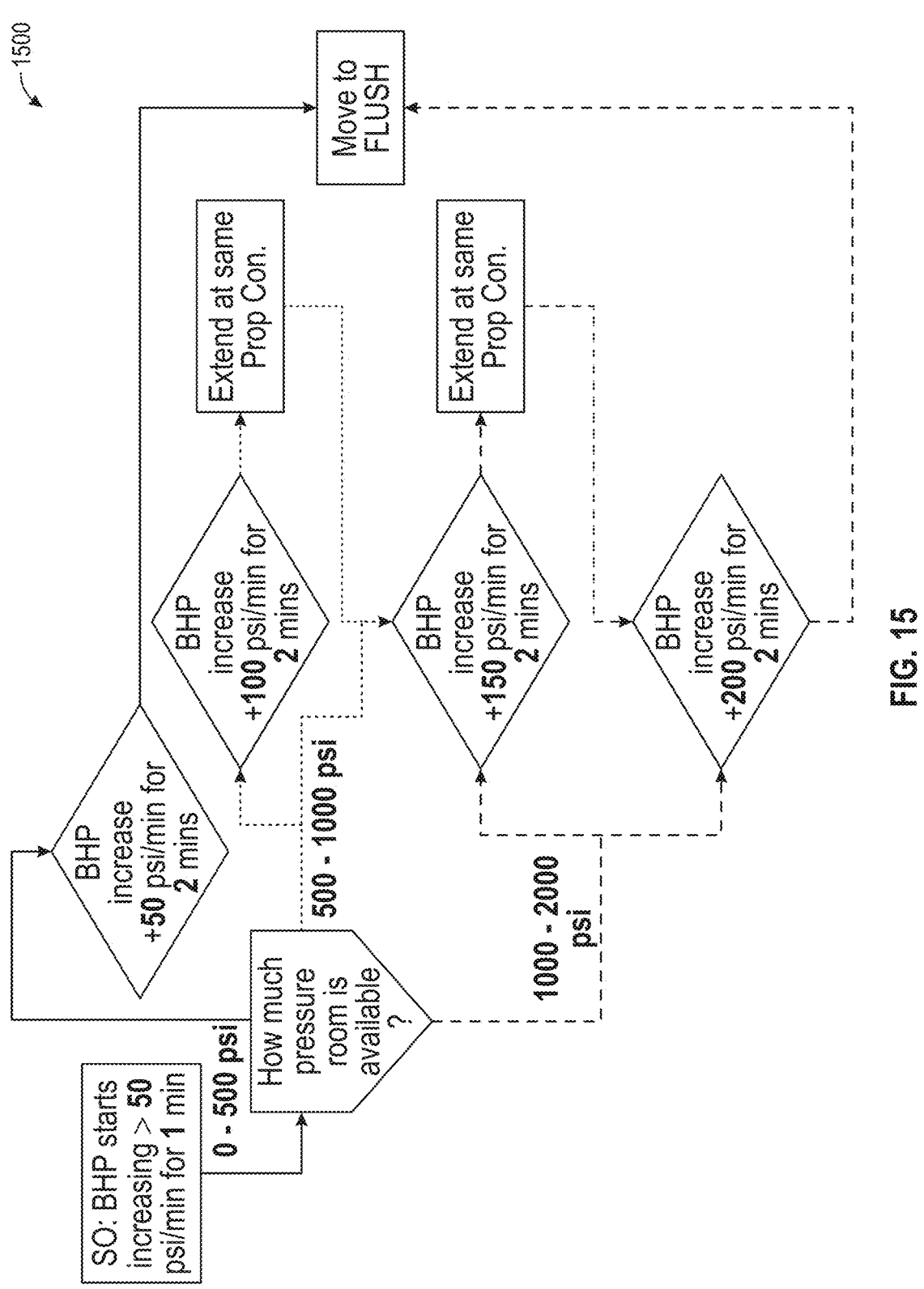
FIG. 15 illustrates a non-limiting example of a flowchart that may be built by a domain expert for low-permeability conventional formations in pressure increase scenarios in a given basin, which may be encoded as a state machine automaton (SMA), in accordance with embodiments of the present disclosure.

FIG. 15 illustrates a non-limiting example of a flowchart 1500 that may be built by a domain expert for low-permeability conventional formations in pressure increase scenarios in a given basin, which may be encoded as an SMA or other similar solution (e.g., Markov chains), as described in greater detail herein. The flowchart 1500 is represented as a process state followed by a conditional state, corresponding to a state in the state machine. The machine remains in its current state until the condition is met, at which point a transition occurs, and the machine proceeds to the subsequent state. However, there are cases that deviate from this general rule, and a detailed explanation of these specific cases will be presented here.

It will be appreciated that many other flowcharts may be similarly encoded as SMA in accordance with the techniques described herein. In certain embodiments, the solution may be used in two output modes: (1) design phase for static data, which means the data does not change in time-series, and the tool may be used as an interrogator before and within the treatment for quick decision making; and (2) real-time execution for dynamic data as in FIG. 14 where the time series events may trigger advisory warnings.

Figure 16:
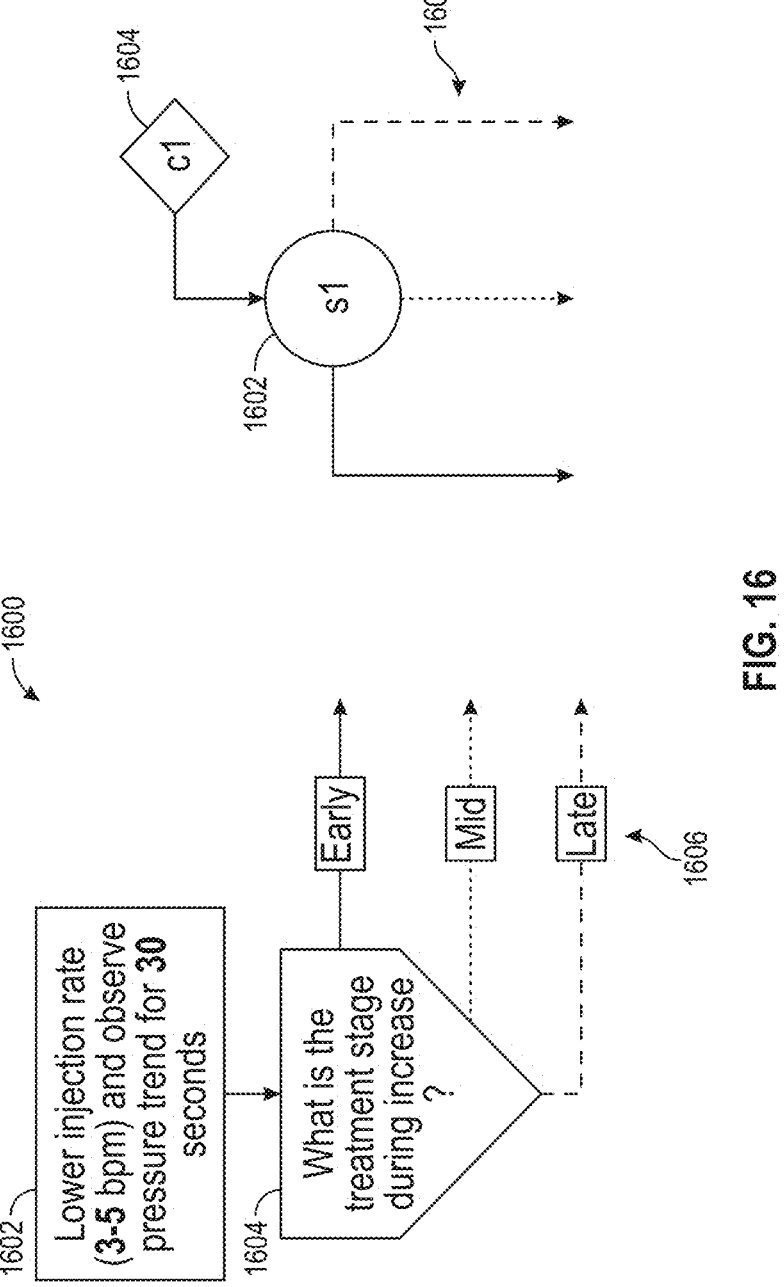
FIG. 16 illustrates a segment of an example flowchart denoting a command and a condition, which can be transformed into a state within a state machine, in accordance with embodiments of the present disclosure.

The example depicted in FIG. 16 illustrates a segment of an example flowchart 1600 (e.g., similar to the flowchart 1500 of FIG. 15) denoting a command 1600 and a condition 1602, which can be transformed into a state within the state machine. In this particular example, a first process state 1602 of the flowchart 1600 (e.g., labeled as "Lower Injection Rate (3-5 bpm) and observe pressure trend for 30 seconds") may be represented as state 1 (s1) 1602 in the state machine. In this state, the system prompts the user to take a specific action and then awaits user feedback. Depending on the user's response 1604 to a conditional query (e.g., "What is the Treatment Stage during Increase?") may be represented as condition 1 (c1) 1604 in the state machine, and the state machine model may transition from one state to another.

The model is expected to transition to one of the next three states 1606 based on user feedback, with the expectation that it matches a process state in the flowchart model. However, in this case, and in several others, the transition leads directly to another condition state. To align the flow with the state machine structure, additional intermediary states must be introduced. FIGS. 17A-17D illustrate different scenarios representing the conversion of flowchart state into a state machine state: (a) a multiple choice scenario where the choice of path depends on the time/position in the fracturing treatment; (b) a check condition in binary/Boolean where either/or situation exists; (c) a relatively complex scenario with consecutive checks addressed by creating an additional transitive state; and (d) a description of transition between states.

Figures 17A, 17B, 17C, 17D:
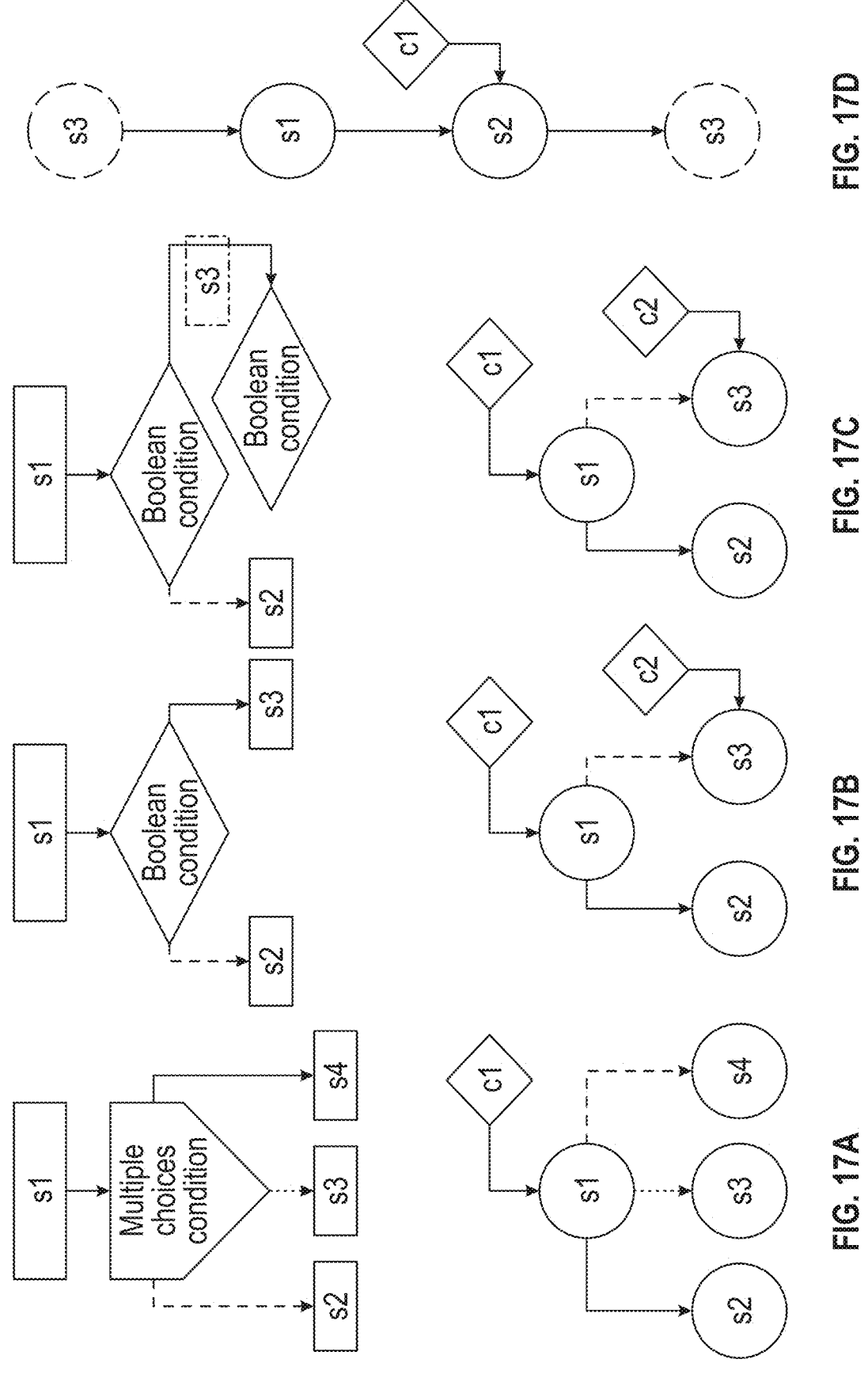
FIGS. 17A-17D illustrate different scenarios representing conversion of flowchart state into a state machine state, in accordance with embodiments of the present disclosure.

As depicted in FIG. 17A and FIG. 17B, the general case assumes that a state transitions from one state to another when specific conditions are met; otherwise, the state does not change. In some flowchart scenarios, consecutive conditions are encountered, as exemplified in FIG. 17C. In such cases, an intermediary, hypothetical state is introduced within the state machine to serve as the subsequent state for the current state. This is visually indicated by dashed process element within the flowchart. Conditions in the flowchart version are expressed in two primary formats: the multiple-choice format, wherein each response option corresponds to a distinct transition path leading to different states, and the Boolean condition format, where "yes" or "no" responses lead to specific state transitions.

In the machine state system version, conditions are intrinsically linked to each state and cannot exist independently, as exemplified in FIG. 17D. Conversely, states may feature empty conditions, solely designed to prompt commands to the user, as seen in FIG. 17D with the state S3. These states are classified as transition states, where the state does not await any feedback from the user or the environment, such as the case with node s1 in FIG. 17D. It is important to note that there is always an initial state within the state machine, from which state machine transitions commence. This initial state may or may not have an attached condition, as demonstrated in FIG. 17D (S1). Additionally, there is a final state in the state machine where the system must halt and exit the transition process, illustrated in FIG. 17D (S3, dashed nodes).

FIGS. 18A and 18B illustrate other different scenarios representing the conversion of flowchart state into a state machine state: (a) a multiple choice scenario where the choice of path depends on the time/position in the fracturing treatment; and (b) a check condition in binary/Boolean where an either/or situation exists. In some cases, a transition from one state to another is governed by two distinct conditions, as demonstrated in FIG. 18A. Given that a direct transition from one state to another is not feasible, it becomes necessary to introduce a hypothetical state. This hypothetical state serves as an intermediary to which the two or more conditions are consolidated and attached. The responses to these conditions may then determine the subsequent states to which they lead, contingent on the answers to the specific conditions. In other scenarios, a Boolean condition represents a single output path, as illustrated in FIG. 18B concerning the "yes" answer. In cases where the "no" answer corresponds to a different, unrepresented path in the flowchart, a self-loop back to the current state is depicted in the state machine, as shown in FIG. 18B.

The cases explained in this section do not provide an exhaustive explanation for every possible variation, given the multitude of representations present in the diverse range of flowchart formats. Instead, they serve as general guidelines that may be applied to other cases. The fundamental principle to keep in mind is that transitions occur exclusively between states and are based on conditions. Transitions do not occur between non-states, and all conditions must be attached to a state. Furthermore, it is possible to utilize the same condition and attach it to different states since conditions are represented as standalone objects.

Data representation formats and markup languages are important in software development and are commonly used for application programming interfaces (API), config files, text editors, and so forth. Some examples of these are JavaScript Object Notation (JSON), Extensible Markup Language (XML), HyperText Markup Language (HTML), Standard Generalized Markup Language (SGML), and YAML. JSON and XML are the most popular formats. JSON is lightweight to send back and forth owing to its small size and is very easy to read and write, compared to XML. Another benefit of JSON is that almost all major languages have a library or built-in functionality to parse JSON strings into objects or classes in that respective language. JSON also natively supports multiple data types such as strings, numbers, Booleans, null, arrays, and objects. In recent developments, JSON has been used more frequently than XML, especially for representational state transfer (REST) APIs. Considering our end goal to integrate the FTAT with the fracturing design and acquisition architecture, JSON may be preferred.

As such, the workflows described here include embedding, into advisor algorithms, one or more flowcharts relating to execution of well stimulation jobs for wells extending through subterranean formations; and executing an actual well stimulation job for an actual well extending through an actual subterranean formation in accordance with the one or more flowcharts embedded into the advisor algorithms. In certain embodiments, the workflows may include embedding the one or more flowcharts into the advisor algorithms using an SMA. In other embodiments, the workflows may include embedding the one or more flowcharts into the advisor algorithms using Markov chains. In addition, in certain embodiments, the workflows may include embedding the one or more flowcharts into the advisor algorithms based on static data in a design, intermediate operation phase. In addition, in certain embodiments, the workflows may include embedding the one or more flowcharts into the advisor algorithms based on data relating to execution of the actual well stimulation job in substantially real-time during the execution of the actual well stimulation job.

10A. Screenout Predictor—Root Cause Analysis (RCA) Training Data

This module presents a rigorous data-based ML workflow that has also been utilized to train inputs and outputs together to predict a tip screenout and a near wellbore screenout. The implementation includes an ML model and real time data transmission. The ML model is trained on all of the inputs, including the causal analysis for the NWB screenout. The real-time data includes the fluid viscosity, pH, and other relevant information to be entered at each onsite sample testing and includes an equipment panel to transmit all of the data to feed to the ML model. This gives the model all information and tools to provide reliable predictions.

All the logs data, perforation data, fluid properties, equipment data, treatment data may be analyzed to understand why a screenout occurred. A structured dataset may be created with all of the parameters and a model is trained on this dataset to create a real-time on-site Screenout Predictor, which may analyze all of the surface and equipment data described herein in substantially real-time to provide warnings of impending screenouts.

This module has two advisory layers, as shown in FIG. 19:

1. The classical Nolte-Smith analysis, which utilizes the BHP to calculate trending slopes and evaluate screenout trends, unrestricted height growth, among other things. Unless a downhole gauge is deployed (which is very rare) the calculated BHP can never be fully trusted and, hence, the evaluation becomes somewhat unreliable. With the calibrated BHP provided by the BHP Estimator described herein, the Nolte-Smith evaluation can be more reliable to predict an impending screenout and all other analysis.

2. A rigorous data-based ML workflow may also be utilized to train the inputs and outputs together to predict a tip screenout and a near wellbore screenout. The implementation requires an ML model and real time data transmission. The ML model is trained on all the inputs, including the causal analysis for the near wellbore screenout. The real-time data requires the fluid viscosity, pH, and other relevant information to be entered at each onsite sample testing and requires the equipment panel to transmit all the data to feed to the ML model. This would give the model all information and tools to give reliable predictions.

The Screenout Predictor workflow 1900 of FIG. 19 begins with input blocks 1902 where, for example, reservoir properties; geomechanical properties; perforation details; fracturing fluid on-site testing parameters; equipment data for high pressure pumps, blenders, hydration units, and so forth; pressure, rate, concentration data; and so forth are used as inputs for a Root Cause Analysis (RCA) 1904. In the RCA 1904, if a near wellbore pressure screenout occurs, an RCA outcome may be determined, which may indicate equipment failure, fluid failure, near wellbore restriction, insufficient width, or some other root cause.

In addition, an ML loop 1906 may be used to create a database with inputs from the input blocks 1902 and the RCA 1904 and to supplement an ML block to predict the screenout type. In addition, an execution loop 1908 may use the output from the ML loop 1906 such as log and other design data, as well as real-time fluid data that is entered while testing and equipment data is streamed while pumping. The outputs of the ML loop 1906 and the execution loop 1908 may then be used by an advisory loop 1910 to predict impending data based on the ML algorithm and real-time data inputs.

10B. Screenout Predictor—Synthetic Trained Data

This module presents an alternate and simpler approach for the Screenout Predictor design. The Screenout Predictor workflow 2000 of FIG. 20 utilizes synthetically generated data 2002 from an engineered design of experiment (DoE) 2004 varying causal parameters in a systematic way and training a model 2006 with complex models 2008 (e.g., Hidden Markov Models (HMMs)) from the DoE 2004 to predict screenout based on pressure trends. The model 2006 may then be validated 2010 (or transfer learned) with relatively small real-field datasets 2012 including screenout and non-screenout treatments 2014.

In general, complex fracture models may be run in a parallel ensemble mode to generate thousands of jobs. The DoE 2004 is key to varying relevant parameters systematically. For example, zone models variation and different treatment variations within each zoneset may include rate, fluid viscosity, proppant concentration ramp, proppant size, leakoff, and so forth.

All service quality and fluid related issues may be embedded in the DOE 2004, for example:

Drop rate suddenly←simulate 2-3 pumps failure.
Lower viscosity in 1-2 steps←simulate bad fluid etc.
Increase leakoff coefficient in 1-2 steps←simulate fissure opening, etc.

As such, the Screenout Predictor described here may enable developing a data-based machine learning model; to executing a well stimulation job for a well extending through a subterranean formation; receiving data relating to the execution of the well stimulation job in substantially real-time during the execution of the well stimulation job; and predicting a screenout for the well stimulation job using the data-based machine learning model and the data relating to the execution of the well stimulation job. In addition, in certain embodiments, the Screenout Predictor may enable developing the data-based machine learning model based on an RCA 1904. In such embodiments, the RCA 1904 may use equipment data, treatment data, petrophysical and rock mechanical data, or some combination thereof, as inputs 1902. In addition, in certain embodiments, the RCA 1904 may predict equipment failures, fluid failures, near wellbore restrictions, and insufficient fracture width.

In other embodiments, the Screenout Predictor may enable developing the data-based machine learning model based on synthetic data 2002 generated in a systematic manner to represent a generalized model. In such embodiments, a design of experiment carrying causal parameters may be used to develop the data-based machine learning model. In addition, in certain embodiments, the Screenout Predictor may enable validating or transfer learning the data-based machine learning model with real-field data sets to improve accuracy of the data-based machine learning model.

11. Stage Placement Success Predictor and Strategy Optimizer

The Stage Placement Success Predictor and Strategy Optimizer module is a data analytics and machine learning based module that predicts the level of success achieved in proppant placement. The value proposition for this module is in horizontal tight formations, where establishing injectivity, and achieving sufficient rate for fracture propagation is a challenge due to relatively high in situ stresses impacted by high tectonic components.

A database has been created with over 50 fracturing relevant parameters from different phases of the well, such as drilling, completion, processed openhole logs, perforation details, fracturing treatment parameters and pressure diagnostics data. Analytics are then conducted to get a macro understanding of impacting factors, followed by an ML approach. The inputs here are all parameters in the database in different phases and outputs such as injection rate achieved, pressure experienced, proppant placed, maximum proppant concentration, proppant diameter at maximum concentration, and whether the stage was skipped or executed.

The implementation strategy is to utilize the ML model to input all the well information and data and predict the level of success that will be achieved. Then, the perforation strategy, fluid type used, and many other factors that can be controlled may be implemented to improve the job outcome. The ML model is also used to run these sensitivities.

12. Completion Pipe Deformation Predictor

Completion deformation is broadly classified into two types for our purpose here:

1. When the pipe is deformed enough to create a leak point and path for fluid entry. Details provided by the Perforation Advisor/Optimizer may be utilized to detect when such deformation has occurred in the completion (e.g., casing, liner, etc.). Since the evaluation involves detecting the fluid entry point, a reflection time may be evaluated from the deformed portion of the completion and may be detected.

2. When the pipe is deformed slightly, relatively high frequency pressure measurements may be utilized to link them with deformation signals (pre available deformation data is a pre-requisite here) during the fracturing treatment placement. A time series ML model utilizing algorithms such as LSTM, ARIMA, or MLP may then be trained to predict a deformation event detection while pumping where relatively high frequency pressure data is available.

13. Operational Efficiency Health Index

The Operational Efficiency Health Index is designed to be used in the job planning phase to recognize the most lucrative (e.g., in terms of operational efficiency and cost) candidates for execution in fracturing, stimulation, intervention, perforating jobs, and so forth. The algorithm uses multiple inputs that impact the operational ease at the wellsite and assigns a rank and weight for each input. Then, these input indices are aggregated together to rank all the candidates based on their health.

Table 1 shows an example of this module. The inputs here are job type, well type, completion type, formation type, and stage count. Each of these have an ease value assigned based on the selection and each category has a weight. In the backend, the module calculates the aggregate points for the defined ease value and weight and sorts the rank for all the candidates. Here, it can be seen that Well-E was ranked as the healthiest and Well-G was the least healthy. This module is not limited to any job types or number of inputs. Rather, it is expandable wherever required.

job that contribute the most to air pollution so they can be adjusted prior to the job execution, and demonstrating the actual air pollution being generated during the job, using real-time monitoring and analytics.

The GHG Intensity Index considers a variety of inputs including job treatment parameters, distances from material storage locations to the well site, and equipment fuel efficiency, all of which can have a substantial impact on the Scope 1 $CO_2e$ produced during the job. During the job planning, the GHG Intensity Index can be adjusted by altering the materials proposed for the job, modifying supply chain activities, and changing the nature of the stimulation fleet, especially the stimulation pumps, through the quantities of equipment used, the type of fuel used, the proposed idling, etc. During the job execution, the actual Index for $CO_2e$ generated comes from actual materials consumed, actual supply chain trips, and actual fuel consumption by specific equipment.

Placement Quality Index (PQI)

Cancellation of fracturing stages due to high pressure is a common occurrence in tight gas horizontal wells. This reduces the productive area across the lateral and drastically reduces the return on investment of the wells. The embodiments described herein aim to provide a solution to this problem. In particular, the approach provides a data analytics and ML-based technique to predict stage placement success during the design phase to provide advice or to optimize the strategy at the wellsite during operations. The value proposition for this module is in horizontal tight formations, where establishing injectivity, and achieving sufficient rate for fracture propagation is a challenge due to the relatively high in situ stresses impacted by high tectonic components.

A database may be created with multiple fracturing-relevant parameters from different phases of the well, such as drilling, completion, processed openhole logs, perforation details, fracturing treatment parameters, and pressure diagnostics data. Analytics may then be conducted to get a macro understanding of impacting factors, followed by an ML approach. The inputs may include all parameters in the database in different phases and outputs may include injection rate achieved, pressure experienced, proppant placed, maximum proppant concentration, proppant diameter at maximum concentration, and whether the stage was skipped or executed.

TABLE 1

| | | | Example Operational Efficiency Health Index | | | | |
|---|---|---|---|---|---|---|---|
| Candidate | Job Type | Well Type | Completion Type | Formation Type | Stage Count | Points | Rank |
| Well-A | Proppant Fracturing | Vertical | Openhole | Tight | 2 | 1.28 | 7 |
| Well-B | Matrix Acidizing | Horizontal | Cased Hole | Tight | 7 | 2.07 | 3 |
| Well-C | Acid Fracturing | Vertical | Openhole | High Perm | 3 | 1.88 | 5 |
| Well-D | Acid Fracturing | Horizontal | Openhole | Tight | 5 | 1.85 | 6 |
| Well-E | Matrix Acidizing | Horizontal | Openhole | High Perm | 6 | 2.45 | 1 |
| Well-F | Matrix Acidizing | Vertical | Cased Hole | Mid Perm | 4 | 1.95 | 4 |
| Well-G | Proppant Fracturing | Vertical | Cased Hole | Tight | 4 | 1.2 | 8 |
| Well-H | Proppant Fracturing | Horizontal | Openhole | Mid Perm | 15 | 2.1 | 2 |

14. GHG Intensity Index

The GHG Intensity Index is an indicator of the amount of predicted or actual $CO_2e$ that is produced on each well or each stage of a well during a stimulation job. The index can be used in a variety of ways, including identifying wells with the lowest predicted environmental air pollution impact, providing transparency on the activities of the stimulation The implementation strategy is to utilize the ML model to input all of the well information and data and predict the level of success that will be achieved. Then, the perforation strategy, fluid type used, and many other factors that can be controlled may be implemented to improve the job outcome. The ML model may also be used to run these sensitivities.

The ML workflow methodology may be designed to predict the variable "stage skipped" using a classification model and the other four outputs were predicted using regression ML models. This variable is important because whether a stage was skipped defines the other outputs. In other words, to be able to accurately predict the Injectivity Index (II), total proppant, proppant load (maximum proppant concentration×max proppant size), and a Placement Quality Index (PQI), whether the stage should be skipped or not needs to be known, because if a stage was skipped, these values are relatively low, even close to zero; and if a stage was not skipped, the predicted values become relevant.

FIG. 21 illustrates an ML workflow 2100 using output 2102 from a classification model 2104 as an input variable for other regression models 2106, 2018, 2110, 2112 and an optimizer 2114 for the PQI. In general, the stage skipped classification model 2104 is the first prediction, which will then be used as input for the other regression models 2106, 2108, 2110, 2112. As illustrated in FIG. 21, in certain embodiments, the other regressions models 2106, 2018, 2110, 2112 may include an II model 2106 configured to output a prediction of the II, a total proppant model 2108 configured to output a prediction of total proppant, a proppant load model 2110 configured to output a prediction of proppant load, and a PQI model 2112 configured to output a predicted PQI, as described in greater detail herein. It is relatively important to have a high level of accuracy about whether a stage is skipped because a wrong classification by the classification model 2104 will lead to wrong results in the prediction of the other regression models 2106, 2018, 2110, 2112. As a part of the workflow 2100, multiple algorithms have been tested to finalize the optimum model for result analysis and interpretation.

The embodiments described herein are novel insofar as there is currently no existing workflows in the industry that allow users and operators to design and strategize perforations and completions based on actual data that is experienced in their fields. In contrast, the embodiments described herein propose the use of data from different phases and their success on that stage in an actual job to learn from in the design phase and workflow. Existing workflows only use log data and measurements. The use of a feedback loop with real data and how to utilize it in an engineered way is the key component of the embodiments described herein.

Table 2 shows input/output parameters used for the predictive ML modeling described here. The database encompasses all relevant aspects of well construction, geomechanics, and fracturing treatment parameters for the subject horizontal wells. The output calculations may include:

a. Embed the max bottomhole treating pressure and max injection rate into an II output b. Stage skipped in a binary, categorical feature encoded as 0 and 1 in the workflow c. Total proppant is the total proppant mass d. Proppant load embeds the maximum proppant concentration and the D50 of the max proppant size distribution pumped.

e. Calculate a PQI using the other four outputs above (i.e., a-d). So, PQI becomes a single output that embeds all outputs and can be used to construct a log for the advisory module. The PQI uses a Multi-Criteria Decision Analysis (MCDA) technique such as entropy weight method (EM) or analytical hierarchy process (AHP). However, any suitable technique may be used. These techniques help assign appropriate weights to the four outputs above used in the calculation of PQI. This is relatively important because not all outputs are equally important.

Calculation details of the PQI are described in greater detail below. In general, the workflow 2100 illustrated in FIG. 21 may be executed and the model may then be deployed as a data-based completion advisor.

For the classification step, multiple ML models were trained to identify the most effective one for the task. A variety of classification algorithms were considered, including logistic regression (LoR), decision trees (DT), random forest (RF), gradient boosting (XGB), support vector machine (SVM), k-nearest neighbors (KNN), naive Bayes (NB), and neural networks (NN). FIG. 22 compares the performance of all of the classification models 2104 for the stage skipped prediction tested across the different evaluation metrics. As illustrated, the performance of the classification models 2104 was assessed using different evaluation metrics that included accuracy, precision, recall, and F1 score. Accuracy provides a simple assessment of the percentage of correct predictions. Precision evaluates positive prediction quality (e.g., out of those predicted positive, how many are actually positive). Recall assesses sensitivity to

TABLE 2

| Input/output parameters used for the predictive ML modeling. | | | | |
|---|---|---|---|---|
| Inputs—General Info | Inputs—Perforation Data | Inputs—OH Log Data and Mechanical Earth Model | Inputs—Treatment Parameters | Outputs |
| Field | MD mid-perforation | Washout extent from caliper | Delta P at fracture face | Injectivity Index |
| Well Completion type | Number of clusters Cluster length/total perf | Bulk density [RHOB] Gamma ray [GR] | Total acid pumped Pressure break at acid at perforation | Stage skipped [Y/N] Total proppant |
| Stage number | Average cluster/stage spacing | Sonic-compressional [DTC] | Rate increase from acid | Proppant load |
| Drilling fluid [DF] | TVD mid-perforation | Sonic-shear [DTS] | | PQI |
| Reservoir pressure gradient | Deviation at perforation | Total porosity [PHIT] | | |
| Drilling overbalance gradient | Azimuth at perforation | Calculated minimum horizontal stress gradient Calculated Young's modulus | | | positive instances, measuring the proportion of true positive predictions among all the positive instances. F1 score measures the balance between precision and recall; it is the harmonic mean that penalizes extreme negative values of either metric. As illustrated in FIG. 22, XGB was the best-performing model for this task and was used to train the final classification model 2104.

For the regression step, multiple ML models were also trained to identify the most effective one to predict each of the different outputs, including the II, total proppant, proppant load, and the PQI that included the EM and the AHP. A wide range of regression algorithms were compared to assess their performance for each of the different outputs. The algorithms included linear regression (LR), DT, RF, XGB, SVM, KNN, NB, and NN. The comparison of the performance of all the models tested for each of the different outputs across the different evaluation metrics can be observed in FIG. 23. The performance of each of the different evaluation metrics was assessed using three key evaluation metrics that included coefficient of determination $(R^2)$, root mean square error (RMSE), and mean absolute error (MAE). $R^2$ quantifies how well a model fits a dataset, indicating the model's explanatory power. RMSE measures the standard deviation of residuals using the square root of the average squared difference between the original and predicted values. MAE represents the average absolute errors, which is the difference between the actual and predicted values. It can be observed in FIG. 23 that for the II, XGB exhibits the highest $R^2$, lowest RMSE, and lowest MAE, being the best-performing model for this prediction. Similarly, XGB performed best in total proppant, RF for proppant load, and RF for both PQI, EM and AHP.

The final step of the proposed workflow involves adding an optimization algorithm to maximize the PQI output given the search space of feasible solutions in the input variables. The metaheuristic optimizer algorithm used was particle swarm optimization (PSO), which is a heuristic search population-based algorithm inspired by the social behaviors of a flock of fish or birds. This optimization algorithm was implemented due to its ability to explore complex multidimensional search spaces. In addition, it is computationally faster than other optimization algorithms. It was designed to iteratively adjust the input variables, given a constrained search space to explore for a higher PQI. Among 30 inputs of the prediction model, 17 remained fixed, meaning their values were not adjusted in the optimization, and 13 had a ranged threshold that could be adjusted, searching for the best combination that would lead to the highest PQI. Moreover, the constraints helped avoid physically impossible or unfeasible solutions, thereby enhancing the results' practicality.

After the data were carefully imputed and preprocessed, and the algorithms were selected for each prediction output, the final models were trained/tested and evaluated using the different corresponding evaluation metrics mentioned above. To ensure the robustness and generalizability, cross-validation techniques were employed using k-fold cross-validation, which divided the dataset into five subsets or folds. Models were trained on four different folds and validated by testing on the remaining one. The process was repeated five times, allowing each fold to serve as the testing subset once. This approach provided a reliable estimate of the model's performance by mitigating the effects of what subsets are used for training and testing. The average values across all folds determine the overall performance.

FIG. 24A illustrates a classification model performance comparison for stage skipped prediction using the evaluation metrics of accuracy, precision, recall, and F1 score, and FIG. 24B illustrates a confusion matrix for stage skipped prediction, depicting a significantly low number of false positives and false negatives. In particular, FIG. 24A shows the accuracy, precision, recall, and F1 score evaluation metrics across all five folds. Results showed an average accuracy of 94%, an average precision of 94.7%, an average recall of 94%, and an average F1 score of 93.9% across all five folds. These metric results highlight the robustness and reliability of the classification model in the prediction. The confusion matrix illustrated in FIG. 24B shows the classification results of the different models trained across all of the different folds. The true positives, true negatives, false positives, and false negatives may be visualized. The false negative and false positive instances are evenly distributed, with only 3% each. Regardless, the performance is excellent across all folds, showing high confidence in the stage skipped prediction, which is important for the predictions of the other regression variables.

Figures 25A, 25B:
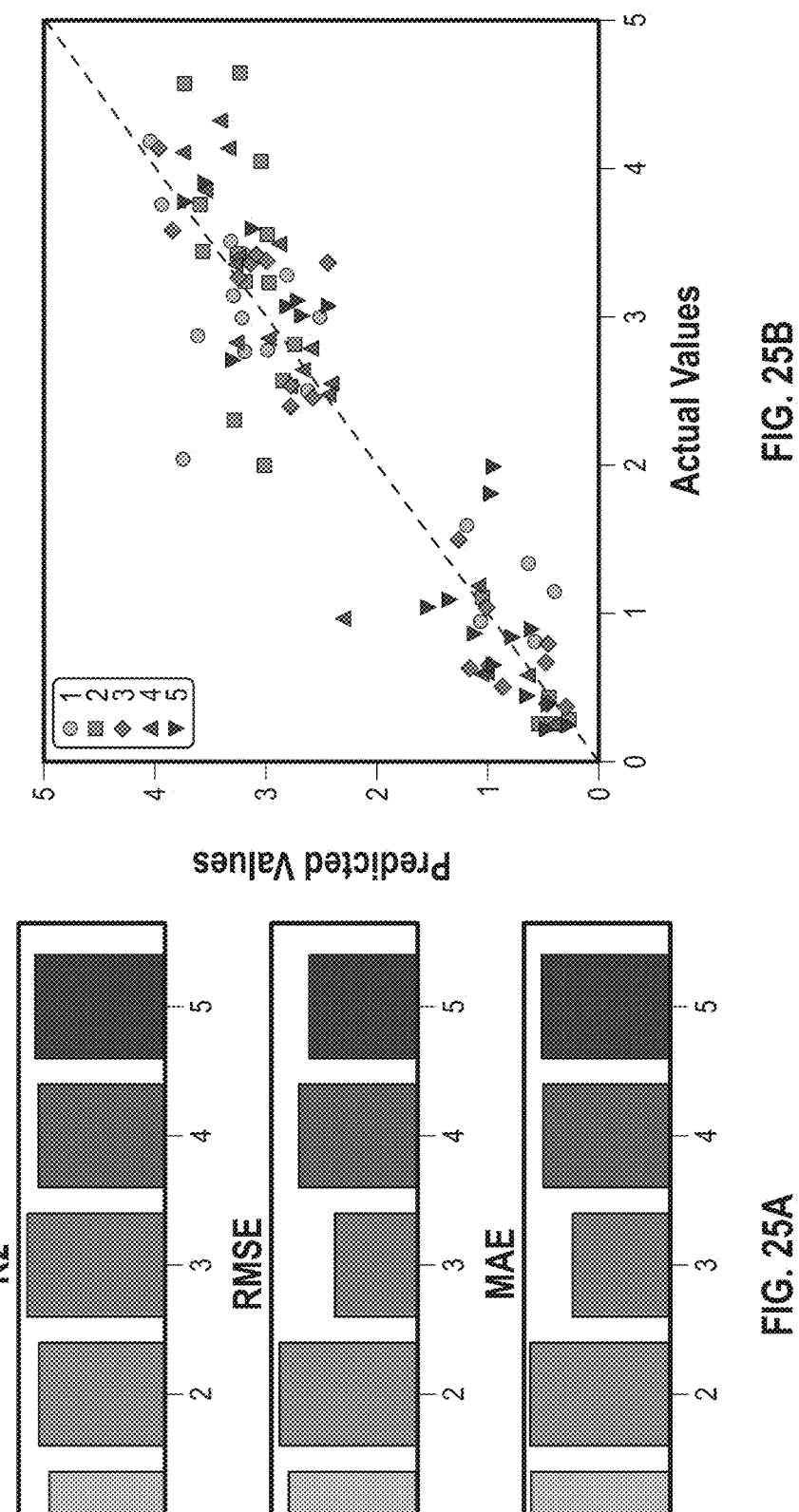

Results for the regression step may be observed in FIGS. 25A-29B. The cross-validation technique was also used to assess the performance of the regression models. FIG. 25A shows the II results across all folds using the XGB model with an average $R^2$ of 86.7%, an average RMSE of 0.467 bbl/day/psi, and an average MAE of 0.345 bbl/day/psi. FIG. 25B shows the predicted variables against the actual variables across all the different folds. Points closer to the diagonal line represent high accuracy, whereas points further away indicate more significant prediction errors. It can be observed that the model exhibits good performance with some variance in some instances.

Figures 26A, 26B:
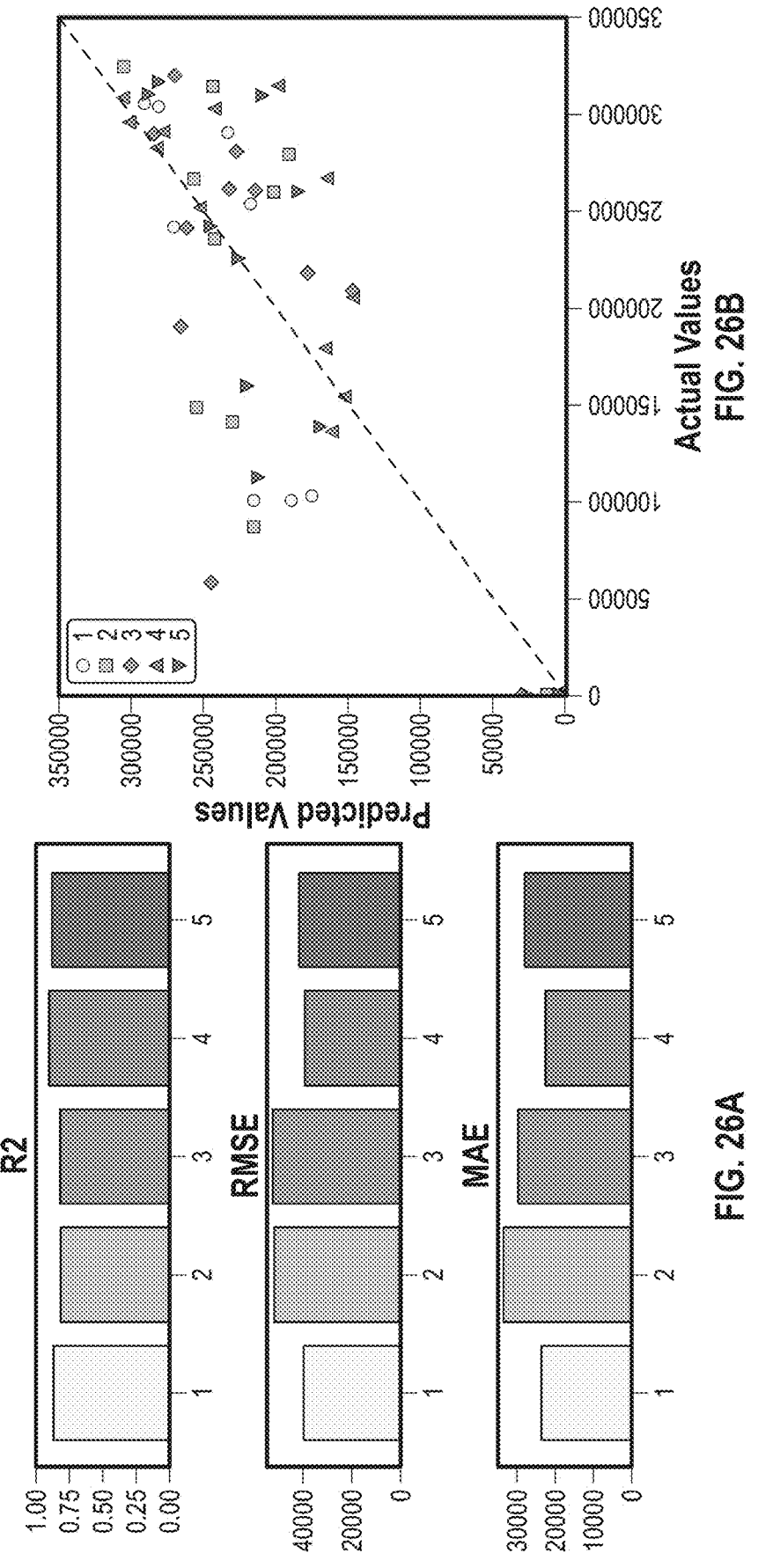

FIG. 26A shows the total proppant results across all folds using the XGB model with an average $R^2$ of 86.4%, an average RMSE of 45,350 lb, and an average MAE of 27263 lb. FIG. 26B shows the predicted versus actual data, showing two data clusters. The low value cluster represent stages that are skipped, while the higher value cluster represents stages that have not been skipped. In this case, high variance in the predictions are observed when stages were not skipped across all folds.

Figures 27A, 27B:
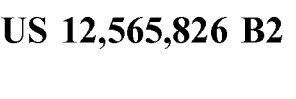

FIG. 27A shows the proppant load results all folds using the RF model with an average $R^2$ of 93.8%, an average RMSE of 0.010 PPA*in, and an average MAE of 0.006 PPA*in. FIG. 27B shows the predicted vs. actual, showing better performance compared to total proppant. A possible explanation is that the total proppant amount used in the stage might include more randomness, causing the prediction task to be more complex, as the model might struggle to capture a clear relationship between the inputs and the total amount of proppant used in the different stages.

FIG. 28A shows the results for PQI EM using the RF model, and FIG. 28B shows the predicted vs. actual. Both the EM and AHP PQI were normalized using min-max scaling to evaluate the instances evenly, which helped improve the models' performance. Results showed an average $R^2$ of 86.4%, an average RMSE of 13.5%, and an average MAE of 8.1%. It was noted in most of the prediction models that the RMSE was larger than the MAE. The reasoning is that MAE is a more robust measure that is not highly affected by the influence of outliers. Nonetheless, RMSE is larger if there are significant outliers or large errors in the prediction. This is because the small dataset used for training could affect the model, depending on the subsets used. It shows that gathering some stage data from the well is required to ensure the predictions are relevant for the application.

FIG. 29A shows the PQI AHP, and FIG. 29B shows the predicted vs. actual. The model used in this case was RF, exhibiting results of 93.8% in the average $R^2$, 12.8% in the average RMSE, and 7.9% in the average MAE. Results were highly similar to the PQI EM, as expected. By looking at the distribution of both variables, it is observed that these were almost identical with slight variations. Thus, these were highly positively correlated. For all of the different regression models, by looking at the evaluation metrics for each one, it can be demonstrated that these exhibit excellent performance, showing high confidence in most predictions.

For the optimization, the trained PQI AHP model was used, as it exhibits slightly better performance than the PQI EM. The data included openhole multistage fracturing (OH MSF) and cased hole plug-n-perf (CH PnP) completions, which causes variables to vary significantly depending on the respective type. The OH wells do not have clusters and do not have a comparable wellbore-rock connection. For the CH wells, the clusters are relatively small, and the perforation strategy is important. For these reasons, the optimization was done separately for OH MSF and CH PnP. This way, the search space of these ranged variables was constrained with multiple thresholds for each of the different cases based on domain knowledge. Another essential requirement to perform optimization was that the stage needs to not be skipped. Otherwise, values of PQI are significantly low. It is not feasible to maximize the predictions in these cases.

FIG. 30 shows boxplots of the distribution of the optimized variables of PQI for OH MSF and CH PnP. It can be observed that optimized values are higher than the initial PQI values, showing an increase of approximately 62% (PQI from 0.32 to 0.52) and 93% (PQI from 0.27 to 0.52), respectively, when the movement of the lowest PQI instance is compared. The mean values show an increase of 8% to 11%. Therefore, a significant increase occurs when PQI values are relatively low, as can be observed in the increase of the minimum values and lower quartile of the optimized values. In addition, the impact of the optimizer is significant in the case of the CH PnP wells, which are more likely to experience cancellations. This lower section of the data and completion types are the important spaces requiring optimization because that region is where the proppant placement is suboptimal. At and above median PQI values >0.8, the placement is already good enough for most operators. Overall, the results show that using the PSO optimization algorithm leads to higher PQI, which is achieved by finding the best combination of values within a constrained search space.

15. PQI Calculation

As discussed above, the primary objective of this particular workflow is to design better strategies for completions (e.g., stage and cluster placement) in horizontal wells. This means that the precise answer of each of the four outputs (II, proppant amount, etc.) mentioned above might be redundant as an answer product. Moreover, the accuracy of each of the models might be impacted by each other. Rather, what is ideally desired is a discrete or continuous log that defines a unique index that may be used as a metric for the completion strategy. The PQI attempts to encompass all of the important stage placement metrics that will facilitate: (a) simplicity and accuracy of the predictive model, and (b) simpler execution in the design phase.

A relatively simple method for calculating PQI is to do a linear computation, but this would not be very accurate because each of the four outputs have relatively different importance. Therefore, multicriteria decision analysis (MCDA) and decision-making methods may be used to calculate the weights for the four outputs. For brevity, only two methods (i.e., entropy weight method (EM) and analytical hierarchy process (AHP)) were used for the MCDA processes. However, there are many more of these techniques for such decision making. The EM is an objective method that entirely uses the data without any user intervention to decide the weights of each criterion/parameter. It is a statistical technique used to determine the weights of indicators in multicriteria decision-making problems. It measures the amount of information provided by each indicator, with higher entropy indicating more uniform distribution and less discrimination power among criteria. The method involves calculating the entropy of each criterion, normalizing these values, and assigning weights based on their contribution to the overall uncertainty reduction. The AHP, on the other hand, is a subjective method, enabling the user to provide the relative importance of each criterion/parameter before proceeding with all of the downstream weight calculations. It is a structured technique for organizing and analyzing relatively complex decisions, based on mathematics and psychology. It involves decomposing a decision problem into a hierarchy of subproblems, comparing them pairwise in terms of their impact on an overall goal. Quantitative values are assigned to each comparison (in terms of relative importance), and the results are used to calculate a weight for each criterion, providing a prioritized ranking of decision options. These two techniques provide a good spectrum for end users to analyze.

Table 3 shows all of the final weights calculated and the consistency ratio (used to ensure the calculations are consistent wherein a ratio >0.1 implies inconsistency in the mathematical calculations) for the AHP. The EM showed that total proppant was the most important with ~38% and closely followed by stage skipped with ~33%. The proppant load and II were allocated lower weights, which makes intuitive sense. It is important to note that the EM does not handle qualitative parameters since the calculations include logarithmic functions. For the same reason, it also returns negative values for data points that are 0. Hence, a very small, nonzero dummy value was introduced for the stage skipped binary (0 or 1) and proppant amount, proppant load (where no proppant was pumped) to calculate the weights. For the AHP, three cases were chosen to test the subjectivity and vary the weights to test some sensitivity. Finally, a linear PQI was calculated based on the weights and normalized with the maximum value to finalize PQI values ranging from 0 to 1.

TABLE 3

Parametric weight calculations for PQI, for different cases of EM and AHP multicriteria decision analysis. Three cases of AHP calculations were made to test the user control and consequential subjectivity.

| | EM | AHP1 | AHP2 | AHP3 |
|---|---|---|---|---|
| II | 0.106 | 0.085 | 0.079 | 0.117 |
| Stage Skipped | 0.327 | 0.499 | 0.371 | 0.340 |
| Total Proppant | 0.379 | 0.289 | 0.422 | 0.404 |
| Proppant Load | 0.188 | 0.127 | 0.127 | 0.139 |
| Consistency Ratio | NA | 0.02 | 0.01 | 0.01 |

As such, the workflow 2100 illustrated in FIG. 21, and the associated discussion relating to FIGS. 22-30, may enable a data-based system configured to predict the success of fracturing and proppant placement using well data and real-field data. For example, in certain embodiments, a new log may be constructed for PQI, which may be utilized as a coupled parameter embedding multiple success criteria. In certain embodiments, the solution may be binary (e.g., yes or no) or quantitative (e.g., in terms of the PQI). In certain embodiments, the PQI may be calculated using subjective or objective Multi-Criteria Decision Making techniques such as AHP or EM, for example. In certain embodiments, the quantitative answer may be a continuous log with an integer output or a discretized log with a class/categorical output. In addition, in certain embodiments, an algorithm may be used to advise operators on the optimal perforation and completion design to enhance the fracture initiation and fracturing success. In addition, in certain embodiments, an optimizer algorithm may be used to enhance the PQI or to move the stage from skipping to not skipping. In addition, in certain embodiments, the optimizer may find depths in the well in the vicinity of the initial design with higher PQI or potential success, and may advise based on that.

The specific embodiments described herein have been illustrated by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . ." or "step for [perform]ing [a function] . . . ", it is intended that such elements are to be interpreted under 35 U.S.C. § 112(f). However, for any claims containing elements designated in any other manner, it is intended that such elements are not to be interpreted under 35 U.S.C. § 112(f).

The invention claimed is:

1. A method, comprising:
executing a well stimulation job for a well extending through a subterranean formation in accordance with a well stimulation plan;
receiving data relating to the execution of the well stimulation job in substantially real-time during the execution of the well stimulation job, wherein the received data relating to execution of the well stimulation job comprises at least real-time fracture width calculations; and
providing advice regarding one or more execution steps for the well stimulation plan in substantially real-time during the execution of the well stimulation job based on the received data relating to the execution of the well stimulation job.

2. The method of claim 1, wherein the one or more execution steps for the well stimulation job comprise whether to continue the well stimulation plan as planned, whether to extend a current execution step, or whether to move to flush based on the received data.

3. The method of claim 1, wherein providing advice comprises comparing the real-time fracture width calculations to an allowed fracture width during the execution of the well stimulation job.

4. The method of claim 1, comprising calculating and calibrating a bridging criterion based on collected end-of-treatment data.

5. The method of claim 4, wherein the bridging criterion is based on a fracture compliance equation.

6. The method of claim 4, wherein the end-of-treatment data comprises fracture width, net pressure, maximum proppant concentration, maximum proppant size, whether a treatment ended normally or in a screenout, or some combination thereof.

7. The method of claim 1, comprising performing a post-job analysis of the well stimulation job after execution of the well stimulation job.

8. The method of claim 7, wherein the post-job analysis comprises calculating an end of job (EOJ) bridging index based on: (a) an EOJ maximum proppant concentration, (b) a proppant size at maximum proppant concentration, and (c) an EOJ status.

9. A method, comprising:
embedding, into a plurality of advisor algorithms, one or more flowcharts relating to execution of well stimulation jobs for wells extending through subterranean formations; and
executing an actual well stimulation job for an actual well extending through an actual subterranean formation in accordance with the one or more embedded flowcharts in the plurality of advisor algorithms, wherein the one or more embedded flowcharts, once embedded, each comprise a state machine with a finite set of states and transitions.

10. The method of claim 9, comprising embedding the one or more flowcharts into the advisor algorithms using a state machine automaton (SMA).

11. The method of claim 9, comprising embedding the one or more flowcharts into the advisor algorithms using Markov chains.

12. The method of claim 9, comprising embedding the one or more flowcharts into the advisor algorithms based on static data in a design, intermediate operation phase.

13. The method of claim 9, comprising embedding the one or more flowcharts into the advisor algorithms based on data relating to execution of the actual well stimulation job in substantially real-time during the execution of the actual well stimulation job.

14. A method, comprising:
developing a data-based machine learning model based on a root cause analysis;
executing a well stimulation job for a well extending through a subterranean formation;
receiving input data relating to the execution of the well stimulation job in the well in substantially real-time during the execution of the well stimulation job; and
predicting, as output data, a screenout for the well stimulation job using the data-based machine learning model and the input data relating to the execution of the well stimulation job.

15. The method of claim 14, wherein the data-based machine learning model trains the input data and the output data together to predict the screenout for the well stimulation job.

16. The method of claim 15, wherein the root cause analysis uses input data comprising equipment data, treatment data, petrophysical and rock mechanical data, or some combination thereof.

17. The method of claim 15, wherein the root cause analysis predicts, as output data, equipment failures, fluid failures, near wellbore restrictions, and insufficient fracture width.

18. The method of claim 14, comprising developing the data-based machine learning model based on synthetic data generated in a systematic manner to represent a generalized model.

19. The method of claim 18, comprising using a design of experiment carrying causal parameters to develop the data-based machine learning model.

20. The method of claim 14, comprising validating or transfer learning the data-based machine learning model with real-field data sets to improve accuracy of the data-based machine learning model.

* * * * *